US010684458B2

(12) United States Patent
Chung et al.

(10) Patent No.: US 10,684,458 B2
(45) Date of Patent: *Jun. 16, 2020

(54) CORRECTING FOR ABERRATIONS IN INCOHERENT IMAGING SYSTEMS USING FOURIER PTYCHOGRAPHIC TECHNIQUES

(71) Applicant: California Institute of Technology, Pasadena, CA (US)

(72) Inventors: Jaebum Chung, Pasadena, CA (US); Changhuei Yang, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,389

(22) Filed: Mar. 11, 2016

(65) Prior Publication Data
US 2016/0266366 A1    Sep. 15, 2016

Related U.S. Application Data

(60) Provisional application No. 62/133,130, filed on Mar. 13, 2015.

(51) Int. Cl.
*G02B 21/00*    (2006.01)
*G02B 27/00*    (2006.01)

(52) U.S. Cl.
CPC ....... *G02B 21/0072* (2013.01); *G02B 21/008* (2013.01); *G02B 27/0025* (2013.01); *G02B 21/0076* (2013.01)

(58) Field of Classification Search
CPC .............. G02B 27/005; G02B 27/0025; G02B 27/4211; G02B 2027/011; G02B 2027/0116; G02B 27/4205; G02B 27/4216

See application file for complete search history.

(56) References Cited

U.S. PATENT DOCUMENTS

| 5,475,527 A | 12/1995 | Hackel et al. |
| 6,144,365 A | 11/2000 | Young et al. |

(Continued)

FOREIGN PATENT DOCUMENTS

| CN | 1688254 A | 10/2005 |
| CN | 1932565 A | 3/2007 |

(Continued)

OTHER PUBLICATIONS

Zheng G, Ou X, Horstmeyer R, Yang C. Characterization of spatially varying aberrations for wide field-of-view microscopy. Optics express. Jul. 1, 2013;21(13):15131-43.*

(Continued)

*Primary Examiner* — Clifford Hilaire

(74) *Attorney, Agent, or Firm* — Sheila Martinez-Lemke; Weaver Austin Villeneuve & Sampson LLP

(57) ABSTRACT

Aberration-corrected incoherent imaging methods and systems that can acquire a sequence of coherent images and an incoherent image of a specimen, implement an embedded pupil function recovery process in junction with Fourier ptychographic technique to construct an improved resolution image and pupil function of the imaging system using the sequence of coherent images, determine an optical transfer function based on the estimated pupil function, and remove the aberration from the incoherent image using a deconvolution process to generate an aberration-corrected incoherent image.

16 Claims, 10 Drawing Sheets

(56) References Cited

U.S. PATENT DOCUMENTS

| | | | |
|---|---|---|---|
| 6,154,196 | A | 11/2000 | Fleck et al. |
| 6,320,174 | B1 | 11/2001 | Tafas et al. |
| 6,320,648 | B1 | 11/2001 | Brueck et al. |
| 6,747,781 | B2 | 6/2004 | Trisnadi |
| 6,759,949 | B2 | 7/2004 | Miyahara |
| 6,905,838 | B1 | 6/2005 | Bittner |
| 7,436,503 | B1 | 10/2008 | Chen et al. |
| 7,460,248 | B2 | 12/2008 | Kurtz et al. |
| 7,706,419 | B2 | 4/2010 | Wang et al. |
| 7,738,095 | B2 | 6/2010 | Gardner, Jr. et al. |
| 7,787,588 | B1 | 8/2010 | Yun et al. |
| 8,271,251 | B2 | 9/2012 | Schwartz et al. |
| 8,313,031 | B2 | 11/2012 | Vinogradov |
| 8,497,934 | B2 | 7/2013 | Milnes et al. |
| 8,624,968 | B1 | 1/2014 | Zheng et al. |
| 8,654,201 | B2 | 2/2014 | Lim et al. |
| 8,942,449 | B2 | 1/2015 | Maiden |
| 9,029,745 | B2 | 5/2015 | Maiden |
| 9,426,455 | B2 | 8/2016 | Horstmeyer et al. |
| 9,497,379 | B2 | 11/2016 | Ou et al. |
| 9,829,695 | B2 | 11/2017 | Kim et al. |
| 9,864,184 | B2 | 1/2018 | Ou et al. |
| 9,892,812 | B2 | 2/2018 | Zheng et al. |
| 9,983,397 | B2 | 5/2018 | Horstmeyer et al. |
| 9,993,149 | B2 | 6/2018 | Chung et al. |
| 9,998,658 | B2 | 6/2018 | Ou et al. |
| 10,162,161 | B2 | 12/2018 | Horstmeyer et al. |
| 10,168,525 | B2 | 1/2019 | Kim et al. |
| 10,222,605 | B2 | 3/2019 | Kim et al. |
| 10,228,550 | B2 | 3/2019 | Ou et al. |
| 10,401,609 | B2 | 9/2019 | Ou et al. |
| 10,419,665 | B2 | 9/2019 | Ou et al. |
| 10,568,507 | B2 | 2/2020 | Chung et al. |
| 10,606,055 | B2 | 3/2020 | Horstmeyer et al. |
| 10,652,444 | | 5/2020 | Horstmeyer et al. |
| 2001/0055062 | A1 | 12/2001 | Shioda et al. |
| 2002/0141051 | A1 | 10/2002 | Vogt et al. |
| 2003/0116436 | A1 | 6/2003 | Amirkhanian et al. |
| 2003/0118223 | A1 | 6/2003 | Rahn et al. |
| 2004/0057094 | A1 | 3/2004 | Olszak et al. |
| 2004/0146196 | A1 | 7/2004 | Van Heel |
| 2004/0190762 | A1 | 9/2004 | Dowski, Jr. et al. |
| 2005/0211912 | A1 | 9/2005 | Fox |
| 2006/0098293 | A1* | 5/2006 | Garoutte ............ G02B 27/0172 359/630 |
| 2006/0158754 | A1 | 7/2006 | Tsukagoshi et al. |
| 2006/0173313 | A1 | 8/2006 | Liu et al. |
| 2006/0291707 | A1 | 12/2006 | Kothapalli et al. |
| 2007/0057184 | A1 | 3/2007 | Uto et al. |
| 2007/0133113 | A1 | 6/2007 | Minabe et al. |
| 2007/0159639 | A1 | 7/2007 | Teramura et al. |
| 2007/0171430 | A1 | 7/2007 | Tearney et al. |
| 2007/0189436 | A1 | 8/2007 | Goto et al. |
| 2007/0206200 | A1 | 9/2007 | Lindner et al. |
| 2007/0269826 | A1 | 11/2007 | Geddes |
| 2008/0101664 | A1 | 5/2008 | Perez |
| 2008/0182336 | A1 | 7/2008 | Zhuang et al. |
| 2009/0046164 | A1 | 2/2009 | Shroff et al. |
| 2009/0079987 | A1 | 3/2009 | Ben-Ezra et al. |
| 2009/0125242 | A1 | 5/2009 | Choi et al. |
| 2009/0284831 | A1 | 11/2009 | Schuster et al. |
| 2009/0316141 | A1 | 12/2009 | Feldkhun |
| 2010/0135547 | A1 | 6/2010 | Lee et al. |
| 2010/0271705 | A1 | 10/2010 | Hung |
| 2011/0075928 | A1 | 3/2011 | Jeong et al. |
| 2011/0181869 | A1 | 7/2011 | Yamaguchi et al. |
| 2011/0192976 | A1 | 8/2011 | Own et al. |
| 2011/0235863 | A1 | 9/2011 | Maiden |
| 2011/0255163 | A1 | 10/2011 | Merrill et al. |
| 2012/0069344 | A1 | 3/2012 | Liu |
| 2012/0099803 | A1 | 4/2012 | Ozcan et al. |
| 2012/0105618 | A1 | 5/2012 | Brueck et al. |
| 2012/0118967 | A1 | 5/2012 | Gerst |
| 2012/0157160 | A1 | 6/2012 | Ozcan et al. |
| 2012/0176673 | A1 | 7/2012 | Cooper |
| 2012/0182541 | A1 | 7/2012 | Canham |
| 2012/0218379 | A1 | 8/2012 | Ozcan et al. |
| 2012/0248292 | A1 | 10/2012 | Ozcan et al. |
| 2012/0250032 | A1 | 10/2012 | Wilde et al. |
| 2012/0281929 | A1 | 11/2012 | Brand et al. |
| 2013/0057748 | A1 | 3/2013 | Duparre et al. |
| 2013/0083886 | A1 | 4/2013 | Carmi et al. |
| 2013/0093871 | A1 | 4/2013 | Nowatzyk et al. |
| 2013/0094077 | A1 | 4/2013 | Brueck et al. |
| 2013/0100525 | A1 | 4/2013 | Chiang et al. |
| 2013/0170767 | A1 | 7/2013 | Choudhury et al. |
| 2013/0182096 | A1 | 7/2013 | Boccara et al. |
| 2013/0223685 | A1 | 8/2013 | Maiden |
| 2014/0007307 | A1 | 1/2014 | Routh, Jr. et al. |
| 2014/0029824 | A1 | 1/2014 | Shi et al. |
| 2014/0043616 | A1 | 2/2014 | Maiden et al. |
| 2014/0050382 | A1 | 2/2014 | Adie et al. |
| 2014/0085629 | A1 | 3/2014 | Bodkin et al. |
| 2014/0118529 | A1 | 5/2014 | Zheng et al. |
| 2014/0126691 | A1 | 5/2014 | Zheng et al. |
| 2014/0133702 | A1 | 5/2014 | Zheng et al. |
| 2014/0139840 | A1 | 5/2014 | Judkewitz et al. |
| 2014/0152801 | A1 | 6/2014 | Fine et al. |
| 2014/0153692 | A1 | 6/2014 | Larkin et al. |
| 2014/0160236 | A1 | 6/2014 | Ozcan et al. |
| 2014/0160488 | A1 | 6/2014 | Zhou |
| 2014/0217268 | A1 | 8/2014 | Schleipen et al. |
| 2014/0267674 | A1 | 9/2014 | Mertz et al. |
| 2014/0347672 | A1 | 11/2014 | Pavillon et al. |
| 2014/0368812 | A1 | 12/2014 | Humphry et al. |
| 2015/0036038 | A1 | 2/2015 | Horstmeyer et al. |
| 2015/0044098 | A1 | 2/2015 | Smart et al. |
| 2015/0054979 | A1* | 2/2015 | Ou ...................... G02B 21/084 348/222.1 |
| 2015/0160450 | A1 | 6/2015 | Ou et al. |
| 2015/0264250 | A1 | 9/2015 | Ou et al. |
| 2015/0286042 | A1 | 10/2015 | Hilbert et al. |
| 2015/0331228 | A1 | 11/2015 | Horstmeyer et al. |
| 2016/0088205 | A1 | 3/2016 | Horstmeyer et al. |
| 2016/0110584 | A1 | 4/2016 | Remiszewski et al. |
| 2016/0156880 | A1 | 6/2016 | Teich et al. |
| 2016/0178883 | A1 | 6/2016 | Horstmeyer et al. |
| 2016/0202460 | A1 | 7/2016 | Zheng |
| 2016/0210763 | A1 | 7/2016 | Horstmeyer et al. |
| 2016/0216208 | A1 | 7/2016 | Kim et al. |
| 2016/0216503 | A1 | 7/2016 | Kim et al. |
| 2016/0320595 | A1 | 11/2016 | Horstmeyer et al. |
| 2016/0320605 | A1 | 11/2016 | Ou et al. |
| 2016/0341945 | A1 | 11/2016 | Ou et al. |
| 2017/0061599 | A1 | 3/2017 | Remiszewski et al. |
| 2017/0146788 | A1 | 5/2017 | Waller et al. |
| 2017/0178317 | A1 | 6/2017 | Besley et al. |
| 2017/0273551 | A1 | 9/2017 | Chung et al. |
| 2017/0299854 | A1 | 10/2017 | Kim et al. |
| 2017/0354329 | A1 | 12/2017 | Chung et al. |
| 2017/0363853 | A1 | 12/2017 | Besley |
| 2017/0371141 | A1 | 12/2017 | Besley |
| 2018/0045569 | A1 | 2/2018 | Nath et al. |
| 2018/0048811 | A1 | 2/2018 | Waller et al. |
| 2018/0078447 | A1 | 3/2018 | Viner et al. |
| 2018/0078448 | A9 | 3/2018 | Shockley, Jr. et al. |
| 2018/0088309 | A1 | 3/2018 | Ou et al. |
| 2018/0120553 | A1 | 5/2018 | Leshem et al. |
| 2018/0231761 | A1 | 8/2018 | Dai et al. |
| 2018/0307017 | A1 | 10/2018 | Horstmeyer et al. |
| 2018/0316855 | A1 | 11/2018 | Ou et al. |
| 2018/0329194 | A1 | 11/2018 | Small et al. |
| 2018/0348500 | A1 | 12/2018 | Naaman, III et al. |
| 2018/0373016 | A1 | 12/2018 | Leshem et al. |
| 2019/0049712 | A1 | 2/2019 | Kim et al. |
| 2019/0056578 | A1 | 2/2019 | Horstmeyer et al. |
| 2019/0077610 | A1 | 3/2019 | Flammann |
| 2019/0097523 | A1 | 3/2019 | Schaefer |
| 2019/0097524 | A1 | 3/2019 | Lin |
| 2019/0137753 | A1 | 5/2019 | Chan et al. |
| 2019/0317311 | A1 | 10/2019 | Kim et al. |

(56) References Cited

U.S. PATENT DOCUMENTS

| | | |
|---|---|---|
| 2019/0331902 A1 | 10/2019 | Ou et al. |
| 2019/0391382 A1 | 12/2019 | Chung et al. |

FOREIGN PATENT DOCUMENTS

| | | |
|---|---|---|
| CN | 1311392 C | 4/2007 |
| CN | 101408623 A | 4/2009 |
| CN | 101680848 A | 3/2010 |
| CN | 101743519 A | 6/2010 |
| CN | 101868740 A | 10/2010 |
| CN | 101872033 A | 10/2010 |
| CN | 101957183 A | 1/2011 |
| CN | 102292662 A | 12/2011 |
| CN | 102608597 A | 7/2012 |
| CN | 102753935 A | 10/2012 |
| CN | 103096804 A | 5/2013 |
| CN | 103154662 A | 6/2013 |
| CN | 103201648 A | 7/2013 |
| CN | 103377746 A | 10/2013 |
| CN | 104101993 A | 10/2014 |
| CN | 104181686 A | 12/2014 |
| CN | 104200449 A | 12/2014 |
| JP | 2007-299604 A | 11/2007 |
| JP | 2008-147629 A | 6/2008 |
| JP | 2010-012222 A | 1/2010 |
| KR | 10-1998-0075050 A | 11/1998 |
| TW | 201428339 A | 7/2014 |
| WO | WO 99/53469 A1 | 10/1999 |
| WO | WO 2002/102128 A1 | 12/2002 |
| WO | WO 2003/062744 A1 | 7/2003 |
| WO | WO 2008/116070 A1 | 9/2008 |
| WO | WO 2011/093043 A1 | 8/2011 |
| WO | WO 2012/037182 A1 | 3/2012 |
| WO | WO 2014/070656 A1 | 5/2014 |
| WO | WO 2015/017730 A1 | 2/2015 |
| WO | WO 2015/027188 A1 | 2/2015 |
| WO | WO 2016/090331 | 6/2016 |
| WO | WO 2016/106379 A1 | 6/2016 |
| WO | WO 2016/118761 A1 | 7/2016 |
| WO | WO 2016/123156 A1 | 8/2016 |
| WO | WO 2016/123157 A1 | 8/2016 |
| WO | WO 2016/149120 A1 | 9/2016 |
| WO | WO 2016/187591 A1 | 11/2016 |
| WO | WO 2017/066198 A1 | 4/2017 |
| WO | WO 2017081539 A1 | 5/2017 |
| WO | WO 2017081540 A1 | 5/2017 |
| WO | WO 2017081542 A2 | 5/2017 |

OTHER PUBLICATIONS

Ou X, Zheng G, Yang C. Embedded pupil function recovery for Fourier ptychographic microscopy. Optics express. Mar. 10, 2014;22(5):4960-72.*
Abrahamsson S, Chen J, Hajj B, Stallinga S, Katsov AY, Wisniewski J, Mizuguchi G, Soule P, Mueller F, Darzacq CD, Darzacq X. Fast multicolor 3D imaging using aberration-corrected multifocus microscopy. Nature methods. Jan. 1, 2013;10(1):60-3.*
Kner P. Phase diversity for three-dimensional imaging. JOSA A. Oct. 1, 2013;30(10):1980-7.*
Jensen EC. Types of imaging, Part 2: an overview of fluorescence microscopy. The Anatomical Record. Oct. 1, 2012;295(10):1621-7. (Year: 2012).*
Sarder P, Nehorai A. Deconvolution methods for 3-D fluorescence microscopy images. IEEE Signal Processing Magazine. May 2006;23(3):32-45. (Year: 2006).*
Williams AJ, Chung J, Ou X, Zheng G, Rawal S, Ao Z, Datar R, Yang C, Cote RJ. Fourier ptychographic microscopy for filtration-based circulating tumor cell enumeration and analysis. Journal of biomedical optics. Jun. 2014;19(6):066007. (Year: 2014).*
Pankajakshan, P., 2009. Blind deconvolution for confocal laser scanning microscopy (Doctoral dissertation, Université Nice Sophia Antipolis). (Year: 2009).*
Soulez F, Denis L, Tourneur Y, Thiebaut É. Blind deconvolution of 3D data in wide field fluorescence microscopy. In2012 9th IEEE International Symposium on Biomedical Imaging (ISBI) May 2, 2012 (pp. 1735-1738). IEEE. (Year: 2012).*
U.S. Appl. No. 15/081,659, filed Mar. 25, 2016 entitled "Fourier Ptychographic Retinal Imaging Methods and Systems".
U.S. Appl. No. 15/160,941, filed May 20, 2016 entitled "Laser-Based Fourier Ptychographic Imaging Systems and Methods".
U.S. Office Action dated Oct. 5, 2015 in U.S. Appl. No. 14/065,305.
U.S. Notice of Allowance dated Dec. 4, 2015 in U.S. Appl. No. 14/065,305.
U.S. Notice of Allowance dated Jan. 14, 2016 in U.S. Appl. No. 14/448,850.
U.S. Notice of Allowance dated Jan. 22, 2016 in U.S. Appl. No. 14/466,481.
U.S. Notice of Allowance dated Apr. 13, 2016 in U.S. Appl. No. 14/448,850.
U.S. Notice of Allowance dated Apr. 22, 2016 in U.S. Appl. No. 14/466,481.
U.S. Office Action dated Jul. 14, 2016 in U.S. Appl. No. 15/007,196.
U.S. Notice of Allowance dated Aug. 23, 2016 in U.S. Appl. No. 14/466,481.
U.S. Office Action dated Aug. 16, 2016 in U.S. Appl. No. 14/065,280.
International Search Report and Written Opinion dated Feb. 21, 2014 in PCT/US2013/067068.
International Preliminary Report on Patentability dated May 14, 2015 in PCT/US2013/067068.
European Third-Party Observations, dated Jan. 20, 2016 in EP Application No. 13851670.3.
European Extended Search Report dated Mar. 31, 2016 in EP Application No. 13851670.3.
International Preliminary Report on Patentability dated Mar. 3, 2016 issued in PCT/US2014/052351.
International Search Report and Written Opinion dated Dec. 5, 2014 issued in PCT/US2014/052351.
International Search Report and Written Opinion dated Nov. 13, 2014 issued in PCT/US2014/049297.
International Preliminary Report on Patentability dated Feb. 11, 2016 issued in PCT/US2014/049297.
International Search Report and Written Opinion dated Feb. 22, 2016 issued in PCT/US2015/064126.
International Search Report and Written Opinion dated Apr. 19, 2016 issued in PCT/US2015/067498.
International Search Report and Written Opinion dated May 4, 2016 issued in PCT/US2016/015001.
International Search Report and Written Opinion dated May 11, 2016 issued in PCT/US2016/015002.
International Search Report and Written Opinion dated Jun. 27, 2016 issued in PCT/US2016/022116.
International Search Report and Written Opinion dated Jun. 30, 2016 issued in PCT/US2016/014343.
"About Molemap," Retrieved Oct. 23, 2015, 2 pages. [http://molemap.net.au/about-us/].
Abramomwitz, M. et al, "Immersion Media," Olympus Microscopy Resource Center, 2012, 6 pp. [http://www.olympusmicro.com/primer/anatomy/immersion.html].
Abramomwitz, M., et al, "Field Curvature," Olympus Microscopy Resource Center, 2012, 3 pp. [http://www.olympusmicro.com/primer/anatomy/fieldcurvature.html].
"Age-Related Macular Degeneration (AMD) | National Eye Institute." [Online]. Available: https://www.nei.nih.gov/eyedata/amd#top. [Accessed: Apr. 5, 2016].
Alexandrov, S., et al, "Spatial information transmission beyond a system's diffraction limit using optical spectral encoding of the spatial frequency," Journal of Optics A: Pure and Applied Optics 10, 025304 (2008).
Alexandrov, S.A., et al, "Synthetic Aperture Fourier holographic optical microscopy," Phys. Rev. Lett. 97, 168102 (2006).
Arimoto, H., et al, "Integral three-dimensional imaging with digital reconstruction," Opt. Lett. 26, 157-159 (2001).
Balan, R., et al, "On signal reconstruction without phase, Applied and Computational Harmonic Analysis 20," No. 3 (2006): 345-356.

(56) References Cited

OTHER PUBLICATIONS

Balan, R., et al, "Painless reconstruction from magnitudes of frame coefficients," J Fourier Anal Appl 15:488-501 (2009).
Bauschke, H.H., et al, "Phase retrieval, error reduction algorithm, and Fienup variants: a view from convex optimization," J Opt Soc Am A 19:1334-1345 (2002).
Becker, S., et al, "Templates for convex cone problems with applications to sparse signal recovery," Technical report, Department of Statistics, Stanford University, (2010), 48 Pages.
Betti, R., et al, "Observational study on the mitotic rate and other prognostic factors in cutaneous primary melanoma arising from naevi and from melanoma de novo," Journal of the European Academy of Dermatology and Venereology, 2014.
Bian, L., et al, "Fourier ptychographic reconstruction using Wirtinger flow optimization," Opt. Express 23:4856-4866 (2015).
Bian, Z., et al, "Adaptive system correction for robust Fourier ptychographic imaging," Optics express, 2013. 21(26): p. 32400-32410.
BioTek® Brochure: BioTek's Multi-Mode Microplate Reading Techonologies, 2016, 2 pp. [http://www.biotek.com].
Bishara, W., et al, "Holographic pixel super-resolution in portable lensless on-chip microscopy using a fiber-optic array," Lab Chip 11(7), 1276-1279 (2011).
Bishara, W., et al, "Lensfree on-chip microscopy over a wide field-of-view using pixel super-resolution," Opt. Express 18(11), 11181-11191 (2010).
Blum, A., et al, "Clear differences in hand-held dermoscopes," JDDG: Journal der Deutschen Dermatologischen Gesellschaft, 2006, 4(12): p. 1054-1057.
Blum, A., et al, Dermatoskopie von Hauttumoren: Auflichtmikroskopie; Dermoskopie; digitale Bildanalyse; mit 28 Tabellen. 2003: Springer DE, Chapter 4 "Dermatoskopisch sichtbare Strukturen" p. 15-66.
Born, M., et al, "Principles of Optics: Electromagnetic theory of propagation, interference and diffraction of light" 7th Ed., Cambridge Univ. Press, (1999) pp. 1-31.
Brady, D., et al, "Multiscale gigapixel photography," Nature 486, 386-389 (2012).
Burer, S., et al, "A nonlinear programming algorithm for solving semidefinite programs via low-rank factorization," Math Program, Ser B 95:329-357 (2003).
Burer, S., et al, "Local minima and convergence in low-rank semidefinite programming. Math Program," Ser A 103:427-444 (2005).
Candes, E.J., et al, "Phase retrieval via matrix completion," SIAM J. Imaging Sci. 6:199-225 (2012).
Candes, E.J., et al, "Phase retrieval via Wirtinger flow: theory and algorithms," IEEE Trans. Info. Theory 61:1985-2007 (2015).
Candes, E.J., et al, "PhaseLift: exact and stable signal recovery from magnitude measurements via convex programming.," Comm Pure Appl Math 66:1241-1274 (2013).
Carroll, J., "Adaptive optics retinal imaging: applications for studying retinal degeneration," Arch. Ophthalmol., vol. 126, pp. 857-858, 2008.
Chao, W. et al, "Soft X-ray microscopy at a spatial resolution better than 15 nm," Nature Letters, vol. 435/30, Jun. (2005) pp. 1210-1213.
Chen, T., et al, "Polarization and phase shifting for 3D scanning of translucent objects," Proc. CVPR, (2007).
Chin, L., et al, "Malignant melanoma: genetics and therapeutics in the genomic era," Genes & development, 2006, 20(16): p. 2149-2182.
Choi, W., et al, "Tomographic phase microscopy," Nature Methods 4(9) (2007), pp. 1-3 Published Online Aug. 12, 2007.
Chung, J., et al, "Counting White Blood Cells from a Blood Smear Using Fourier Ptychographic Microscopy," PLoS One 10(7), e0133489 (2015).
Chung, J., et al, "Wide field-of-view fluorescence image deconvolution with aberration-estimation from Fourier ptychography," Feb. 1, 2016, vol. 7, No. 2, Biomedical Optics Express 352.

Colomb, T., et al, "Automatic procedure for aberration compensation in digital holographic microscopy and applications to specimen shape compensation," Appl. Opt. 45, 851-863 (2006).
De Sa, C., et al, "Global convergence of stochastic gradient descent for some non convex matrix problems," Proc. 32nd Int. Conf. Machine Learning (2015), 10 pp.
Debailleul, M., et al, "High-resolution three-dimensional tomographic diffractive microscopy of transparent inorganic and biological samples," Optic Letters 34 (2008).
Denis, L., et al, "Inline hologram reconstruction with sparsity constraints," Opt. Lett. 34, pp. 3475-3477 (2009).
Di, J., et al, "High resolution digital holographic microscopy with a wide field of view based on a synthetic aperture technique and use of linear CCD scanning," Appl. Opt. 47, pp. 5654-5659 (2008).
Dierolf, M., et al, "Ptychographic coherent diffractive imaging of weakly scattering specimens," New J. Phys. 12, 035017 (2010).
Dierolf, M., et al, "Ptychographic X-ray computed tomography at the nanoscale," Nature, vol. 467, pp. 436-439, (2010).
"Doctor Mole—Skin Cancer App," Retrieved Oct. 23, 2015, 1 page. [http://www.doctormole.com].
Dong, S., et al, "FPscope: a field-portable high-resolution microscope using a cellphone lens," Biomed. Opt. Express 5(10), 3305-3310 (2014).
Dong, S., et al, "High-resolution fluorescence imaging via pattern-illuminated Fourier ptychography," Opt. Express 22(17), 20856-20870 (2014).
Dong, S., et al, "Aperture-scanning Fourier ptychography for 3D refocusing and super-resolution macroscopic imaging," pp. 13586-13599 (Jun. 2, 2014).
Eldar, Y.C., et al, "Sparse phase retrieval from short-time Fourier measurements," IEEE Signal Processing Letters 22, No. 5 (2015): 638-642.
Emile, O., et al, "Rotating polarization imaging in turbid media," Optics Letters 21(20), (1996).
Faulkner, H.M.L., and Rodenburg, J.M., "Error tolerance of an iterative phase retrieval algorithm for moveable illumination microscopy," Ultramicroscopy 103(2), 153-164 (2005).
Faulkner, H.M.L., and Rodenburg, J.M., "Movable aperture lensless transmission microscopy: a novel phase retrieval algorithm," Phys. Rev. Lett. 93, 023903 (2004).
Fazel, M., "Matrix rank minimization with applications," PhD Thesis (Stanford University, Palo Alto, CA). (2002).
Feng, P., et al, "Long-working-distance synthetic aperture Fresnel off-axis digital holography," Optics Express 17, pp. 5473-5480 (2009).
Fienup, J. R., "Invariant error metrics for image reconstruction," Appl. Opt. 36(32), 8352-8357 (1997).
Fienup, J. R., "Lensless coherent imaging by phase retrieval with an illumination pattern constraint," Opt. Express 14, 498-508 (2006).
Fienup, J. R., "Phase retrieval algorithms: a comparison," Appl. Opt. 21, 2758-2769 (1982).
Fienup, J. R., "Reconstruction of a complex-valued object from the modulus of its Fourier transform using a support constraint," J. Opt. Soc. Am. A 4, 118-123 (1987).
Fienup, J. R., "Reconstruction of an object from the modulus of its Fourier transform," Opt. Lett. 3, 27-29 (1978).
Gan, X., et al, "Image enhancement through turbid media under a microscope by use of polarization gating methods," JOSA A 16(9), (1999).
Gerke T.D., et al, "Aperiodic volume optics," Nature Photonics (2010), vol. 4, pp. 188-193.
Ghosh, A., et al, "Multiview face capture using polarized spherical gradient illumination," ACM Transactions on Graphics 30(6) (2011).
Godara, P., et al, "Adaptive optics retinal imaging: emerging clinical applications.," Optom. Vis. Sci., vol. 87, No. 12, pp. 930-941, Dec. 2010.
Goodman, J.W., "Introduction to Fourier Optics," Roberts & Company Publication, Third Edition, chapters 1-6, pp. 1-172 (2005).
Goodson, A.G., et al, "Comparative analysis of total body and dermatoscopic photographic monitoring of nevi in similar patient populations at risk for cutaneous melanoma," Dermatologic Surgery, 2010. 36(7): p. 1087-1098.

(56) References Cited

OTHER PUBLICATIONS

Granero, L., et al, "Synthetic aperture superresolved microscopy in digital lensless Fourier holography by time and angular multiplexing of the object information," Appl. Opt. 49, pp. 845-857 (2010).
Grant, M., et al, "CVX: Matlab software for disciplined convex programming," version 2.0 beta. http://cvxr.com/cvx, (Sep. 2013), 3 pages.
Greenbaum, A., et al, "Field-portable wide-field microscopy of dense samples using multi-height pixel super resolution based lensfree imaging," Lab Chip 12(7), 1242-1245 (2012).
Greenbaum, A., et al, "Increased space—bandwidth product in pixel super-resolved lensfree on-chip microscopy," Sci. Rep. 3, p. 1717 (2013).
Gruev, V., et al, "Dual-tier thin film polymer polarization imaging sensor," Optics Express, vol. 18, No. 18, 12 pages (2010).
Guizar-Sicairos, M., and Fienup, J.R.,"Phase retrieval with transverse translation diversity: a nonlinear optimization approach," Opt. Express 16, 7264-7278 (2008).
Gunturk, B.K., et al, "Image Restoration: Fundamentals and Advances," vol. 7, Chapter 3, pp. 63-68 (CRC Press, 2012).
Gustafsson, M.G.L., "Surpassing the lateral resolution limit by a factor of two using structured illumination microscopy," J. Microsc. 198, 82-87 (2000).
Gutzler, T., et al "Coherent aperture-synthesis, wide-field, high-resolution holographic microscopy of biological tissue," Opt. Lett. 35, pp. 1136-1138 (2010).
Haigh, S. J., et al, (2009) "Atomic structure imaging beyond conventional resolution limits in the transmission electron microscope"; Physical Review Letters 103. 126101-1 126101-4.
Han, C., et al, "Wide Field-of-View on-Chip Talbot Fluorescence Microscopy for Longitudinal Cell Culture Monitoring from within the Incubator" Anal. Chem. 85(4), 2356-2360 (2013).
Hillman, T.R., et al, "High-resolution, wide-field object reconstruction with synthetic aperture Fourier holographic optical microscopy," Opt. Express 17, pp. 7873-7892 (2009).
Hofer, H., et al, "Dynamics of the eye's wave aberration," J. Opt. Soc. Am. A, vol. 18, No. 3, p. 497, 2001.
Hofer, H., et al, "Organization of the human trichromatic cone mosaic.," J. Neurosci., vol. 25, No. 42, pp. 9669-9679, Oct. 2005.
Hong, S-H., et al, "Three-dimensional volumetric object reconstruction using computational integral imaging," Opt. Express 12, 483-491 (2004).
Hoppe, W., "Diffraction in inhomogeneous primary wave fields. 1. Principle of phase determination from electron diffraction interference," Acta Crystallogr. A25, 495-501 1969.
Horstmeyer, R., et al, "A phase space model of Fourier ptychographic microscopy," Optics Express, 2014. 22(1): p. 338-358.
Horstmeyer, R., et al, "Digital pathology with fourier ptychography," Comput. Med. Imaging Graphics 42, 38-43 (2015).
Horstmeyer, R., et al, "Overlapped fourier coding for optical aberration removal," Manuscript in preparation, 19 pages (2014).
Horstmeyer, R., et al, "Solving ptychography with a convex relaxation," Physics Optics (2014) 1-8 pages.
Hüe, F., et al, "Wave-front phase retrieval in transmission electron microscopy via ptychography," Phys. Rev. B 82, 121415 (2010).
Humphry, M., et al, "Ptychographic electron microscopy using high-angle dark-field scattering for sub-nanometre resolution imaging," Nat. Commun. 3, 730 (2012).
IncuCyte® ZOOM System, Brochure, 1-4 pp. (2016) (retrieved Feb. 25, 2016), [http://www.essenbioscience.com/media/uploads/files/8000-0333-E00-IncuCyte_ZOOM_brochure.pdf].
Jaganathan, K., et al, "Recovery of sparse 1-D signals from the magnitudes of their Fourier transform," IEEE International Symposium on Information Theory Proceedings (2012): 1473-1477.
Jaganathan, K., et al, "Phase retrieval with masks using convex optimization," IEEE International Symposium on Information Theory Proceedings (2015): 1655-1659.
Jaganathan, K., et al, "STFT Phase retrieval: uniqueness guarantees and recovery algorithms," arXiv preprint arXiv:1508.02820 (2015).
Joeres, S., et al, "Retinal imaging with adaptive optics scanning laser ophthalmoscopy in unexplained central ring scotoma.," Arch. Ophthalmol., vol. 126, No. 4, pp. 543-547, Apr. 2008.
Jung, J.H., et al, "Microfluidic-integrated laser-controlled microactuators with on-chip microscopy imaging functionality," Lab Chip 14 (19), Oct. 7, 2014, pp. 3781-3789.
Kay, D. B., et al, "Outer retinal structure in best vitelliform macular dystrophy.," JAMA Ophthalmol., vol. 131, pp. 1207-1215, 2013.
Kim, J., et al, Incubator embedded cell culture imaging system (EmSight) based on Fourier ptychographic microscopy. EmSight manuscript, Optical Society of America, 2015.
Kim, M., et al, "High-speed synthetic aperture microscopy for live cell imaging," Opt. Lett. 36, pp. 148-150 (2011).
Kirkland, A.I., et al, "Multiple beam tilt microscopy for super resolved imaging;" Japanese Society of Electron Microscopy: Journal of Electron Microscopy I: 11-22(1997), vol. 46, No. 1 1997.
Kirkland, A.I., et al, "Super-resolution by aperture synthesis: tilt series reconstruction in CTEM," Ultramicroscopy 57, (1995) 355-374, Received May 27, 1994, in final form Oct. 2, 1994; 1995 Elsevier Science B.V. SSDI 0304-3991(94)00191-x.
Kittler, H., et al, "Morphologic changes of pigmented skin lesions: a useful extension of the ABCD rule for dermatoscopy," Journal of the American Academy of Dermatology, 1999. 40(4): p. 558-562.
Kozak, I., "Retinal imaging using adaptive optics technology.," Saudi J. Ophthalmol. Off. J. Saudi Ophthalmol. Soc., vol. 28, No. 2, pp. 117-122, Apr. 2014.
Lauer, V., "New Approach to optical diffraction tomography yielding a vector equation of diffraction tomography and a novel tomography microscope," Journal of Microscopy, vol. 205, Pt 2 Feb. 2002, pp. 165-176, The Royal Microscopical Society 2001.
Lee, K., et al, "Synthetic Fourier transform light scattering," Optics Express 21 (2013).
Levoy, M., et al, "Light field microscopy," ACM Trans. Graphics 25, (2006).
Levoy, M., et al, "Recording and controlling the 4D light field in a microscope using microlens arrays," J. Microsc. 235 (2009).
Li, X., et al, "Sparse signal recovery from quadratic measurements via convex programming," SIAM Journal on Mathematical Analysis 45, No. 5 (2013): 3019-3033.
Lohmann, A. W., et al, "Space—bandwidth product of optical signals and systems," J. Opt. Soc. Am. A 13, pp. 470-473 (1996).
Lue, N., et al, "Live Cell Refractometry Using Hilbert Phase Microscopy and Confocal Reflectance Microscopy," The Journal of Physical Chemistry A, 113, pp. 13327-13330 (2009).
LUXEXCEL® Brochure, LUXEXCEL: 3D Printing Service Description, Retrieved Mar. 7, 2016, 5 pp. [http://www.luxexcel.com].
"Lytro," Retrieved Oct. 23, 2015, 6 pp. [https://www.lytro.com/].
Ma, W., et al, "Rapid Acquisition of Specular and Diffuse Normal Maps from Polarized Spherical Gradient Illumination," University of Southern California, Institute for Creative Technologies, 12 pages (2007).
Mahajan, V. N., "Zernike circle polynomials and optical aberrations of systems with circular pupils," Appl. Opt. 33(34), 8121-8124 (1994).
Maiden, A. M., et al, "A new method of high resolution, quantitative phase scanning microscopy," in: M.T. Postek, D.E. Newbury, S.F. Platek, D.C. Joy (Eds.), SPIE Proceedings of Scanning Microscopy, 7729, 2010.
Maiden, A. M., "An improved ptychographical phase retrieval algorithm for diffractive imaging," Ultramicroscopy 109(10), 1256-1262 (2009).
Maiden, A. M., et al, "Superresolution imaging via ptychography," Journal of the Optical Society of America A. Apr. 2011, vol. 28 No. 4, pp. 604-612.
Maiden, A. M., et al, "Optical ptychography: a practical implementation with useful resolution," Opt. Lett. 35, 2585-2587 (2010).
Marchesini S., "A unified evaluation of iterative projection algorithms for phase retrieval," Rev Sci Instrum 78:011301 (2007).
Marchesini S., et al, "Augmented projections for ptychographic imaging," Inverse Probl 29:115009 (2013).
Marrison, J., et al, "Ptychography—a label free, high-contrast imaging technique for live cells using quantitative phase information," Sci. Rep. 3, 2369 (2013).

(56) References Cited

OTHER PUBLICATIONS

Medoff, B.P., et al, "Iterative convolution backprojection algorithms for image reconstruction from limited data," J. Opt. Soc. Am. vol. 73, No. 11, Nov. 1983, pp. 1493-1500.

"Melafind," Retrieved Oct. 23, 2015, 4 pages. [http://www.melafind.com/].

Meyer, R.R., et al, "A method for the determination of the wave aberration function of high-resolution TEM," Ultramicroscopy 99 (2004) 115-123: Elsevier B.V. Doi: 10.1016/j.ultramic.2003.11.001.

Miao, J., et al, "High Resolution 3D X-Ray Diffraction Microscopy," Physical Review Letters, Aug. 19, 2002, vol. 89, No. 8, pp. 1-4.

Mico, V., et al, "Synthetic aperture microscopy using off-axis illumination and polarization coding," Optics Communications, pp. 276, 209-217 (2007).

Mico, V., et al, "Synthetic aperture superresolution with multiple off-axis holograms," JOSA A 23, pp. 3162-3170 (2006).

Mir, M. et al, "Optical measurement of cycle-dependent cell growth," Proceedings of the National Academy of Sciences 108, pp. 13124-13129 (2011).

Mir, M., et al, "Blood screening using diffraction phase cytometry," Journal of Biomedical Optics 15, pp. 027016-027014 (2010).

Moreno, I., "Creating a desired lighting pattern with an LED array," 8th International Conference on Solid State Lighting, Proceedings of SPIE, vol. 7058, 2008, 9 pp.

Mrejen, S., et al, "Adaptive optics imaging of cone mosaic abnormalities in acute macular neuroretinopathy.," Ophthalmic Surg. Lasers Imaging Retina, vol. 45, No. 6, pp. 562-569, Jan. 2014.

Nayar, S. K., et al, "Fast separation of direct and global components of a scene using high frequency illumination," ACM Transactions on Graphics 25(3) (2006).

Ng, R., et al, "Light field photography with a hand-held plenoptic camera", Computer Science Technical Report CSTR, 2005. 2(11).

Nomura, H., and Sato, T., "Techniques for measuring aberrations in lenses used in photolithography with printed patterns," Appl. Opt. 38(13), 2800-2807 (1999).

Ohlsson, H., et al, "Compressive phase retrieval from squared output measurements via semidefinite programming," arXiv:1111.6323 (2011).

Ou, X., et al, "High numerical aperture Fourier ptychography: principle, implementation and characterization," Opt. Express 23:3472-3491 (2015).

Ou, X., et al, "Quantitative phase imaging via Fourier ptychographic microscopy," Optics Letters, 2013. 38(22): p. 4845-4848.

Ou. X., et al, "Embedded pupil function recovery for Fourier ptychographic microscopy," Optics Express 22 (5), pp. 4960-4972 (2014), with Erratum (2015).

Ou. X., et al, "Embedded pupil function recovery for Fourier ptychographic microscopy," submitted Dec. 26, 2013; 13 pp.

Pacheco, S., et al, "Reflective Fourier Ptychography," J. Biomed. Opt. 21(2), pp. 026010-1-026010-7, (Feb. 18, 2016). [http://biomedicaloptics.spiedigitallibrary.org].

Recht, B., et al, "Guaranteed minimum-rank solutions of linear matrix equations via nuclear norm minimization," SIAM Review 52, No. 3 (2010): 471-501.

Reinhard, E., et al, "High Dynamic Range Imaging: Acquisition, Display, and Image-based Lighting" (Morgan Kaufmann, 2010).

Rodenburg, J. M., et al, "A phase retrieval algorithm for shifting illumination," Appl. Phys. Lett. 85, 4795-4797 (2004).

Rodenburg, J. M., et al, "Hard-X-ray lensless imaging of extended objects," Phys. Rev. Lett. 98, 034801 (2007).

Rodenburg, J. M., et al, "The theory of super-resolution electron microscopy via Wigner-distribution deconvolution," Phil. Trans. R. Soc. Lond. A 339, 521-553 (1992).

Rodenburg, J., "Ptychography and related diffractive imaging methods," Adv. Imaging Electron Phys.150, 87-184 (2008).

Rossi, E.A., et al, "In vivo imaging of retinal pigment epithelium cells in age related macular degeneration.," Biomed. Opt. Express, vol. 4, No. 11, pp. 2527-2539, Jan. 2013.

Rowe, M., et al, "Polarization-difference imaging: a biologically inspired technique for observation through scattering media," Optics Letters, vol. 20, No. 6, 3 pages (1995).

Schechner, Y., "Multiplexing for Optimal Lighting," IEEE Transactions on Pattern Analysis and Machine Intelligence, vol. 29, No. 8, 1339-1354 (2007).

Schnars, U., et al, "Digital recording and numerical reconstruction of holograms," Measurement Science and Technology, 13, R85 (2002).

Schwarz, C., et al, "Imaging interferometric microscopy," Optics letters 28, pp. 1424-1426 (2003).

Shechner, Y., et al, "Polarization-based vision through haze," Applied Optics 42(3), (2003).

Shechtman, Y., et al, "Sparsity based sub-wavelength imaging with partially incoherent light via quadratic compressed sensing," Opt Express 19:14807-14822 (2011).

Siegel, R., et al, "Cancer statistics 2013," CA: a cancer journal for clinicians, 2013. 63(1): p. 11-30.

Stoecker, W., et al, "Diagnostic Inaccuracy of Smartphone Applications for Melanoma Detection: Representative Lesion Sets and the Role for Adjunctive Technologies," JAMA Dermatology, 2013. 149(7): p. 884.

Sun, D., et al., "Estimating a signal from a magnitude spectrogram via convex optimization," arXiv:1209.2076 (2012).

Sun, J., et al, "Coded multi-angular illumination for Fourier ptychography based on Hadamard codes," 5 pages (2015).

Tam, K., et al, "Tomographical imaging with limited-angle input," J. Opt. Soc. Am. 21 (1981).

Thibault, P. et al, "Probe retrieval in ptychographic coherent diffractive imaging," Ultramicroscopy 109(4), 338-343 (2009).

Thibault, P., et al, "High-resolution scanning X-ray diffraction microscopy," Science 321, 2008, pp. 379-382.

Thomas, L., et al, "Semiological value of ABCDE criteria in the diagnosis of cutaneous pigmented tumors," Dermatology, 1998. 197(1): p. 11-17.

Tian, L., et al, "Multiplexed Coded Illumination for Fourier Ptychography with an LED Array Microscope," Optical Society of America, 14 pages (2014).

Tippie, A.E., et al, "High-resolution synthetic-aperture digital holography with digital phase and pupil correction," Opt. Express 19, pp. 12027-12038 (2011).

Turpin, T., et al, "Theory of the synthetic aperture microscope," pp. 230-240 (1995).

Tyson, R., "Principles of Adaptive Optics" (CRC Press, 2010).

Vulovic, M., et al, "When to use the projection assumption and the weak-phase object approximation in phase contrast cryo-EM," Ultramicroscopy 136 (2014) 61-66.

Waldspurger, I., et al, "Phase recovery, maxcut and complex semidefinite programming," Mathematical Programming 149, No. 1-2 (2015): 47-81.

Wang, Q., et al, "Adaptive Optics Microperimetry and OCT Images Show Preserved Function and Recovery of Cone Visibility in Macular Telangiectasia Type 2 Retinal Lesions," Invest. Ophthalmol. Vis. Sci., vol. 56, pp. 778-786 (2015).

Wang, Z., et al, "Tissue refractive index as marker of disease," Journal of Biomedical Optics 16, 116017-116017 (2011).

Watanabe, M., et al, "Telecentric optics for focus analysis," IEEE trans. pattern. anal. mach. intell., 19 1360-1365 (1997).

Wesner, J., et al, "Reconstructing the pupil function of microscope objectives from the intensity PSF," in Current Developments in Lens Design and Optical Engineering III, R. E. Fischer, W. J. Smith, and R. B. Johnson, eds., Proc. SPIE 4767, 32-43 (2002).

Williams, A., et al, "Fourier ptychographic microscopy for filtration-based circulating tumor cell enumeration and analysis," J. Biomed. Opt. 19(6), 066007 (2014).

Wolf, J., et al, "Diagnostic Inaccuracy of Smartphone Applications for Melanoma Detection," JAMA Dermatology, 2013, 149(7): p. 885-885.

Wu, J., et al, "Focal plane tuning in wide-field-of-view microscope with Talbot pattern illumination," Opt. Lett. 36, 2179-2181 (2011).

Wu, J., et al, "Wide field-of-view microscope based on holographic focus grid illumination," Opt. Lett. 35, 2188-2190 (2010).

(56) References Cited

OTHER PUBLICATIONS

Xu, W., et al., "Digital in-line holography for biological applications," Proc. Natl Acad. Sci. USA 98, pp. 11301-11305 (2001).
Yuan, C., et al, "Angular multiplexing in pulsed digital holography for aperture synthesis," Optics Letters 33, pp. 2356-2358 (2008).
Zeiss, C., "Microscopy, Cells Need the Perfect Climate, System Solutions for Live Cell Imaging under Physiological Conditions," printed Feb. 2008, 1-42 pgs.
Zhang, Y., et al, "Self-learning based fourier ptychographic microscopy," Optics Express, 16pgs (2015).
Zhang, Y., et al, "Photoreceptor Perturbation Around Subretinal Drusenoid Deposits as Revealed by Adaptive Optics Scanning Laser Ophthalmoscopy," Am. J. Ophthalmol., vol. 158, No. 3, pp. 584-596, 2014.
Zheng, G., et al, "Characterization of spatially varying aberrations for wide field-of-view microscopy," Opt. Express 21, 15131-15143 (2013).
Zheng, G., et al, "Microscopy refocusing and dark-field imaging by using a simple LED array," Opt. Lett. 36, 3987-3989 (2011).
Zheng, G., et al, "0.5 gigapixel microscopy using a flatbed scanner," Biomed. Opt. Express 5, 1-8 (2014).
Zheng, G., et al, "Sub-pixel resolving optofluidic microscope for on-chip cell imaging," Lab Chip 10, pp. 3125-3129 (2010).
Zheng, G. "The ePetri dish, an on-chip cell imaging platform based on subpixel perspective sweeping microscopy (SPSM)," Proc. Natl. Acad. Sci. USA 108, pp. 16889-16894 (2011).
Zheng, G., et al, "Wide-field, high-resolution Fourier ptychographic microscopy," Nature Photonics, vol. 7, pp. 739-745, Published Online Jul. 28, 2013 at www.nature.com/naturephotonics.
Chung, J., et al, "Wide-field Fourier ptychographic microscopy using laser illumination source," Optical Society of America, 13 pgs., Mar. 23, 2016.
Guo, K., et al, "Optimization of sampling pattern and the design of Fourier ptychographic illuminator," Optical Society of America; Optics Express , vol. 23, No. 5, pp. 6171-6180 (2015).
Phillips, Z., et al, "Multi-Contrast Imaging and Digital Refocusing on a Mobile Microscope with a Domed LED Array," PLoS One, 10 (5), pp. 1-13 (2015).
Horstmeyer, R., et al, "Standardizing the resolution claims for coherent microscopy," Nature Photonics, vol. 10, pp. 68-71, Feb. 2016.
Horstmeyer, R., et al, "Solving ptychography with a convex relaxation," New Journal of Physics, vol. 17 (2015) 1-14 pages.
Preliminary Amendment dated Mar. 17, 2014 filed in U.S. Appl. No. 14/065,280.
Preliminary Amendment dated Apr. 25, 2016 filed in U.S. Appl. No. 14/710,947.
Preliminary Amendment dated Nov. 28, 2016 filed in U.S. Appl. No. 15/206,859.
Preliminary Amendment dated Mar. 17, 2014 filed in U.S. Appl. No. 14/065,305.
Preliminary Amendment dated Nov. 28, 2016 filed in U.S. Appl. No. 15/209,604.
U.S. Office Action dated Sep. 16, 2016 I U.S. Appl. No. 14/065,305.
U.S. Notice of Allowance dated Nov. 2, 2016 in U.S. Appl. No. 14,572,493.
U.S. Office Action dated Nov. 22, 2016 in U.S. Appl. No. 15/003,559.
U.S. Supplemental Notice of Allowance dated Dec. 12, 2016 in U.S. Appl. No. 14/572,493.
U.S. Notice of Allowance dated Jan. 13, 2017 in U.S. Appl. No. 14/065,305.
U.S. Final Office Action dated Jan. 23, 2017 in U.S. Appl. No. 15/007,196.
U.S. Office Action dated Feb. 21, 2017 in U.S. Appl. No. 14/960,252.
U.S. Notice of Allowance dated Mar. 8, 2017 in U.S. Appl. No. 14/572,493.
U.S. Office Action dated Mar. 13, 2017 in U.S. Appl. No. 14/658,019.
U.S. Notice of Allowance dated Mar. 22, 2017 in U.S. Appl. No. 15/007,196.
U.S. Office Action dated Mar. 24, 2017 in U.S. Appl. No. 14/710,947.
U.S. Notice of Allowance dated Mar. 31, 2017 in U.S. Appl. No. 14/572,493.
U.S. Final Office Action dated Apr. 3, 2017 in U.S. Appl. No. 14/065,280.
U.S. Notice of Allowance dated Jun. 9, 2017 in U.S. Appl. No. 14/065,305.
U.S. Notice of Allowance dated Jun. 9, 2017 in U.S. Appl. No. 15/206,859.
U.S. Notice of Allowance dated Jun. 9, 2017 in U.S. Appl. No. 15/007,196.
U.S. Notice of Allowance dated Jun. 20, 2017 in U.S. Appl. No. 14/572,493.
U.S. Supplemental Notice of Allowance dated Jun. 28, 2017 in U.S. Appl. No. 15/206,859.
U.S. Final Office Action dated Jul. 27, 2017 in U.S. Appl. No. 15/003,559.
U.S. Notice of Allowance dated Aug. 16, 2017 in U.S. Appl. No. 15/209,604.
Office Action dated Aug. 31, 2017 in U.S. Appl. No. 15/636,494.
U.S. Notice of Allowance dated Sep. 1, 2017 in U.S. Appl. No. 15/206,859.
Office Action dated May 19, 2017 in U.S. Appl. No. 15/081,659.
Notice of Allowance dated Sep. 20, 2017 in U.S. Appl. No. 15/007,196.
Notice of Allowance dated Oct. 11, 2017 in U.S. Appl. No. 14/572,493.
Notice of Allowance dated Oct. 20, 2017 in U.S. Appl. No. 15/081,659.
Office Action dated Nov. 30, 2017 in U.S. Appl. No. 15/007,159.
Notice of Allowance dated Dec. 4, 2017 in U.S. Appl. No. 14/065,305.
Final Office Action dated Dec. 14, 2017 in U.S. Appl. No. 14/960,252.
Final Office Action dated Dec. 28, 2017 in U.S. Appl. No. 14/710,947.
Final Office Action dated Jan. 17, 2018 in U.S. Appl. No. 14/658,019.
Notice of Allowance dated Jan. 23, 2018 in U.S. Appl. No. 15/206,859.
Office Action dated Jan. 25, 2018 in U.S. Appl. No. 14/065,280.
Notice of Allowance dated Jan. 26, 2018 in U.S. Appl. No. 15/209,604.
Notice of Allowance dated Feb. 9, 2018 in U.S. Appl. No. 15/081,659.
Office Action dated Apr. 4, 2018 issued in U.S. Appl. No. 15/003,559.
Office Action dated Apr. 13, 2018 issued in U.S. Appl. No. 15/160,941.
International Search Report and Written Opinion dated Sep. 5, 2016 issued in PCT/US2016/033638.
Chinese Office Action [Description in English] dated May 31, 2016 issued in Application No. CN 201380068831.6.
Chinese Office Action dated Dec. 13, 2016 issued in Application No. CN201480057911.6.
Extended European Search Report dated Feb. 16, 2017 issued in Application No. 14837844.1.
Extended European Search Report dated Feb. 15, 2017 issued in Application No. 14832857.8.
Chinese Second Office Action [Description in English] dated Jan. 22, 2017 issued in Application No. CN201380068831.6.
International Preliminary Report on Patentability dated Jun. 15, 2017 issued in Application No. PCT/US2015/064126.
European Office Action dated May 16, 2017 issued in European Patent Application No. 13851670.3.
International Preliminary Report on Patentability dated Jul. 6, 2017 issued in Application No. PCT/US2015/067498.
International Preliminary Report on Patentability dated Aug. 3, 2017 issued in Application No. PCT/US2016/014343.
International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
Chinese Third Office Action [Summary in English] dated Jul. 24, 2017 issued in Application No. 201380068831.6.
Chinese First Office Action [Summary in English] dated Aug. 2, 2017 issued in Application No. CN 201480054301.0.
Australian Office Action dated Sep. 18, 2017 issued in Application No. AU 2014296034.
International Preliminary Report on Patentability dated Sep. 28, 2017 issued in Application No. PCT/US2016/022116.
Japanese Office Action dated Oct. 17, 2017 issued in Application No. 2015-539884.

(56) References Cited

OTHER PUBLICATIONS

Chinese Office Action [Summary in English] dated Oct. 26, 2017 issued in CN 201480057911.6.
International Preliminary Report on Patentability dated Nov. 30, 2017 issued in PCT/US2016/033638.
Australian Examination Report 1/Office Action dated Jan. 18, 2018 issued in AU 2014308673.
Chinese First Office Action dated Feb. 24, 2018 issued in CN 201680003937.1.
Bian, L., et al, "Fourier ptychographic reconstruction using Poisson maximum likelihood and truncated Wirtinger gradient," Nature Publishing Group; Scientific Reports, vol. 6, No. 27384, Jun. 10, 2016, pp. 1-10. <doi: 10.1038/srep27384>.
Bunk, O., et al, "Influence of the overlap parameter on the convergence of the ptychographical iterative engine," Ultramicroscopy, vol. 108, (2008), pp. 481-487. <doi:10.1016/j.ultramic.2007.08.003>.
Chai, A., et al, "Array imaging using intensity-only measurements," IOP Publishing: Inverse Problems, vol. 27, No. 1, Jan. 2011, pp. 1-16. <doi:10.1088/0266-5611/27/1/015005>.
Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. <doi:10.1126/sciadv.1602564> [retrieved on Nov. 28, 2017] <URL:http://advances.sciencemag.org/>.
Horstmeyer, R., et al, "Diffraction tomography with Fourier ptychography," Optica, Optical Society of America, vol. 3, No. 8, Aug. 2016, pp. 827-835. <doi:10.1364/OPTICA.3.000827>.
Kawata, S. et al, "Optical microscope tomography. I. Support constraint," Journal Optical Society America A, vol. 4, No. 1, Jan. 1987, pp. 292-297. <doi:10.1364/JOSAA.4.000292>.
Kim, M., et al, "High-speed synthetic aperture microscopy for live cell imaging," Optics Letters, vol. 36, No. 2, Jan. 15, 2011, pp. 148-150. <doi:10.1364/OL.36.000148>.
Lu, H., et al, "Quantitative phase imaging and complex field reconstruction by pupil modulation differential phase contrast," Optics Express, vol. 24, No. 22, Oct. 31, 2016, pp. 25345-25361. <doi:10.1364/OE.24.025345>.
Ou, X., et al, "Aperture scanning Fourier ptychographic microscopy," Biomedical Optics Express, vol. 7, No. 8, Aug. 1, 2016, pp. 3140-3150. <doi:10.1364/BOE.7.003140>.
Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. <doi:10.1109/ICCPhot.2012.6215212>.
Tian, L., et al, "3D differential phase-contrast microscopy with computational illumination using an LED array," Optics Letters, vol. 39, No. 5, Mar. 1, 2014, pp. 1326-1329. <doi:10.1364/OL39.001326>.
Tian, L., et al, "Computational illumination for high-speed in vitro Fourier ptychographic microscopy," Optica: Research Article, vol. 2, No. 10, Oct. 14, 2015, pp. 904-911. <doi:10.1364/OPTICA.2.000904>.
Wills, S., "Synthetic Apertures for the Optical Domain," Optics & Photonics News Article [webpage], The Optical Society (OSA), Apr. 18, 2017, pp. 2. <URL:https://www.osa-opn.org/home/newsroom/2017/april/synthetic_apertures_for_the_optical_domain/>.
Wu, J., et al, "Harmonically matched grating-based full-field quantitative high-resolution phase microscope for observing dynamics of transparent biological samples," Optics Express, vol. 15, No. 26, Dec. 24, 2007, pp. 18141-18155. <doi:10.1364/OE.15.018141>.
Wu, J., et al, "Paired-angle-rotation scanning optical coherence tomography forward-imaging probe," Optics Letters, vol. 31, No. 9, May 1, 2006, pp. 1265-1267. <doi:10.1364/OL.31.001265>.
Yeh, et al., "Experimental robustness of Fourier ptychography phase retrieval algorithms," Optics Express, vol. 23, No. 26, Dec. 28, 2015, pp. 33214-33240. <doi: 10.1364/OE.23.033214>.

Zheng, G., "Fourier Ptychographic Imaging: A MATLAB tutorial," IOP Concise Physics, Morgan & Claypool Publication, San Rafael, CA., May 2016, pp. 96. <ISBN: 978-1-6817-4272-4 (ebook)> <doi:10.1088/978-1-6817-4273-1>.
Zheng, G., et al, "Wide-field, high-resolution Fourier ptychographic microscopy," Nature Photonics, vol. 7, Sep. 2013, Published Online Jul. 28, 2013, pp. 739-746. <doi:10.1038/NPHOTON.2013.187>.
Preliminary Amendment dated Jun. 13, 2018 filed in U.S. Appl. No. 15/820,295.
U.S. Final Office Action dated Nov. 29, 2018 in U.S. Appl. No. 14/065,280.
Notice of Allowance dated Sep. 17, 2018 in U.S. Appl. No. 15/820,295.
U.S. Office Action dated Oct. 4, 2018 in U.S. Appl. No. 14/658,019.
U.S. Notice of Allowance dated Jul. 25, 2018 in U.S. Appl. No. 14/710,947.
U.S. Notice of Allowance dated Jun. 27, 2018 in U.S. Appl. No. 15/636,494.
U.S. Notice of Allowance dated Oct. 5, 2018 in U.S. Appl. No. 15/636,494.
U.S. Notice of Allowance dated Jul. 16, 2018 in U.S. Appl. No. 15/007,159.
U.S. Office Action dated Sep. 7, 2018 in U.S. Appl. No. 14/979,154.
Notice of Allowance dated Oct. 19, 2018 issued in U.S. Appl. No. 15/160,941.
Japanese First Office Action dated Jul. 31, 2018 issued in Application No. JP 2016-531919.
European Extended Search Report dated Jun. 6, 2018 issued in Application No. 15865492.1.
Extended European Search Report dated Aug. 8, 2018 issued in Application No. EP 16744002.3.
European Extended Search Report dated Aug. 14, 2018 issued in EP 16744003.1.
Extended European Search Report dated Jul. 3, 2018 issued in Application No. EP 15874344.3.
Extended European Search Report dated Sep. 12, 2018 issued in Application No. EP 16740769.1.
Chinese Second Office Action dated Jul. 3, 2018 issued in Application No. CN 201480054301.0.
Extended European Search Report dated Oct. 25, 2018 issued in Application No. EP 16765505.9.
Chinese Third Office Action dated Jul. 13, 2018 issued in CN 201480057911.6.
Godden, T.M. et al., "Ptychographic microscope for three-dimensional imaging," Optics Express, vol. 22, No. 10, May 19, 2014, pp. 12513-12523.
Jacques, et al., "Imaging Superficial Tissues With Polarized Light," Lasers in Surgery and Medicine, vol. 26, No. 2, Apr. 25, 2000, pp. 119-129.
Maiden, A.M., et al., "Ptychographic transmission microscopy in three dimensions using a multi-slice approach," Journal of the Optical Society of America A., vol. 29, No. 8, Aug. 1, 2012, pp. 1606-1614.
U.S. Appl. No. 16/162,271, filed Oct. 16, 2018, Kim et al.
U.S. Appl. No. 16/171,270, filed Oct. 25, 2018, Horstmeyer et al.
U.S. Appl. No. 16/179,688, filed Nov. 2, 2018, Chan et al.
U.S. Office Action dated Dec. 26, 2018 in U.S. Appl. No. 15/963,966.
U.S. Notice of Allowance dated Apr. 19, 2019 in U.S. Appl. No. 15/963,966.
U.S. Office Action dated Dec. 26, 2018 in U.S. Appl. No. 15/959,050.
U.S. Notice of Allowance dated Jan. 14, 2019 in U.S. Appl. No. 15/820,295.
U.S. Notice of Allowance dated Apr. 16, 2019 in U.S. Appl. No. 15/820,295.
U.S. Office Action dated Mar. 8, 2019 in U.S. Appl. No. 16/171,270.
U.S. Office Action dated Dec. 13, 2018 in U.S. Appl. No. 14/960,252.
U.S. Office Action dated Apr. 4, 2019 in U.S. Appl. No. 16/162,271.
U.S. Final Office Action dated Dec. 10, 2018 issued in U.S. Appl. No. 15/003,559.
U.S. Notice of Allowance dated Jan. 15, 2019 issued in U.S. Appl. No. 15/620,674.
U.S. Notice of Allowance dated Apr. 29, 2019 issued in U.S. Appl. No. 15/620,674.

(56) References Cited

OTHER PUBLICATIONS

Chinese First Office Action dated Jan. 28, 2019 issued in CN 201580072950.8.
Chinese First Office Action dated Dec. 28, 2018 issued in Application No. CN 201680005491.6.
Chinese First Office Action dated Apr. 19, 2019 issued in Application No. CN 201680006738.6.
Chinese First Office Action dated Dec. 26, 2018 issued in Application No. CN 201580067354.0.
Chinese First Office Action dated Apr. 19, 2019 issued in Application No. CN 201680014898.5.
International Search Report and Written Opinion dated Feb. 22, 2019 issued in PCT/US2018/059059.
Abrahamsson, S., et al., "Fast multicolor 3D imaging using aberration-corrected mulitfocus microscopy," Brief Communications: Nature Methods, vol. 10, No. 1, Jan. 2013, pp. 60-65. <doi:10.1038/nmeth.2277>.
Hoppe, W., "Diffraction in inhomogeneous primary wave fields. 1. Principle of phase determination from electron diffraction interference." Acta Crystallographica Section a—Crystal Physics Diffraction Theoretical and General Crystallography, A25, Jan. 1, 1969, pp. 495-501. (English Machine Translation Incl.).
Reinhard, E., et al, "High Dynamic Range Imaging: Acquisition, Display, and Image-based Lighting" Second Edition § 5.2 HDR Image Capture: Morgan Kaufmann, May 28, 2010, pp. 148-151. <ISBN: 9780123749147>.
U.S. Appl. No. 16/242,934, filed Jan. 8, 2019, Kim et al.
U.S. Appl. No. 16/252,465, filed Jan. 18, 2019, Ou et al.
U.S. Office Action dated Jun. 26, 2019 issued in U.S. Appl. No. 14/065,280.
U.S. Final Office Action dated Jun. 3, 2019 in U.S. Appl. No. 15/959,050.
U.S. Final Office Action dated May 30, 2019 in U.S. Appl. No. 14/658,019.
U.S. Notice of Allowance dated Aug. 12, 2019 in U.S. Appl. No. 14/960,252.
U.S. Final Office Action dated May 30, 2019 in U.S. Appl. No. 14/979,154.
U.S. Office Action dated Jun. 26, 2019 issued in U.S. Appl. No. 15/003,559.
U.S. Notice of Allowance dated Aug. 14, 2019 issued in U.S. Appl. No. 15/620,674.
U.S. Appl. No. 16/552,948, filed Aug. 27, 2019, Chung et al.
US Ex Parte Quayle Action dated Aug. 8, 2019 issued in U.S. Appl. No. 16/242,934.
U.S. Notice of Allowance dated Nov. 20, 2019 in U.S. Appl. No. 15/959,050.
U.S. Notice of Allowance dated Sep. 17, 2019 in U.S. Appl. No. 14/960,252.
US Notice of Allowance dated Nov. 4, 2019 issued in U.S. Appl. No. 16/242,934.
U.S. Notice of Allowance dated Dec. 9, 2019 in U.S. Appl. No. 16/162,271.
U.S. Office Action dated Sep. 23, 2019 issued in U.S. Appl. No. 16/252,465.
U.S. Notice of Allowance dated Sep. 25, 2019 issued in U.S. Appl. No. 15/620,674.
U.S. Office Action dated Oct. 11, 2019 issued in U.S. Appl. No. 16/179,688.
Chinese Second Office Action dated Nov. 12, 2019 issued in Application No. CN 201680005491.6.
Adie, et al., "Computational adaptive optics for broadband optical interferometric tomography of biological tissue," Proc. Natl. Acad. Sci. USA 109, 7175-7180 (May 8, 2012).
Bian, et al., "Content adaptive illumination for Fourier ptychography," Optics Letters, vol. 39, Aug. 2014, pp. 1-6.
Bioucas-Dias, et al., "Total variation-based image deconvolution: a majorization-minimization approach," ICASSP (2), pp. 861-864 (May 14, 2006).
Booth, "Adaptive optical microscopy: the ongoing quest for a perfect image," Light Sci. Appl. 3, e165 (Apr. 25, 2014).
Chung, et al., "Computational aberration compensation by coded-aperture-based correction of aberration obtained from optical Fourier coding and blur estimation," Optica, vol. 6, May 10, 2019, pp. 647-661.
Desjardins, et al., "Angle-resolved Optical Coherence Tomography with sequential selectivity for speckle reduction" Optics Express, vol. 15, No. 10, May 14, 2007, pp. 6200-6209.
Dowski, et al., "Extended depth of field through wavefront coding," Applied Optics, vol. 34, No. 11, Apr. 10, 1995, pp. 1859-1866.
Evered, et al., "Accuracy and perceptions of virtual microscopy compared with glass slide microscopy in cervical cytology," Cytopathology, vol. 22, Feb. 2, 2010, pp. 82-87.
Fergus, et al., "Removing camera shake from a single photograph," ACM Trans. Graph. 25, 787-794 (2006).
Fienup and Miller, "Aberration correction by maximizing generalized sharpness metrics," J. Opt. Soc. Am. A 20, pp. 609-620 (Apr. 2003).
Fried, D.L.,"Anisoplanatism in adaptive optics," J. Opt. Soc. Am. vol. 72, No. 1, Jan. 1982, pp. 52-61.
Gunjala, et al., "Aberration recovery by imaging a weak diffuser," Optics Express vol. 26, No. 16, Aug. 6, 2018, pp. 21054-21068.
McConnell, et al., "A novel optical microscope for imaging large embryos and tissue volumes with sub-cellular resolution throughout," eLife 5, e18659, Sep. 23, 2016, pp. 1-15.
Muyo, et al., "Wavefront coding for athermalization of infrared imaging systems," Proc. SPIE 5612, Dec. 6, 2004, pp. 227-235.
Muyo, et al., "Infrared imaging with a wavefront-coded singlet lens," Optics Express, vol. 17, Nov. 5, 2009, pp. 21118-21123.
Ginner, et al., "Holographic line field en-face OCT with digital adaptive optics in the retina in vivo," Biomed. Opt. Express 9, 472-485 (Feb. 1, 2018).
Ginner, et al., "Noniterative digital aberration correction for cellular resolution retinal optical coherence tomography in vivo," Optica, vol. 4, Aug. 2017, pp. 924-931.
Gustafsson, M.,"Nonlinear structured-illumination microscopy: widefield fluorescence imaging with theoretically unlimited resolution," Proc. Natl. Acad. Sci. USA 102, 13081-13086 (Sep. 13, 2005).
Hofer, et al., "Improvement in retinal image quality with dynamic correction of the eye's aberrations," Opt. Express 8, May 21, 2001, pp. 631-643.
Hillmann, et al., "Aberration-free volumetric high-speed imaging of in vivo retina," Sci. Rep. 6, 35209 (Oct. 20, 2016).
Kamal, et al., "In situ retrieval and correction of aberrations in moldless lenses using Fourier ptychography," Opt. Express, vol. 26, No. 3, pp. 2708-2719 (Feb. 5, 2018).
Kuang, et al., "Digital micromirror device-based laserillumination Fourier ptychographic microscopy," Optics Express, vol. 23, Oct. 5, 2015, pp. 26999-27010.
Kubala, et al., "Reducing complexity in computational imaging systems," Optics Express vol. 11, Sep. 8, 2003, pp. 2102-2108.
Kumar, et al., "Subaperture correlation based digital adaptive optics for full field optical coherence tomography," Optics Express, vol. 21, May 6, 2013, pp. 10850-10866.
Kundur, et al., "Blind Image Deconvolution," IEEE Signal Processing Magazine, vol. 13, No. 3, May 1996, pp. 43-64.
Levin et al., "Image and depth from a conventional camera with a coded aperture," ACM Transactions on Graphics, vol. 26, No. 3, Article 70, Jul. 2007, pp. 70-1-70-9.
Levin, et al., "Understanding blind deconvolution algorithms," IEEE Trans. Pattern Anal. Mach. Intell., vol. 33, No. 12, Dec. 2011, pp. 2354-2367.
Li, et al., "Separation of three dimensional scattering effects in tilt-series Fourier ptychography," Ultramicroscopy 158, 1-7 (Jun. 14, 2015).
Li, et al., "GPU accelerated parallel FFT processing for Fourier transform hyperspectral imaging," Applied Optics, vol. 54, No. 13, May 1, 2015, pp. D91-D98.
Marcos, et al., "Vision science and adaptive optics, the state of the field," Vision Research, vol. 132, Feb. 27, 2017, pp. 3-33.

(56) References Cited

OTHER PUBLICATIONS

Martins da Silva et al., "Photosensitivity and epilepsy: current concepts and perspectives—a narrative review," Seizure, vol. 50, Apr. 4, 2017, pp. 209-218.
Neumaier, "Solving ill-conditioned and singular linear systems: a tutorial on regularization," SIAM Rev. 40, (1998), pp. 636-666.
Pan, et al., "Subwavelength resolution Fourier ptychography with hemispherical digital condensers," Opt. Express 26, 23119-23131 (Sep. 3, 2018).
Pan, et al., "System calibration method for Fourier ptychographic microscopy," J. Biomed. Opt. 22, 096005 (Sep. 12, 2017).
Pan, et al., "Three-dimensional space optimization for near-field ptychography," Opt. Express 27, 5433-5446 (Feb. 18, 2019).
Qian, et al., "Large-scale 3D imaging of insects with natural color," Opt. Express 27, 4845-4857 (Feb. 18, 2019).
Reinig, et al., "Adaptative optics microscopy enhances image quality in deep layers of CLARITY processed brains of YFP-H mice" Proc., of SPIE, vol. 9690, (Mar. 9, 2016) pp. 969008-1-969008-12. <doi:10.1117/12.2213283>.
Rha, et al., "Adaptive optics flood-illumination camera for high speed retinal imaging," Opt. Express vol. 14, May 15, 2006, pp. 4552-4569.
Shemonski, et al., "Computational high-resolution optical imaging of the living human retina," Nat. Photonics, vol. 9, Jul. 2015, pp. 440-443.
Sun, et al., "Efficient positional misalignment correction method for Fourier ptychographic microscopy," Biomedical Optics Express vol. 7, No. 4, Mar. 17, 2016, pp. 1336-1350.
Sun, et al., "Resolution-enhanced Fourier ptychographic microscopy based on high-numerical-aperture illuminations," Scientific Reports, vol. 7, No. 1187, Apr. 26, 2017, pp. 1-11.
Sun, et al., "Sampling criteria for Fourier ptychographic microscopy in object space and frequency space," Optics Express vol. 24, No. 14, Jul. 11, 2016, pp. 15765-15781.
Thiebaut and Conan, "Strict a priori constraints for maximumlikelihood blind deconvolution," J. Opt. Soc. Am. A, vol. 12, No. 3, Mar. 1995, pp. 485-492.
Tian and Waller, "3D intensity and phase imaging from light field measurements in an LED array microscope," Optica vol. 2, No. 2, Feb. 2015, pp. 104-111.
Tomer et al., "Advanced CLARITY for rapid and high-resolution imaging of intact tissues," Nat. Protoc., vol. 9, No. 7, Jul. 2014, pp. 1682-1697.
Wade, et al., "A fast, robust pattern recognition system for low light level image registration and its application to retinal imaging," Optics Express vol. 3, No. 5, Aug. 31, 1998, pp. 190-197.
Williams, D., "Imaging Single Cells in the Living Retina," Vis. Res. 51, pp. 1379-1396 (Jul. 1, 2011).
Yaroslaysky, "Image Resampling and Building Continuous Image Models", Chapter 6, Theoretical Foundations of Digital Imaging Using MATLAB, pp. 293-342 (CRC Press, 1 edition, Nov. 26, 2012).
Yuan, et al., "Image deblurring with blurred/noisy image pairs," ACM Trans. Graph. 26, Jul. 29, 2007, pp. 1-10.
Zhou, et al., "What are Good Apertures for Defocus Deblurring?" in 2009 IEEE International Conference on Computational Photography (IEEE, Apr. 16-17, 2009), pp. 1-8.
U.S. Appl. No. 16/572,497, filed Sep. 16, 2019, Ou et al.
U.S. Office Action dated Jan. 9, 2020 in U.S. Appl. No. 14/658,019.
U.S. Notice of Allowance dated Jan. 6, 2020 in U.S. Appl. No. 14/960,252.
U.S. Notice of Allowance dated Jan. 17, 2020 issued in U.S. Appl. No. 15/003,559.
Chinese Second Office Action dated Nov. 28, 2019 issued in Application No. CN 201680006738.6.
U.S. Notice of Allowance dated Jan. 29, 2020 issued in U.S. Appl. No. 14/065,280.
U.S. Notice of Allowance dated Feb. 18, 2020 issued in U.S. Appl. No. 16/242,934.
U.S. Notice of Allowance dated Mar. 2, 2020 in U.S. Appl. No. 14/797,154.
Chinese Second Office Action dated Dec. 31, 2019 issued in CN 201580072950.8.
U.S. Notice of Allowance dated Apr. 3, 2020 in U.S. Appl. No. 16/162,271.
Chinese Second Office Action dated Mar. 19, 2020 issued in Application No. CN 201680014898.5.

* cited by examiner

Overlaid FPM and fluorescence image, before and after

CORRECTING FOR ABERRATIONS IN INCOHERENT IMAGING SYSTEMS USING FOURIER PTYCHOGRAPHIC TECHNIQUES

CROSS-REFERENCES TO RELATED APPLICATIONS

This application claims benefit of and priority to U.S. Provisional Patent Application No. 62/133,130 titled "Correcting for Aberrations in Incoherent Imaging System via Fourier Ptychographic Microscopy" and filed on Mar. 13, 2015, which is hereby incorporated by reference in its entirety and for all purposes.

STATEMENT AS TO RIGHTS TO INVENTIONS MADE UNDER FEDERALLY SPONSORED RESEARCH OR DEVELOPMENT

This invention was made with government support under Grant No. OD007307 awarded by the National Institutes of Health. The government has certain rights in the invention.

FIELD

Certain aspects described herein are generally related to imaging methods and systems, and more specifically to methods for aberration correction in incoherent imaging systems using Fourier ptychographic techniques.

BACKGROUND

In general, imaging lenses are imperfect in design. Multiple lenses of various shapes and properties are usually intricately combined in an imaging lens to compensate for the deviations from an ideal lens, but this comes at a price of high manufacturing costs and the associated increase in complexity of the lens design. Most lenses available in the market offer a well-resolved image in the region close to the center of their field-of-view, but offer poor resolution away from the center. Therefore, obtaining a well-resolved image of a sample requires raster scanning the sample and keeping the center regions of the scanned images while discarding the portions away from the center.

Bright-field imaging is one of the most popular microscope modalities. A bright-field microscope typically illuminates a specimen with white light and captures an image of the transmitted light. Bright-field image phase contrast offers information about sample structure. In combination with phase contrast methods, one may quantitatively measure sample absorption, thickness, and dispersion. Another increasingly important microscope modality in biology is fluorescence imaging. Fluorescence can help visualize chemical compositions and structures at a molecular level through appropriate labeling with fluorophores. By illuminating a tagged sample at the fluorophores' excitation light and imaging at the fluorophores' emission wavelength, biologists can easily identify labeled regions exhibiting chemical properties of interest. Combining a bright-field and fluorescence image allows one to locate fluorescing regions relative to the specimen's underlying structure.

SUMMARY

Certain aspects involve methods for aberration correction in incoherent imaging systems using Fourier ptychographic techniques (ACIS methods) and incoherent imaging systems that implement these methods (ACIS systems).

Certain aspects pertain to an aberration-corrected incoherent imaging method that comprises acquiring a sequence of coherent images of a specimen while coherent plane wave illumination from different angles is sequentially provided incident the specimen, wherein each of the coherent images is acquired while coherent plane wave illumination is provided to the specimen from one of the angles. The method further comprises acquiring an incoherent image of the specimen based on incoherent light issuing from the specimen. The method further comprises implementing an embedded pupil function recovery process to use the acquired sequence of images to construct an improved resolution image and to estimate a pupil function of the imaging system. The method further comprises determining an optical transfer function of the imaging system based on the estimated pupil function and removing the aberration from the acquired incoherent image using a deconvolution process to generate an aberration-corrected incoherent image. In the method, the deconvolution process uses the optical function of the imaging system determined from the pupil function estimated using the acquired sequence of images.

Certain aspects pertain to an imaging system comprising a variable coherent light source configured to sequentially illuminate a specimen with coherent plane wave illumination from different oblique angles. The system also comprises an excitation light source configured to provide a first band of wavelengths to the specimen, the first band of wavelengths configured to activate fluorophore in the specimen to emit light of a first set of fluorescence emissions. The system also comprises an optical system and one or more image sensors. The optical system has collection optics for collecting light issuing from the specimen, wherein the optical system includes an emission filter while the excitation light source provides a first band of wavelengths to the specimen, the emission filter for passing the first set of fluorescence emissions and blocking other wavelengths, the optical system configured to propagate light to one or more image sensors. The one or more image sensors are configured to acquire a sequence of coherent images of the specimen while the variable coherent light source sequentially illuminates the specimen with coherent plane wave illumination from different oblique angles, the one or more image sensors further configured to acquire an incoherent image of the specimen based on incoherent illumination. The system further comprises one or more processors in electrical communication with the one or more image sensors to receive image data of the sequence of coherent images and the incoherent image. The one or more processors are also configured to implement instructions stored in memory to with an embedded pupil function recovery process, construct an improved resolution image and simultaneously estimate a pupil function of the imaging system using an embedded pupil function recovery process with the image data of the acquired sequence of coherent images. The one or more processors are also configured to implement instructions stored in memory to determine an optical transfer function of the imaging system based on the estimated pupil function. The one or more processors are also configured to implement instructions stored in memory to generate an aberration-corrected incoherent image by removing aberration from the acquired incoherent image using a deconvolution process, wherein the deconvolution process uses the optical function of the imaging system determined from the pupil function estimated using the acquired sequence of images.

These and other features are described in more detail below with reference to the associated drawings.

DETAILED DESCRIPTION

Figure 1:
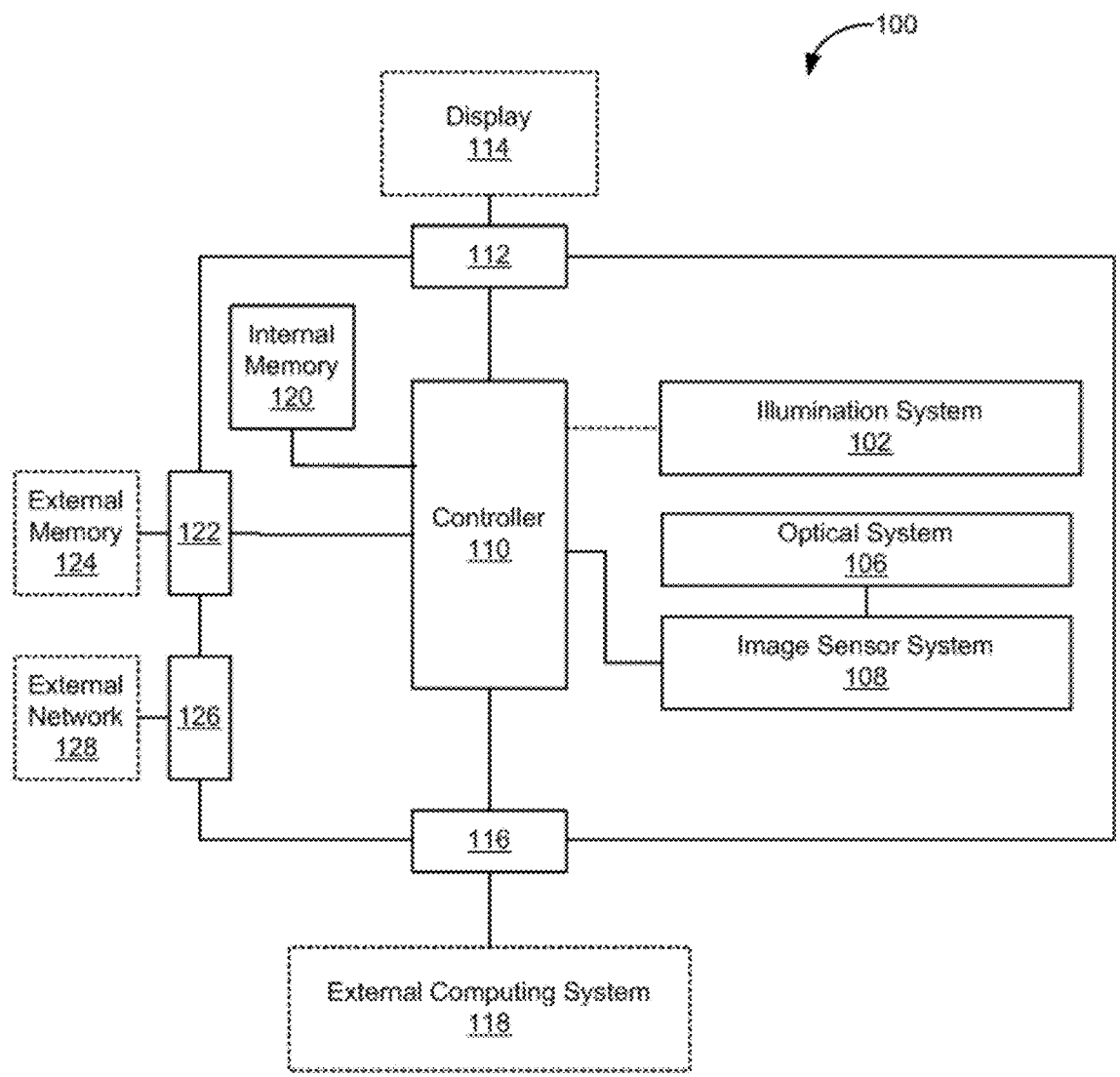
FIG. 1 is a block diagram of an ACIS imaging system capable of implementing an ACIS imaging method, according to some implementations.

Embodiments of the present disclosure will be described below with reference to the accompanying drawings.

I. Introduction

Recently, an embedded pupil function recovery (EPRY) method was developed in junction with Fourier ptychographic (FP) techniques. The standard EPRY method characterizes a lens' spatially varying aberration and corrects captured images computationally for a coherent imaging setup. Details of this standard EPRY method can be found in G. Zheng, R. Horstmeyer and C. Yang, "Wide-field, high-resolution Fourier ptychographic microscopy," Nature Photonics, 2013, in X. Ou, G. Zheng and C. Yang, "Embedded pupil function recovery for Fourier ptychographic microscopy," Optics Express, 2014, which are both hereby incorporated by reference in their entirety. Details of this EPRY method can also be found in U.S. patent application Ser. No. 14/572,493 titled "EMBEDDED PUPIL FUNCTION RECOVERY FOR FOURIER PTYCHOGRAPHIC IMAGING DEVICES" and filed on Dec. 16, 2014, which is hereby incorporated by reference in its entirety. Details of this Fourier ptychographic (FP) techniques can be found in U.S. patent application Ser. No. 14/065,280, titled "FOURIER PTYCHOGRAPHIC IMAGING SYSTEMS, DEVICES, AND METHODS," filed on Oct. 28, 2013 and U.S. patent application Ser. No. 14/466,481 titled "VARIABLE-ILLUMINATION FOURIER PTYCHOGRAPHIC IMAGING DEVICES, SYSTEMS, AND METHODS," filed on Aug. 22, 2014, which are hereby incorporated by reference in their entirety.

Some imaging modalities are accomplished, however, using incoherent light. For example, fluorescence imaging, commonly used by biologists, is based on incoherent emissions from the sample. The standard EPRY method cannot be used directly to correct for the spatially-varying aberration in a captured fluorescence image since the standard EPRY method is designed primarily for a coherent imaging system. The ASIC methods described herein can correct for the spatially-varying aberration in a captured fluorescence image and other incoherent images.

According to certain aspects, an ASIC method includes operations that correct for aberrations in an incoherent imaging system using a pupil function determined from a standard EPRY method in junction with FP techniques. First, the ACIS method captures a sequence of bright-field coherent images of a sample while a variable coherent illumination source (e.g., a light emitting diode (LED) array) provides sequential illumination from multiple illumination angles, which are generally oblique angles in certain implementations. The ACIS method also acquires one or more incoherent images of the field of view of the sample. For example, fluorescence emissions (signal) may be imaged when fluorophores in the sample are activated by an excitation light source. With the acquired sequence of bright-field coherent images, the ACIS method uses the standard EPRY method in junction with the FP techniques to characterize the spatially-varying aberration (generally referred to as the "pupil function") of the coherent imaging system. The ACIS method converts the pupil function of the coherent imaging system into an incoherent optical transfer function that can be deconvolved from the fluorescence image to achieve a well-resolved aberration-corrected fluorescence image throughout the imaging system's field of view.

Figure 2:
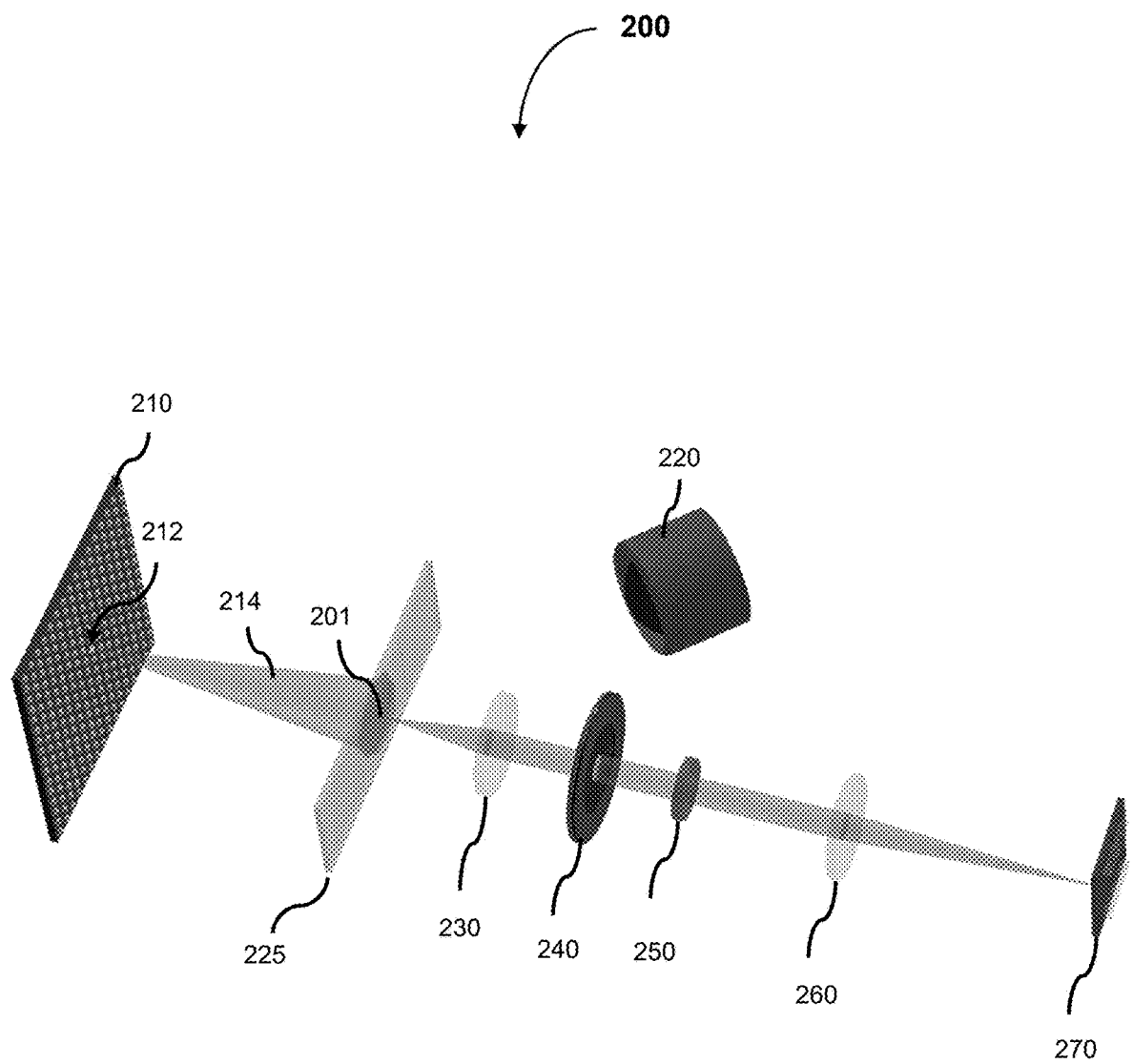
FIG. 2 is a schematic diagram of an example of an ACIS imaging system configured to implement the ACIS method for joint FP-fluorescence imaging, according to an embodiment.

To characterize the spatially-varying aberration of the imaging system, the ACIS method uses FP techniques to reconstruct the complex amplitude and phase function of the field of view of the sample by using a phase retrieval method to stitch together a series of raw bright-field images captured at sequential illumination of different angles. An example of an imaging system that is configured to capture a set of bright-field coherent images of a sample while coherent illumination is provided at different illumination angles sequentially from different sets of one or more LEDs of an LED array is shown in FIG. 2.

Figure 3:
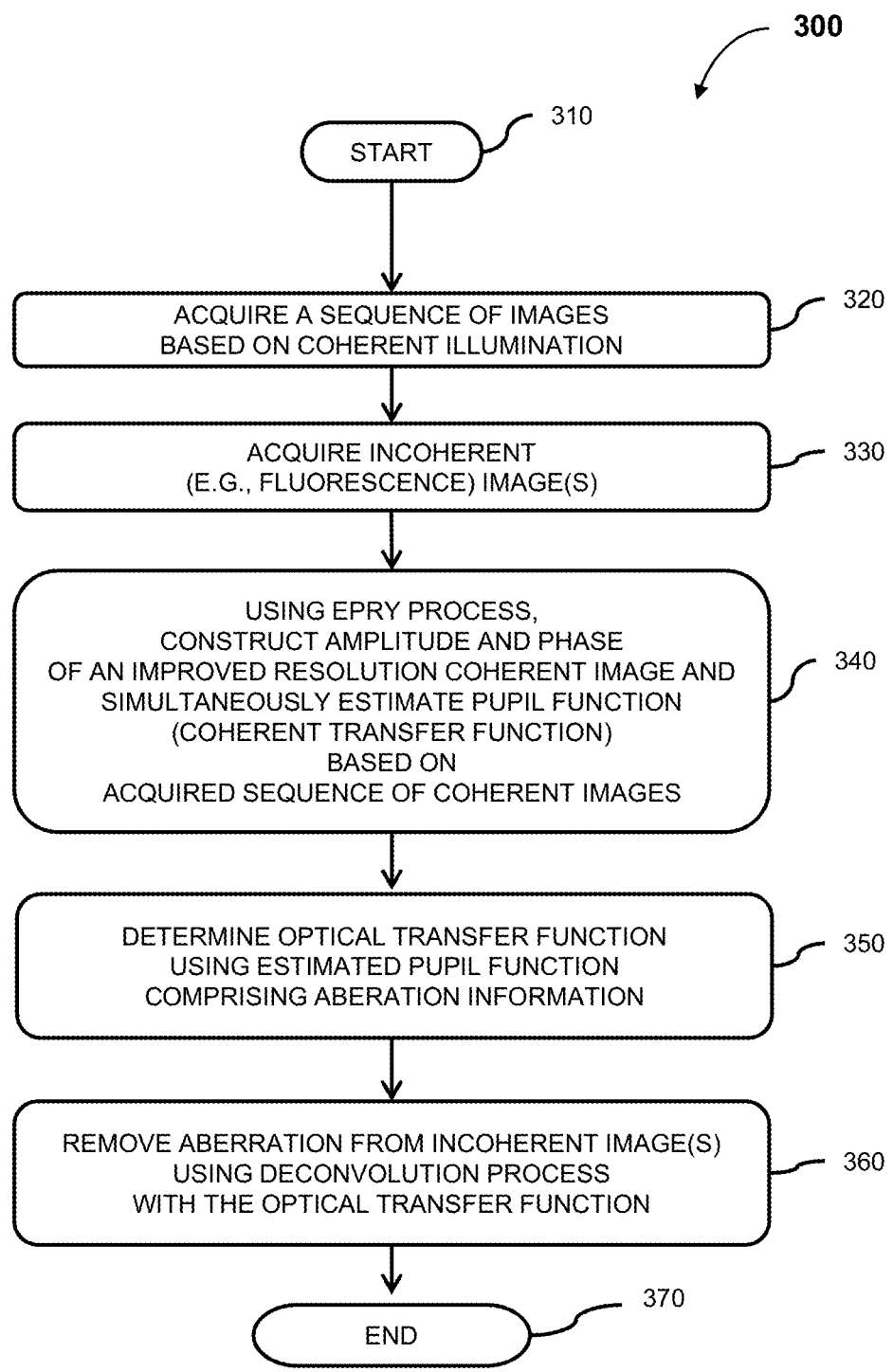
FIG. 3 shows a flowchart depicting operations of a single imaging run of an exemplary ACIS imaging method that can be implemented by an ACIS imaging system, according to implementations.

As mentioned, the ACIS method implements the EPRY method within the FP techniques (FP-EPRY reconstruction) to not only retrieve the complex sample function (amplitude and phase), but also to determine the pupil function of the coherent imaging system. The determined pupil function is the coherent transfer function of the coherent imaging system that includes the imaging system's aberration. Because the aberration function can be different for different regions on the captured image, in certain implementations the full field-of-view image of the sample is tiled into smaller regions before the FP-EPRY reconstruction such that the aberration is approximately the same within each tile. For the ACIS method to obtain the incoherent optical transfer function (OTF) of the imaging system, the determined pupil function is convolved with itself in the frequency domain, or magnitude-squared in the spatial domain. The ACIS method obtains an incoherent image by illuminating the fluorophores in the sample with excitation light from an excitation light source e.g., excitation LED(s). The image is tiled in the same way as discussed above, and each tile is deconvolved by the corresponding OTF in the frequency domain by a deconvolution process (e.g. Wiener filter) to remove the aberration as illustrated in FIG. 3.

In certain implementations, the ASIC method can generate a high-resolution, coherent bright-field image and/or an aberration-corrected fluorescence image, across a wide imaging system field-of-view (FOV). The ASIC method can improve bright-field image resolution using the Fourier ptychographic (FP) technique, which is a recently-developed computational technique that processes a sequence of images acquired under angularly varying illumination. Details of the Fourier ptychographic (FP) technique are discussed in G. Zheng, R. Horstmeyer, and C. Yang, "Wide-field, high-resolution Fourier ptychographic microscopy," Nat. Photonics 7(9), 739-745 (2013), which is hereby incorporated by reference in its entirety. In a phase retrieval process, the FP technique recovers the phase information of the field of view of the sample, and can additionally estimate the imaging system's aberrations using an EPRY method. Some details of the phase retrieval process can be found in X. Ou, R. Horstmeyer, C. Yang, and G. Zheng, "Quantitative phase imaging via Fourier ptychographic microscopy," Opt. Lett. 38(22), 4845-4848 (2013), which is hereby incorporated by reference in its entirety. Details of a standard EPRY process that can estimate the imaging system's aberration can be found in X. Ou, G. Zheng, and C. Yang, "Embedded pupil function recovery for Fourier ptychographic microscopy," Opt. Express 22(5), 4960-4972 (2014), which is hereby incorporated by reference in its entirety. The ASCI method can also capture a fluorescence image using the same system and correct its aberrations using the aberration map estimated during the FP-EPRY process. Specifically, FP process outputs a complex aberration map in the form of a spatially varying pupil function, with which the ASIC method computes the imaging system's spatially varying incoherent point spread function (PSF) to use in fluorescence image deconvolution for aberration removal.

Due to limitations of the physical lens design, imaging systems tend to exhibit aberrations that vary across their field-of-view (FOV). For wide FOV imaging devices, aberrations significantly deteriorate image quality near the FOV boundary. Examples of wide FOV imaging devices are microscopes designed for gigapixel imaging using FP techniques described in S. Dong, K. Guo, P. Nanda, R. Shiradkar, and G. Zheng, "FPscope: a field-portable high-resolution microscope using a cellphone lens," Biomed. Opt. Express 5(10), 3305-3310 (2014); K. Guo, S. Dong, P. Nanda, and G. Zheng, "Optimization of sampling pattern and the design of Fourier ptychographic illuminator," Opt. Express 23(5), 6171-6180 (2015); S. Dong, R. Shiradkar, P. Nanda, and G. Zheng, "Spectral multiplexing and coherent-state decomposition in Fourier ptychographic imaging," Biomed. Opt. Express, 5(6), 1757-1767 (2014); L. Tian, X. Li, K. Ramchandran, and L. Waller, "Multiplexed coded illumination for Fourier Ptychography with an LED array microscope," Biomed. Opt. Express 5(7), 2376-2389 (2014); and A. Williams, J. Chung, X. Ou, G. Zheng, S. Rawal, Z. Ao, R. Datar, C. Yang, and R. Cote, "Fourier ptychographic microscopy for filtration-based circulating tumor cell enumeration and analysis," J. Biomed. Opt. 19(6), 066007 (2014). Thus, aberration correction is useful to resolve sample features across the entire image plane as discussed in G. Zheng, X. Ou, R. Horstmeyer, and C. Yang, "Characterization of spatially varying aberrations for wide field of-view microscopy," Opt. Express 21(13), 15131-15143 (2013), which is hereby incorporated by reference in its entirety. As discussed above, the standard EPRY method can be used to computationally account complex and spatially varying aberrations in a coherent imaging scheme. An output of the standard EPRY method is a high-resolution estimate of a sample's amplitude and phase along with an estimate of the imaging system's pupil function. The standard EPRY method cannot be directly applied to improve fluorescence imaging because both FP technique and EPRY methods are based on coherent imaging schemes. That is, since fluorescence emissions are incoherent, the emissions do not change in direct response to angularly varying illumination.

In certain implementations, the ASIC method includes an aberration removal process comprising a deconvolution operation with the associated incoherent point spread function (PSF) using, for example, Tikhonov regularization. Since both the coherent bright-field and fluorescence images are acquired from the same imaging system in quick succession and with little to no movement, there is a direct connection between the pupil function and the incoherent PSF. The deconvolution operation corrects aberrations in the fluorescence image caused by imperfections in the imaging system to render an aberration-corrected fluorescence image. In one example, the deconvolution operation renders an aberration-corrected fluorescence image at the diffraction limit of the imaging system.

The deconvolution operation of the ASIC method is different from super-resolution deconvolution methods which require a-priori knowledge of the sample structure. The deconvolution operation of the ASIC method makes no a-priori assumptions about sample structures. According to certain implementations, the ASIC method can generate an aberration-corrected fluorescence image and a high-resolution bright-field image in a large FOV capacity. This capability makes the ASIC method particularly useful in applications such as counting fluorescently tagged bacteria, studying cell migration dynamics, and tracing cell lineage.

According to certain implementations, an ASIC method can characterize aberrations in an incoherent imaging system by implementing operations of the standard EPRY method and FP technique. Details of the standard EPRY method and FP technique are described in G. Zheng, R. Horstmeyer, and C. Yang, "Wide-field, high-resolution Fourier ptychographic microscopy," Nat. Photonics 7(9), 739-745 (2013) and X. Ou, G. Zheng, and C. Yang, "Embedded pupil function recovery for Fourier ptychographic microscopy," Opt. Express 22(5), 4960-4972 (2014), which are hereby incorporated by reference in their entirety. Generally, the FP technique involves capturing a sequence of raw (low-resolution) images under varying plane wave illumination from a variable coherent illumination source. An example of a variable coherent illumination source is an LED array placed at a large distance (e.g. 80 mm away for 2 mm-diameter LED elements) behind the sample of interest. In an implementation that uses an LED array, system may turn on one LED at a time for N different LEDs and capture a unique image at each illumination. In another implementation, the imaging system turns on unique patterns of LEDs to sequentially capture a sequence of raw images. Details of such a multiplexing example can be found in U.S. patent application Ser. No. 14/960,252 titled "Multiplexed Fourier Ptychography Imaging Systems and Method" and filed on Dec. 4, 2015, which is hereby incorporated by reference in its entirety. For thin samples, the varying plane wave illumination provided by the variable coherent illumination source generates a laterally-shifting sample spectrum (i.e., the Fourier transform of the complex sample) in the back-focal plane of the collection optics of the ACIS imaging system. At this back-focal plane, the finite extent of the aperture stop (corresponding to the lens NA) acts as a low-pass filter. In an example that uses a conventional infinity-corrected microscope objective lens as the collection optics, the extent of the aperture stop defines its cutoff spatial frequency, which in turn dictates its smallest resolvable feature at the image plane. By laterally shifting the sample spectrum via varied plane wave illumination and acquiring a sequence of raw lower resolution images, the FP acquisition operation acquires a data set that contains sufficient information to reconstruct an image with a wider spectrum than offered by a single raw image.

Since the sample spectrum is complex and the image sensor system generally records only intensity of light, extending the sample spectrum beyond the bandpass of the collection optics using the N acquired coherent images is not direct. To solve the inverse problem, the ASIC method can use the FP technique to apply a phase retrieval reconstruction process. Examples of phase retrieval reconstruction processes can be found in J. R. Fienup, "Phase retrieval algorithms: a comparison," Appl. Opt. 21(15), 2758-2769 (1982) and V. Elser, "Phase retrieval by iterated projections," J. Opt. Soc. Am. A 20(1), 40-55 (2003), which are incorporated by reference for the examples of the phase retrieval reconstruction process. Examples of solvers, including standard non-linear solvers based upon alternating projections, are widely available such as those discussed in P. Godard, M. Allain, V. Chamard, and J. Rodenburg, "Noise models for low counting rate coherent diffraction imaging," Opt. Express 20(23), 25914-25934 (2012), C. Yang, J. Qian, A. Schirotzek, F. Maia, and S. Marchesini, "Iterative Algorithms for Ptychographic Phase Retrieval," http://arxiv.org/abs/1105.5628, and R. Horstmeyer, R. Y. Chen, X. Ou, B. Ames, J. A. Tropp, and C. Yang, "Solving ptychography with a convex relaxation," New J. Phys. 17(5), 053044 (2015). According to certain implementations, the FP image acquisition process acquires a sequence of coherent brightfield images with a certain amount of redundancy by varying illumination angles so that neighboring images corresponding to uniquely windowed areas of the sample spectrum overlap by a certain amount in the Fourier domain. In one example, the overlap is at least about 65% in the Fourier domain. In another example, the overlap is at least about 70% in the Fourier domain. In another example, the overlap is at least about 77% in the Fourier domain. In another example, the overlap is at least about 60% in the Fourier domain. The FP reconstruction process involves the application of phase retrieval to expand the aperture stop bandpass. In some examples, the FP reconstruction process can effectively increase the NA of the imaging system by the illumination NA defined by the maximum illumination angle.

The ASIC method uses the standard EPRY method to determine the pupil function of the imaging system. In certain implementations, the ASIC method can simultaneously (e.g., utilizing parallel processing) determine a complex sample reconstruction and pupil function using the standard EPRY method. In one example, the ASIC method splits the iterative FP update process into two steps. In the first step, the ASIC method implements the standard EPRY process to use the image data and current pupil function estimate to update the sample spectrum estimate at all even iterations. Second, the ASIC method implements the EPRY process to apply the image data and the current spectrum estimate to update the pupil function estimate at all odd iterations. To account for the spatially varying aberrations across the system's FOV, the captured images are segmented into smaller tiles. The aberrations can be considered as spatially invariant within each tile. In one case, the ASIC method selects a tile area that is smaller than the entire sample area, but larger than approximately 20×20 sensor pixels projected onto the image plane, which helps mitigate numerical artifacts during reconstruction. The EPRY process is applied separately to each tile and a unique aberration function for each tile region of the system FOV is determined.

According to certain implementations, the ASIC method uses the standard EPRY method to determine tile-specific pupil functions of the imaging system. The tile-specific pupil functions obtained from the EPRY method provide an accurate physical model of the coherent transfer function of the imaging system. The ASIC method determines the aberration of the incoherent imaging scheme based on the determined tile-specific pupil functions. The ASIC method can determine the incoherent (fluorescence) image PSF as the squared magnitude of the Fourier transform of the pupil function according to Eqn. 1.

$$h_m(x,y) = |F^{-1}[P_m(f_x,f_y)]|^2 \qquad \text{(Eqn. 1)}$$

where (x,y) represents the spatial coordinates of the image plane, $(f_x,f_y)$ represents the coordinates in the aperture plane (i.e., are the Fourier conjugates of the spatial coordinates), $h_m(x,y)$ is the incoherent PSF, $P_m(f_x,f_y)$ is the CTF, and $F^{-1}$ is the inverse Fourier transform operation.

In an aberration removal operation, the ASIC method removes the aberrations from the acquired fluorescence image. In certain implementations, the ASIC method segments the acquired fluorescence image into the same tiles as used in the FP reconstruction process to ensure the aberration map acquired from EPRY corresponds to the same subregions in the fluorescence image. When an $m^{th}$ tile, $o_m(x,y)$, of a fluorescence image is imaged by the imaging system, it is degraded by the possibly spatially variant incoherent PSF, $h_m(x,y)$ before reaching the image sensor. The detected image intensity, $i_m(x,y)$, is further corrupted by noise, $n_m(x,y)$, originating from the sample's background signal, shot noise, and detector noise. Generally, the imaging process can be represented as Eqn. 2.

$$i_m(x,y) = h_m(x,y) * o_m(x,y) + n_m(x,y) \qquad \text{(Eqn. 2)}$$

The goal of the aberration removal operation is to recover the object $o_m(x,y)$ from the corrupted image signal $i_m(x,y)$. In the Fourier domain, Eqn. 2 is represented as Eqn. 3.

$$I_m(f_x,f_y) = H_m(f_x,f_y) \cdot O_m(f_x,f_y) + N_m(f_x,f_y) \qquad \text{(Eqn. 3)}$$

where $I_m(f_x,f_y)$, $H_m(f_x,f_y)$, $O_m(f_x,f_y)$, and $N_m(f_x,f_y)$ are Fourier transforms of $i_m(x,y)$, $H_m(x,y)$, $O_m(x,y)$, and $N_m(x,y)$, respectively.

Unlike the coherent transfer function, the $H_m(f_x,f_y)$, also known as the optical transfer function (OTF), can have numerous zeros within its bandpass and its values are very low near the bandpass's edges, which means that the sample information may be lost or overwhelmed by noise at these spatial frequencies. Due to the nature of the OTF, inverting Eqn. 3 to solve for $O_m(f_x,f_y)$ may be an ill-posed problem. Various inversion methods have been developed to account for this information loss, which typically rely upon regularization parameters. The Wiener deconvolution method determine an estimate, $\tilde{O}_m(f_x,f_y)$, for the original object signal, $O_m(f_x,f_y)$, by the following:

$$\tilde{O}_m(f_x,f_y) = G_m(f_x,f_y) \cdot I_m(f_x,f_y) \quad \text{(Eqn. 4)}$$

where $G_m(f_x,f_y)$ is an inverse filter defined as:

$$G_m(f_x, f_y) = \frac{H_m^*(f_x, f_y)}{|H_m(f_x, f_y)|^2 + \frac{|N_m(f_x, f_y)|^2}{|O_m(f_x, f_y)|^2}} \quad \text{(Eqn. 5)}$$

Details of the Wiener deconvolution method can be found in Wiener, N., "The Extrapolation, Interpolation and Smoothing of Stationary Time Series," The MIT Press, 1949), which is hereby incorporated by reference for these details of the Wiener deconvolution method.

While it is reasonable to assume $N_m(f_x,f_y)$ is white Gaussian noise, $O_m(f_x,f_y)$ is hard to determine without some prior knowledge of the sample's spatial distribution. For simplicity, $|N_m(f_x,f_y)|^2/|O_m(f_x,f_y)|^2$ is set to a constant K, essentially converting $G_m(f_x,f_y)$ to a Tikhonov regularization algorithm. Examples of the constant K can be found in R. C. Gonzalez and R. E. Woods, *Digital Image Processing* (Prentice Hall, 2002) and J. C. Russ, *The Image Processing Handbook*, Fifth ed. (CRC Press, 2007), which are incorporated by reference for the examples of the constant K. An example of a Tikhonov regularization algorithm can be found in M. Bertero and P. Boccacci, *Introduction to Inverse Problems in Imaging* (Taylor & Francis, 1998), which is incorporated by reference for the algorithm.

K acts like a regularizer: a smaller K produces sharper details while amplifying noise in the captured image whereas a larger K makes the algorithm more robust to noise at the expense of details. This value is determined visually so that the deconvolution minimizes the background noise while recovering the most detail in the final image. In the end, the final estimate of the original fluorescent object is given by:

$$\tilde{o}_m(x, y) = F^{-1}\left[\frac{H_m^*(f_x, f_y)}{|H_m(f_x, f_y)|^2 + K} \cdot I_m(f_x, f_y)\right] \quad \text{(Eqn. 6)}$$

Eqn. 6 outputs the resulting image after Tikhonov regularization with the assumed noise and sample distribution model. Gaussian noise is a reasonable assumption for the noise of an imaging system where images are captured with long exposures for high signal-to-noise ratio. However, for photon-limited settings where Poisson noise becomes severe and dominant, maximum likelihood deconvolution methods that assume a Poisson imaging process would be more suitable, such as Richardson-Lucy deconvolution. Details of the Richardson-Lucy deconvolution operation can be found in G. M. P. Kempen and V. L. J. Vliet, "A quantitative comparison of image restoration methods for confocal microscopy," J. Microsc. 185(3), 354-365 (1997), which is hereby incorporated by reference for the Richardson-Lucy deconvolution operation. The ASIC method applies Eqn. 6 for all the tiles to acquire a full FOV aberration-corrected fluorescence image.

In certain implementations, an ACIS method can implement the conventional EPRY method to use one or a sequence of incoherent images of the specimen instead of a sequence of coherent images. In these implementations the variable illumination source includes incoherent radiation source(s) that provides incoherent radiation at multiple wavelengths and/or multiple angles instead of varied-angle coherent radiation such as from an LED array. In these specific cases (strict conditions and assumptions required for the incoherent source, can't be any incoherent illumination), the conventional EPRY method includes operations that computationally process the incoherent images of the captured sequence into coherent image input data for the FP-EPRY reconstruction operations. The FP-EPRY reconstruction can then determine phase and amplitude, and simultaneously determine the pupil function using the coherent image input data.

II. ACIS Imaging System

FIG. 1 is a block diagram of an ACIS imaging system 100 capable of implementing an ACIS imaging method, according to some implementations. At a high level, the ACIS imaging system 100 is configured or configurable to illuminate a sample from different illumination angles and capture a sequence of raw bright-field images and configured or configurable to capture one or more raw images of the field of view of the sample based on incoherent light such as fluorescence emissions from the sample. For example, the ACIS imaging system 100 may be configured or configurable to illuminate the sample with excitation light to activate fluorophores in the sample that generate fluorescence emissions and capture one or more fluorescence images of the field of view of the sample based on a measurement of the fluorescence emissions. The described communication between components of the ACIS system 100 may be in a wired form and/or wireless form.

In certain implementations, the region being imaged by an ACIS imaging system is divided into smaller regions or tiles. The ACIS imaging system can include parallel processing capabilities to process multiple tiles in parallel. For example, the ACIS imaging system 100 may process raw coherent images of each tile to reconstruct phase and amplitude data and also a pupil function for multiple tiles in parallel. The ACIS imaging system 100 may also process raw images of each tile to generate an aberration-corrected incoherent (e.g. fluorescent) image for multiple tiles in parallel.

Returning to FIG. 1, the ACIS imaging system 100 includes an illumination system 102, an optical system 106, and an image sensor system 108. A controller 110 controls operations of the ACIS imaging system 100 based on instructions stored in memory and/or provided by an operation of the ACIS imaging system 100. The controller 110 is in electrical communication with the image sensor system 108 to receive the raw image data from the image sensor system 108. Optionally (denoted by dotted lines), the controller 110 is in electrical communication with the illumination system 102 to control the illumination from this system, for example, in order to synchronize the illumination with the exposure times during acquisition of raw images (bright-field and/or fluorescence) by the image sensor system 108. The controller 110 or another processor controls the illumination from light sources of the illumination system 102, for example, by selectively powering on or otherwise allowing only particular ones or subsets of the light sources to form various illumination patterns at particular times and for particular durations during various image acquisition exposures. In some implementations, the controller 110 is further configured to execute instructions to perform processing operations on the raw image data such as operations performed as part of the ACIS imaging method.

The image sensor system 108 is in communication with the optical system 106 to receive light from the optical system 106 and capture raw images, each raw image captured over an exposure time. The illumination system 102 is in communication with the optical system 106 to provide illumination to a sample being imaged such that light scattered by or otherwise issuing from the sample is propagated through the optical system 106 to the image sensor system 108 which captures raw images.

In certain implementations, the illumination system 102 includes a variable coherent illumination source for providing illumination at different illumination angles sequentially to the sample and an excitation light system for provided excitation light to activate fluorophore in the sample. When illumination from the variable coherent variable illumination source is provided to the sample, the light scattered by or otherwise issuing from the sample is propagated through the optical system 106 to the image sensor system 108 which captures a sequence of bright-field raw images. When illumination from the excitation light source is provided to the sample, fluorophores in the sample emit light (emissions) in response to receiving the activation light and the fluorescence emissions are propagated through the optical system 106 to the image sensor system 108 which captures a fluorescence image during an exposure time. In certain implementations, multiple fluorescence images are captured during illumination by different wavelengths of excitation light.

During bright-field image acquisition, light generated by the variable coherent illumination source illuminates the sample at different illumination angles sequentially. The light incident on the sample is scattered by the physical features of the sample as it passes through the sample. During fluorescence image acquisition, the excitation light source generates particular wavelengths of excitation light to excite fluorophores (for example, specialized proteins) in the sample. In the fluorescence image acquisition process, the incident excitation light imparts energy into the fluorophores, which then emit light at lower energy wavelengths. A portion of the scattered light or emitted light then passes to collection optics (lens or set of lenses) of the optical system 106. Focusing optics of the optical system 106 focuses the scattered or emitted light from the sample to one or more image sensors of the image sensor system 108.

The image sensor system 108 has one or more image sensors. According to certain implementations, an image sensor is configured to capture light and output a data signal including image data representative of the intensities of light received at particular locations of the image sensor (referred to herein as a "light intensity distribution," "intensity distribution," or simply as an "image" or "image frame"). The image data output by each image sensor is transmitted (or "sent" or "communicated") to a processor of, for example, a controller. The image sensor(s) of an ACIS system can acquire a sequence of N raw bright-field intensity images during the bright-field image acquisition process and can acquire one or more incoherent (e.g., fluorescence) images during each incoherent (e.g., fluorescence) image acquisition process. Each image sensor acquires a raw image by measuring an intensity distribution of light incident the sensing area of image sensor during an exposure time. Some examples of suitable image sensors are CMOS sensors, a charge-coupled device (CCD), and other similar imaging devices. In one example, an image sensor is a CCD having a pixel size 5.5 µm such as the Prosilica GX6600 image sensor. In certain implementations, the one or more image sensors in an ACIS system are monochromic light detectors.

The controller 110 is configured to interpret and process raw image data from its bright-field and incoherent (e.g., fluorescence) image acquisition processes to generate processed image data. In some implementations, the controller 110 is configured or configurable by a user to perform FP processing operations on the raw image data of a sequence of bright-field intensity images. In these cases, the controller 110 interprets image data from the sequence of acquired bright-field intensity images, transforms the relatively low-resolution image data frames into Fourier space, combines the transformed raw image data, and reconstructs amplitude and phase data for a single high-resolution image of the field of view of the sample. In some cases, the controller 110 uses the amplitude and phase data to determine an aberration for the ACIS imaging system 100. The controller 110 can also generally include functionality to interpret and process the raw image data from the incoherent images captured during each image acquisition process to generate an aberration-corrected incoherent image.

According to certain implementations, the controller 110 can perform parallel image processing such as, for example, when processing multiple tile images using FP techniques to reconstruct phase and amplitude data for multiple tiles in parallel. To perform parallel image processing, the controller 110 generally includes at least one processor (or "processing unit"). Example processors include, for example, one or more of a general purpose processor (CPU), an application-specific integrated circuit, an programmable logic device (PLD) such as a field-programmable gate array (FPGA), or a System-on-Chip (SoC) that includes one or more of a CPU, application-specific integrated circuit, PLD as well as a memory and various interfaces. The controller 110 also is in communication with at least one internal memory device 120. The internal memory device 120 can include a non-volatile memory array for storing processor-executable code (or "instructions") that is retrieved by the processor to perform various functions or operations described herein for carrying out various algorithms or other operations on the image data. The internal memory device 120 also can store raw and/or processed image data (including FP-reconstructed images and aberration corrected fluorescence images). In some implementations, the internal memory device 120 or a separate memory device can additionally or alternatively include a volatile memory array for temporarily storing code to be executed as well as image data to be processed, stored, or displayed. In some implementations, the controller 110 itself can include volatile and in some instances also non-volatile memory.

In some implementations, the controller 110 is configured or configurable by a user to output raw image data or processed image data (for example, after FP image processing) over a communication interface 112 for display on a display 114. In some implementations, the controller 110 also can be configured or configurable by a user to output raw image data as well as processed image data (for example, after FP image processing) over a communication interface 116 to an external computing device or system 118. Indeed in some implementations, one or more of the ACIS operations can be performed by such an external computing device 118. In some implementations, the controller 110 also can be configured or configurable by a user to output raw image data as well as processed image data over a communication interface 122 for storage in an external memory device or system 124. In some implementations, the controller 110 also can be configured or configurable by a user to output raw image data as well as processed image data (for example, after FP image processing) over a network communication interface 126 for communication over an external network 128 (for example, a wired or wireless network). The network communication interface 126 also can be used to receive information such as software or firmware updates or other data for download by the controller 110. In some implementations, the ACIS imaging system 100 further includes one or more other interfaces such as, for example, various Universal Serial Bus (USB) interfaces or other communication interfaces. Such additional interfaces can be used, for example, to connect various peripherals and input/output (I/O) devices such as a wired keyboard or mouse or to connect a dongle for use in wirelessly connecting various wireless-enabled peripherals. Such additional interfaces also can include serial interfaces such as, for example, an interface to connect to a ribbon cable. It should also be appreciated that one or more of the variable coherent illumination source, the incoherent illumination source, and the image sensor system 108 can be electrically coupled to communicate with the controller 110 over one or more of a variety of suitable interfaces and cables such as, for example, USB interfaces and cables, ribbon cables, Ethernet cables, among other suitable interfaces and cables.

The data signals output by the image sensors of an image sensor system may in some implementations be mutliplexed, serialized or otherwise combined by a multiplexer, serializer or other electrical component of the image sensor system before being communicated to the controller 110. In certain implementations, the controller 110 can further include a demultiplexer, deserializer or other device or component for separating the image data from each of the image sensors so that the image frames can be processed in parallel by the controller 110 or for separating the image data from each tile so that the sequence of bright-field image frames of each tile can be processed in parallel by the controller 110.

An ACIS imaging system includes an illumination system, which generally includes a variable coherent illumination source with components configured or configurable to provide coherent illumination (e.g., with plane wave illumination) to the sample being imaged at a plurality of N illumination angles sequentially i.e. at different image acquisition times. N typically has a value in a range of between 2 to 1000. In one case, N=100. In another case, N=200. In another case, N has a value in a range of between 2 to 100. In another case, N has a value in a range of between 2 and 200. In another case, N has a value in a range of between 100 and 200. The pitch between the individually addressable light sources may be, for example, 1 mm, 2 mm, 3 mm, 4 mm, 5 mm, etc. Generally the variable coherent illumination source is designed to provide oblique illumination.

In certain implementations, the coherent illumination source includes an array of individually addressable coherent light sources. In one implementation, the variable coherent illumination source is a (light-emitting diode) LED array where each light source includes one or more light-emitting diodes (LEDs). Typically, the coherent light sources provide visible light. Some examples of a coherent light source that can provide visible light include a liquid crystal display (LCD) pixel and an LED. In implementations with a variable coherent illumination source having an array of individually addressable coherent light sources, the light sources may be in various arrangements such as a line array, a rectangular array (e.g., 1×9 array, 3×6 array, 10×10 array, 15×15 array, 32×32 array, 100×100 array, 50×10 array, 20×60 array, or other array with two dimensions), one or more concentric circles (rings), a hexagonal array, curvilinear array, or other suitable arrangement capable of providing coherent illumination from the plurality of illumination angles. In certain implementations, a subset of the total number of the individually addressable coherent light sources is used during the bright-field image acquisition process.

The variable coherent illumination source is configured to provide coherent illumination at different angles sequentially. The image data from the sequence of images captured from illumination at different illumination angles corresponds to overlapping regions in Fourier space. In some cases, the variable coherent illumination source provides illumination at illumination angles that provide an overlapping area of neighboring regions of image data in Fourier space where the overlapping area is of at least a certain minimum amount (e.g. 65% overlap, 75% overlap, 70% overlap, 80% overlap, in a range of 10%-65% overlap, in a range of 65%-75% overlap, etc.). To provide this minimum amount of overlap of neighboring regions in Fourier space, the variable coherent illumination source may be configured so that the difference between adjacent illumination angles is less than a certain maximum angular difference. For example, the maximum angular difference may be about (e.g. $\sin^{-1}(0.65*NA)=0.065$ rad for NA=0.1) rad. In another case, the maximum angular difference may be about 0.33 for NA=0.5.

Although examples described herein typically discuss a variable coherent illumination source that provides visible light, the disclosure is not so limiting. For example, other sources of radiation may be used. For example, where X-ray radiation is used, variable coherent illumination source may comprise an X-ray tube and a metal target. As another example, in cases that use microwave radiation, the variable coherent illumination source may comprise a vacuum tube. As another example, in embodiments that use acoustic radiation, the variable coherent illumination source may be an acoustic actuator. As another example, in embodiments that use Terahertz radiation, the variable coherent illumination source may be a Gunn diode. One skilled in the art would contemplate other sources of radiation. In one case that uses Terahertz radiation, the frequencies of the radiation provided by the variable coherent illumination source may be in the range of about 0.3 to about 3 THz. In one case that uses microwave radiation, the frequencies of the radiation provided by the variable coherent illumination source may be in the range of about 100 MHz to about 300 GHz. In one case that uses X-ray radiation, the wavelengths of the radiation provided by the variable coherent illumination source may be in the range of about 0.01 nm to about 10 nm. In one case that uses acoustic radiation, the frequencies of the radiation provided by the variable coherent illumination source may be in the range of about 10 Hz to about 100 MHz. For acoustic radiation embodiments, the focusing optics and imaging detectors would include aluminum concave lens in water to focus acoustic beams and transducers to measure the wavefronts.

In certain implementations, the properties (e.g., wavelength, frequency, phase, amplitude, polarity, etc.) of the coherent illumination from the different light sources are substantially uniform. In other cases, the wavelengths may vary at different acquisition times. For example, the variable coherent illumination source may provide RGB illumination of three wavelengths $\lambda_1$, $\lambda_2$, and $\lambda_3$ corresponding to red, green, blue colors, respectively at different acquisition times. The range of frequency of the illumination provided by the light sources of the variable coherent illumination source depends on the type of radiation. In examples that use Terahertz radiation, the frequencies of the radiation provided by the variable coherent illumination source are in the range of about 0.3 to about 3 THz. In examples that use microwave radiation, the frequencies of the radiation provided by the variable coherent illumination source may be in the range of about 100 MHz to about 300 GHz. In examples that use X-ray radiation, the wavelengths of the radiation provided by the variable coherent illumination source may be in the range of about 0.01 nm to about 10 nm. In examples that use acoustic radiation, the frequencies of the radiation provided by the variable coherent illumination source may be in the range of about 10 Hz to about 100 MHz.

The illumination system of an ACIS imaging system includes a source of incoherent light that is used to generate one or more incoherent raw images of the field of view of the sample. For example, the illumination system may include an excitation light system configured or configurable to provide excitation light for activating fluorophores in the sample to emit incoherent fluorescence light (emissions). In multi-color (multi-band) fluorescence imaging examples, each excitation light system has multiple sets of one or more light sources, each set for providing excitation light for a band (wavelength or range of wavelengths) of the multiple bands being imaged. In some cases, each light source of the excitation light system includes one or more high power light sources (e.g., high-power LEDs) and an excitation filter for passing excitation light of a range of wavelengths and blocking other wavelengths. In one example, six (6) high-power LEDs are used. In one example, one (1) high-power LED is used. For single color (band) fluorescence imaging, the excitation light system has at least one high power fluorescence illumination source with a high power light source(s) (e.g., LED) and an excitation filter for passing excitation light of a certain range of wavelengths and blocking other wavelength. For multi-band (multi-channel) fluorescence imaging, the excitation light system has the number of sets of high power light source(s) and filters equal to the number of fluorescence channels. A different high power fluorescence illumination source is used for each fluorescence channel. Each high power fluorescence illumination source is illuminated at a different image acquisition time so that a monochromic fluorescence image is separately acquired for each channel. A processor can implement instructions to convert a monochromic fluorescence image into a color fluorescence image. In multi-color embodiments, a processor can generate a multi-color fluorescence image by overlaying image data from multiple color fluorescence. For example, a processor can generate a blue-green fluorescence image by overlaying image data from a blue fluorescence image and a green fluorescence image.

In examples with fluorescence imaging, the excitation light source for providing excitation light is located to the side of the sample according to certain implementations. At this side location, the excitation light sources can shine excitation light to the sample directly from the side blocking the light path from the coherent light sources. Generally, the excitation light sources are configured or configurable to be inclined toward the center of the sample.

The ASIC system 100 has an optical system 106 that generally one or more lenses that propagate light issuing from the sample to the one or more image sensors. In one implementation, the optical system 106 includes collection optics, an iris, a filter, and a focusing lens.

Although examples described herein discuss a variable coherent illumination source that operates in a trans-illumination mode, in other examples epi-illumination mode, in trans-illumination mode, or in both epi-illumination mode and trans-illumination mode can be applied. To be able to operate in the epi-illumination mode, the variable coherent illumination source is typically located on the same side of the sample as the collecting optical element of the optical system. To be able to operate in the trans-illumination mode, the variable coherent illumination source is typically located on the opposite side of the sample as the collecting optical element of the optical system.

FIG. 2 is a schematic diagram of an example of an ACIS imaging system 200 configured to implement the ACIS method for joint FP-fluorescence imaging, according to an embodiment. The components of the ACIS imaging system 200 are similar to those described with respect to the ACIS imaging system 100 shown in FIG. 1.

The ACIS imaging system 200 includes an illumination system comprising two illumination sources, one of each imaging modality, including a variable coherent light source in the form of a LED array 210 and an excitation light source 220 (e.g., one or more LEDs and a filter). The excitation light source 220 is located laterally to the side of a sample 201 to direct the excitation light away from the collection optics 230 to avoid receiving excitation light directly. The LED array 210 is a two-dimensional 32×32 array of 225 individually addressable LEDs 212, of which only a 15×15 segment (shown) is used during the bright-field image acquisition process to capture 225 images. In other examples, a larger or smaller segment of the LED array 210 may be used. The pitch between the individually addressable LEDs 212 may be, for example, 1 mm, 2 mm, 3 mm, 4 mm, 5 mm, etc. The imaging system 200 also comprises a receptacle 225 for receiving a specimen 201. At the instant in time illustrated in FIG. 2, a single LED 212 is illuminated during a bright-field image acquisition process. Although there are 256 LEDs in the LED array 210, for simplicity, the illustration shows an arrow to one LED 212 illuminated and providing coherent light 214 to the sample 201.

The ACIS imaging system 200 also includes an optical system comprising collection optics (e.g., camera lens) 230 having at least one lens, an iris 240 at the back focal plane of the optical arrangement, a filter 250, and focusing optics (e.g., tube lens) 260. Although shown with a filter 250, the filter 250 is generally only included during the fluorescence imaging process or during a bright-field imaging process of the same color channel as the fluorescence emissions. The filter 250 is configured to substantially pass one or more ranges of wavelengths of the fluorescence emissions being imaged and substantially blocks the excitation light from the excitation light source 220. The ACIS imaging system 200 also includes an image sensor system having an image sensor 270 for capturing raw images based on light propagated through the optical system.

At the instant in time illustrated in FIG. 2, a single LED 212 is illuminated and providing coherent light 214 to the sample 201. The light incident on the sample 201 is scattered by the physical features of the sample 201 as it passes through the sample 201. The collection optics 230 receive light passing through the sample 201. The iris 240 receives light propagated by the collection optics 230 and passes light incident its pupil area. Light incident the area of the iris 240 around the pupil area is substantially blocked. When the filter 250 is in place during an fluorescence image acquisition process or during a bright-field imaging process of the same color channel as the fluorescence emissions, the filter 250 receives light from the iris 240 and passes one or more ranges of wavelengths of fluorescence emissions being imaged and blocks other wavelengths. The focusing optics 260 receives incident light passed by the filter 250 when it is in place or passed by the iris 240 and focuses the light to the imaging sensor 270.

In a fluorescence image acquisition process, the excitation light source 220 is activated to provide excitation light. In a multi-band example, the excitation light source 220 is activated at different times and provides different ranges of wavelengths of excitation light in order to capture multiple fluorescence images. Excitation light incident the sample 201 activates fluorophores to generate fluorescence emissions. The collection optics 230 receives light passing through the sample 201 and fluorescence emissions from activated fluorophores in the sample 201. The iris 240 receives light propagated by the collection optics 230 and passes light incident its pupil area. Light incident the area of the iris 240 around the pupil area is substantially blocked. The filter 250 receives light and passes fluorescence emissions and blocks other wavelengths. The focusing optics 260 receives fluorescence emissions passed by the filter 250 focuses the fluorescence emissions to the imaging sensor 270, which captures a fluorescence image for each band being imaged.

The collection optics (e.g., camera lens) of an ACIS system generally comprises one or more lenses and is designed to collect light scattered by or otherwise issuing from the sample. For example, the collection optics may comprise be an f=50 mm Nikon lens (e.g., f/1.8 D AF Nikkor). As another example, the collection optics may comprise a 4× Olympus Plan Achromat objective 0.10 NA, CFI Plan Achromat 10× objective NA 0.25, Valumax objective lens 5×0.10 NA, etc.

Certain implementations of an ACIS system have an iris located at the back focal plane of the collection optics of the optical system. An iris refers to a circular aperture that can be adjusted in diameter to limit the amount of light collected by the optical system. Reducing the diameter and blocking out the outer region of light is equivalent to reducing the numerical aperture of the collection optics, which means blocking out high spatial frequency information of the sample. Placing the iris is useful if the user wants to accurately define the numerical aperture of the imaging system for the purpose of the ACIS method to prevent aliasing in the detected images, etc. There are different ways to control the size and shape of the iris. In one example, one can use a mechanical iris which has its diameter adjustable with a slider (e.g. Ring-actuated SM2 iris diaphragm from Thorlabs). As another example, an iris may be a transmissive liquid crystal display (LCD) can adjust the contrast of its pixel elements to produce an aperture. As another example of an iris system, light may be guided to an SLM or DMD and then only a part of the beam reflected back into the system's optical path by turning on different elements on the SLM or DMD. With the use of an LCD, SLM, and DMD, the iris's shape is not limited to a circle because any discretized shape can be displayed on these displays and thus, the shape and size may be defined as the user desires.

In certain implementations, a filter is located in the optical path between an iris and the focusing optics of the optical system of an ACIS system. The filter is an emission filter designed to pass fluorescence emissions being imaged by the ACIS system and block other wavelengths. In some cases, the filter is a single band pass filter that passes light having a single range of wavelengths. In other cases, the filter may be a multi-band filter passing multiple ranges of wavelengths. The filters may be absorptive filters or dichroic filters. Absorptive filters are made with substrates that allow the desired wavelength pass through while absorbing other wavelengths. Interference filters are coated with multiple layers of different indices of refraction to constructively interfere the desired wavelength and allow it through while destructively interfere the unwanted wavelengths and reflect them back. Some examples of dichroic filter: FITC Dichroic Filter MD499 from Thorlabs, 50 mm Square Blue Dichroic Filter from Edmundoptics.

In certain implementations, the optical system of the ACIS system has focusing optics that are located to receive incident light from the filter and/or the iris of the optical system and focus the light to the image sensor. The focusing optics have one or more lenses. In one example, the focusing optics include a tube lens (e.g., a f=200 mm tube lens such as the Thorlabs® ITL200 tube lens).

The ACIS imaging system 200 implements an ACIS imaging method that includes a bright-field image acquisition process and a fluorescence image acquisition process. During the bright-field FP image acquisition process, the LED array 210 illuminates unique sets of one or more LEDs to illuminate a sample 201 with oblique coherent illumination 214 at different illumination angles sequentially. At each acquisition time, the LED array 210 illuminates a unique set of one or more LEDs to illuminate a sample 201 during an exposure time and the image sensor 270 captures a single raw bright-field image. In one aspect, a single LED is illuminated during each exposure time. In another aspect, multiple LEDs in a unique pattern are illuminated during each exposure time. The light incident on the sample 201 is scattered by the physical features of the sample 201 as it passes through the sample 201. During the bright-field FP image acquisition process, the image sensor 270 captures a sequence of bright-field raw images based on light propagated through the optical system of the ACIS imaging system 200. During the fluorescence image acquisition process, the ACIS imaging system 200 provides excitation light 220 to the sample 201. Excitation light incident the sample 201 activates fluorophores to generate fluorescence emissions. During the fluorescence image acquisition process, the image sensor 270 captures one or more raw fluorescence images based on fluorescence emissions propagated through the optical system of the ACIS imaging system 200.

III. ACIS Imaging Methods

The ACIS imaging systems described herein (e.g. ACIS imaging systems 100 and 200 of FIGS. 1 and 2 respectively) are capable of coherent and incoherent image acquisition of a field of view. The coherent images are acquired at a different time than the incoherent image(s). In some implementations, the field of view imaged is divided into tiles and an ACIS imaging system processes the image data for multiple tile images. In one example, an ACIS imaging system includes multiple processors capable of processing image data for multiple tile images in parallel. An image acquisition time (sample) time generally refers to a time during the exposure duration of the one or more image sensors measure the light intensity distribution to capture a raw intensity image of the field-of-view.

The ACIS imaging methods generally comprise a coherent image acquisition process and an incoherent image process. In certain implementations, the coherent image acquisition process includes operations for acquiring a sequence of bright-field raw intensity images during sequential illumination at different illumination angles and the incoherent image acquisition process includes operations for acquiring one or more fluorescence images. In a multi-band implementation, multiple fluorescence images associated with different ranges of wavelengths are acquired.

FIG. 3 shows a flowchart 300 depicting operations of a single imaging run of an exemplary ACIS imaging method that can be implemented by an ACIS imaging system described herein, according to implementations. At operation 310, the ACIS imaging method begins. The ACIS imaging method comprises a coherent image acquisition process and an incoherent image process.

At operation 320, the ACIS imaging method performs the coherent image acquisition process to acquire a sequence of raw coherent images of field-of-view region of the specimen being imaged. The sequence of raw coherent images is sequentially captured by one or more imaging sensors while the variable coherent illumination source provides coherent illumination from N illumination angles sequentially to the specimen being imaged. Each raw coherent image is acquired by measuring a light intensity distribution during an exposure time.

At operation 320, the variable coherent light source (e.g., LED array) sequentially illuminates the specimen with plane wave illumination at N illumination angles. In one example, the variable coherent light source provides sequential illumination based on illumination instructions that define the order of activating the independently controllable discrete light elements (e.g., LEDs) of the variable illumination source. The optical system of the ACIS system collects light issuing from the specimen and propagates it to the one or more image sensors. During the sequential illumination by N illumination angles, the one or more image sensors acquire image data for N uniquely-illuminated intensity measurements (images) associated with the different illumination angles. The one or more image sensors send signal(s) with image data for the sequence of coherent images to the processor(s).

In certain implementations, the optical system of the ACIS system has collection optics, an iris, an emission filter, and focusing optics. An example is the ACIS system 200 illustrated in FIG. 2. The collection optics has one or more lenses configured to collect light scattered by or otherwise issuing from the specimen while the specimen is illuminated by the variable coherent light source or while the specimen is illuminated by the excitation light source. The iris is configured to pass light propagated by the collection optics through a center region of the iris and to block other light. The optical system also has an emission filter configured to receive light passing through the iris. The emission filter is designed to pass fluorescence emissions from fluorophores activated by the excitation light and block the excitation light. The optical system also has focusing optics for receiving light propagated from the iris and/or filter to the one or more image sensors. The collection optics passes light that is within a range of incidence angles within its numerical aperture. The iris passes light that is within a central region, possibly further restricting the incidence angle range passed by the collection optics by the physical dimension of the iris. In Fourier space, the filtering function of the collection optics and/or iris can be in some cases represented by a circular pupil with a radius of NA×$k_0$, where $k_0 = 2\pi/\lambda$ is the wave number in vacuum. In one case, the coherent illumination from the variable coherent light source is of a range of wavelengths that will be passed by the emission filter. In this case, the emission filter does not need to be removed during the coherent image acquisition process. In other cases, the emission filter is removed.

Although generally, the ACIS methods comprise a coherent image acquisition process for acquiring a sequence of coherent images, certain implementations may instead acquire sequence of incoherent images. In these implementations, an ACIS method can implement the conventional EPRY method to use one or a sequence of incoherent images of the specimen instead of a sequence of coherent images. In these implementations the variable illumination source includes incoherent radiation source(s) that provides incoherent radiation at multiple wavelengths and/or multiple angles instead of varied-angle coherent radiation such as from an LED array. In these specific cases (strict conditions and assumptions required for the incoherent source, can't be any incoherent illumination), the conventional EPRY method includes operations that computationally process the incoherent images of the captured sequence into coherent image input data for the FP-EPRY reconstruction operations. The FP-EPRY reconstruction can then determine phase and amplitude, and simultaneously determine the pupil function using the coherent image input data.

At operation 330, the ACIS imaging method performs the incoherent image acquisition process to acquire one or more raw incoherent images of the field-of-view region of the specimen by the one or more image sensors. Each raw incoherent image is acquired by measuring a light intensity distribution during an exposure time. The optical system of the ACIS system collects incoherent light issuing from the specimen and propagates it to the one or more image sensors.

In fluorescence imaging implementations, the incoherent images are fluorescence images. In these implementations, the ACIS system acquires each fluorescence image while an excitation light source provides excitation light of a range of wavelengths to the specimen being imaged. The excitation light source generally includes a high power light source (e.g. high-power LEDs) and an excitation filter for passing the excitation light of a range of wavelengths and blocking other wavelengths. Fluorophore in the specimen are activated by the excitation light and emit light (emissions) of another range of wavelengths (e.g., blue, green or red light). Since the excitation light is typically stronger than the emissions, the excitation light source is usually configured to face away from the collection optics of the optical system. The one or more image sensors receive incident fluorescence emissions propagated by the optical system while the excitation light source provides excitation light to the specimen. At each acquisition time, the one or more image sensors acquire a monochromic fluorescence intensity image. The image data of the monochromic fluorescence image can be converted into a color fluorescence image.

In certain fluorescence imaging implementations, the ACIS system has an optical system comprising collection optics, an iris, an emission filter, and focusing optics, for example, as described with respect to FIG. 3. In these cases, the collection optics is configured to collect light issuing from the specimen while the specimen is illuminated by the excitation light source. The iris is configured to pass light propagated by the collection optics through a center region of the iris and to block other light. The optical system has an emission filter configured to receive light passing through the iris, pass the fluorescence emissions, and block the excitation light. The optical system also has focusing optics for focusing the fluorescence emissions passed by the filter to the one or more image sensors.

In multi-band fluorescence imaging cases, excitation light of different ranges of wavelengths is provided to the specimen at different acquisition times. The multiple ranges of wavelengths may be provided by the same excitation light source or by multiple light sources. In these cases, the emission filter in the system is a multi-band emission filter configured to block the multiple ranges of wavelengths of fluorescence emissions. At each acquisition time, fluorophores activated by the excitation light generate fluorescence emissions and the one or more image sensors measure an intensity distribution of the fluorescence emissions incident on one or more image sensors to acquire a monochromic fluorescence image. During the incoherent image acquisition process, the ACIS system captures multiple monochromic fluorescence images at different acquisition times associated with the different ranges of wavelengths of fluorescence emissions. The image data from the multiple monochromic fluorescence images can be converted into a multi-color fluorescence image. In a dual band implementation, for example, the ACIS imaging system may have a first excitation light source configured to provide excitation light of a first range of wavelengths and a second excitation light source configured to provide excitation light of a second range of wavelengths. In this dual band embodiment, the emission filter is a dual band filter that blocks out excitation light of the first range of wavelengths and the second range of wavelengths. The focusing optics receive emissions and focuses to the one or more image sensors. The image sensor receives the emissions from the focusing optics and acquires first and second monochromic fluorescence intensity images at different acquisition times. The image data from the first and second monochromic fluorescence images can be converted into a dual-color fluorescence image.

Although operation 320 of the coherent image acquisition process is shown before the operation 330 of the incoherent image acquisition process in the flowchart, these operations may occur in reverse order in other implementations. Generally, operation 330 may occur at any time before operation 370 and operation 320 may occur at any time before operation 340. For example, the operations shown in FIG. 3 may occur in the order of operation 320, operation 340, operation 350, operation 360, operation 330, and operation 370 in one implementation. In other example, the operations may occur in the order of operation 330, operation 320, operation 340, operation 350, operation 360, and operation 370 in one implementation.

At operation 340, the processor(s) (e.g., of a controller) of the ACIS system receives a signal from the one or more image sensors with image data of the acquired sequence of coherent images captured by the image sensor(s) during the coherent image acquisition process. At operation 340, the processor(s) executes instructions that implement the embedded pupil function recovery (EPRY) process to determine both the Fourier spectrum of the specimen and an estimated pupil function of the ACIS system simultaneously in an iterative process. Details of the EPRY process can be found in U.S. patent application Ser. No. 14/572,493 titled "EMBEDDED PUPIL FUNCTION RECOVERY FOR FOURIER PTYCHOGRAPHIC IMAGING DEVICES" and filed on Dec. 16, 2014, which is hereby incorporated by reference in its entirety. An example of an EPRY process is discussed in detail with respect to respect to FIG. 4.

According to certain implementations, the ASIC method uses the EPRY method to also determine tile-specific pupil functions of the ASIC imaging system. In these implementations, the captured raw images are segmented into smaller tiles to account for the spatially varying aberrations across the field-of view. The aberrations can be considered as spatially invariant within each tile. In this aspect, the ACIS method implements the EPRY process to each tile separately and a unique aberration function for each tile region is determined. The tile-specific pupil functions obtained from the EPRY process can provide an accurate physical model of the coherent transfer function of the ASIC imaging system. Tiles are generally much smaller than the FOV and larger than about 20×20 pixels in the captured image plane to mitigate any numerical artifacts that may arise during reconstruction from selecting too small a tile.

At operation 350, the processor(s) executes instructions to determine the optical transfer function of the ACIS system based on the estimated the pupil function. The estimated pupil function comprises aberration information of the one or more incoherent images captured during the incoherent image acquisition process.

According to implementations that use an EPRY method to determine tile-specific pupil functions of the ASIC imaging system, the ASIC method further determines the aberration of incoherent images based on the determined tile-specific pupil functions. The ASIC method can determine the incoherent image point spread function as the squared magnitude of the Fourier transform of the pupil function according to Eqn. 1.

At the aberration removal operation 360, the ASIC method removes the aberrations from each acquired incoherent image. In this aberration removal operation 360, the processor(s) executes instructions to remove the aberration from the one or more incoherent images via deconvolution with the optical transfer function determined at operation 350. The processor(s) outputs image data with one or more aberration-corrected incoherent images and/or the improved bright-field image generated at operation 340. In certain aspects, the one or more aberration-corrected incoherent images are monochromic fluorescence images. In these aspects, the processor(s) combines the aberration-corrected monochromic fluorescence images into aberration-corrected fluorescence color images.

In fluorescence imaging implementations, the aberration removal operation 360 of the ASIC method removes the aberrations from each acquired fluorescence image. In certain implementations, the ASIC method segments each acquired fluorescence image or other incoherent image into the same tiles as may be used for the coherent images in operation 340 to ensure the aberration map acquired from the EPRY process corresponds to the same tile regions in the fluorescence image. When an $m^{th}$ tile, $o_m(x,y)$, of a fluorescence image is imaged by the ACIS imaging system, it is degraded by the possibly spatially variant incoherent PSF, $h_m(x,y)$ before reaching the image sensor(s). The detected image intensity, $i_m(x,y)$, is further corrupted by noise, $n_m(x,y)$, originating from the sample's background signal, shot noise, and detector noise. Generally, the imaging process can be represented as Eqn. 2. The goal of the aberration removal operation 360 is to recover the object $o_m(x,y)$ from the corrupted image signal $i_m(x,y)$. In the Fourier domain, Eqn. 2 is represented as Eqn. 3. Unlike the coherent transfer function, the $H_m(f_x,f_y)$, also known as the optical transfer function (OTF), can have numerous zeros within its bandpass and its values are very low near the bandpass's edges, which means that the sample information may be lost or overwhelmed by noise at these spatial frequencies. Due to the nature of the OTF, inverting Eqn. 3 to solve for $o_m(f_x,f_y)$ may be an ill-posed problem. Various inversion methods have been developed to account for this information loss, which typically rely upon regularization parameters. The Wiener deconvolution method determine an estimate, $\tilde{O}_m(f_x,f_y)$, for the original object signal, $O_m(f_x,f_y)$, by Eqn. 4.

While it is reasonable to assume $N_m(f_x,f_y)$ is flat, white Gaussian noise $O_m(f_x,f_y)$ is hard to determine without some prior knowledge of the sample's spatial distribution. For simplicity, $|N_m(f_x,f_y)|^2/|O_m(f_x,f_y)|^2$ is set to a constant K, essentially converting $G_m(f_x,f_y)$ to a Tikhonov regularization algorithm. K acts like a regularizer: a smaller K produces sharper details while amplifying noise in the captured image whereas a larger K makes the algorithm more robust to noise at the expense of details. This value is determined visually so that the deconvolution minimizes the background noise while recovering the most detail in the final image. In the end, the final estimate of the original fluorescent object is given by Eqn. 6. Eqn. 6 outputs the resulting image after Tikhonov regularization with the assumed noise and sample distribution model. Gaussian noise is a reasonable assumption for the noise of an imaging system where images are captured with long exposures for high signal-to-noise ratio. However, for photon-limited settings where Poisson noise becomes severe and dominant, maximum likelihood deconvolution methods that assume a Poisson imaging process would be more suitable, such as Richardson-Lucy deconvolution. The ASIC method applies Eqn. 6 for all the tiles to acquire a full FOV aberration-corrected fluorescence image.

In certain implementations, the operations shown in flowchart 300 can be repeated. For example, the operations may be repeated for a new specimen or for additional imaging runs for the same specimen such as may be useful in a longitudinal study or in time-lapse imaging. For example, the ACIS imaging method may repeat the operations shown in flowchart 300 on regular intervals such as, for example, one hour intervals, two hour intervals, one day intervals, etc. The ACIS imaging method can continue repeating each imaging run at intervals for a set period of time (e.g., one week, two weeks, one month, two months, etc.) or can run until an operator initiates a stop command to the ACIS imaging method. In some cases, the ACIS imaging system can be located within an incubator during imaging over multiple runs.

In certain aspects, the output from operation 360 includes multiple aberration-corrected fluorescence color images. The processor(s) can execute instructions to generate a multi-band aberration-corrected fluorescence image by overlaying the multiple aberration-corrected fluorescence color images from operation 360.

In one aspect, after operation 360, the ACIS imaging method further comprises sending a signal with display data from the processor(s) to a display to display the improved resolution bright-field image, aberration-corrected fluorescence image(s), and other data generated by the ACIS imaging method.

In certain implementations, the ACIS imaging method further comprises dividing the field-of-view being imaged into tiles and processing data for multiple tile images and/or tile pupil functions in parallel using, for example, multiple processors capable of parallel processing. In these implementations, the ACIS imaging method implements any of the operations 340, 350, or 360 for each tile in parallel and then combine the data for the field-of-view at the end of the operation. For example, the ACIS imaging method at operation 340 would determine the estimated pupil function for each tile in parallel and then combine the data for each tile to generate a pupil function for the field-of-view. As another example, the ACIS imaging method could implement all of the operations 340, 350, or 360 for each of the tiles in parallel. For each tile, operations 340, 350 and 360 would need to be executed in a sequence, though.

In certain implementations, the variable coherent illumination source comprises discrete light elements that are illuminated at different acquisition times in an order, for example, according to illumination instructions. For example, the order may define the illumination times of individual light elements or patterns of light elements in a two-dimensional array of discrete light elements such as in an LED array. In one example where the two-dimensional array of light elements is a rectangular array, a central light element may be determined. The illumination instructions may instruct to illuminate the central light element first, then illuminate the 8 light elements surrounding the central light element going counterclockwise, then illuminate the 16 light elements surrounding the previous light elements going counterclockwise, and so on until the variable coherent illumination source has provided illumination from the plurality of N illumination angles $(\theta x_{i,j}, \theta y_{i,j})$, i=1 to N. In another example where the two-dimensional array of light elements is a polar array such as one or more concentric rings, the illumination instructions may instruct to illuminate the light elements at smallest radius first (e.g., in clockwise, counterclockwise, or random order), then illuminate any light element at a larger radius, and so on until all the variable coherent illumination source has provided illumination from the plurality of N illumination angles $(\theta x_{i,j}, \theta y_{i,j})$, i=1 to N. In another example where the two-dimensional array of light elements is a rectangular or a polar array, a light element closest to the sample may be determined. The illumination instructions may instruct to illuminate the light element closest to the sample, and then illuminate the light element next closest to the sample, and then illuminate the light element next closest, and so on until the N light elements have been illuminated from the plurality of N illumination angles. In another example, the light elements may be illuminated in a random order. In another example, a sequential column by column order may be followed such as, for example, $(X_1,Y_1)$, $(X_1,Y_2)$, $(X_1,Y_3)$, . . . $(X_1,Y_n)$, $(X_2,Y_1)$, $(X_1,Y_2)$, $(X_1,Y_3)$, . . . $(X_2,Y_n)$, . . . $(X_m,Y_n)$. Alternatively, a row by row order may be followed.

Details of an Example of an EPRY Process

During the coherent image acquisition process, the specimen is illuminated with oblique plane waves from N varying angles $(\theta x_{i,j}, \theta y_{i,j})$ and a sequence of N raw coherent images was captured. This coherent image acquisition process can be generally expressed as a complex multiplication $e(r)=s(r)\exp(iU_M \cdot r)$ where $s(r)$ is the exit light wave from a thin sample, which is illuminated by the oblique plane wave with a wavevector and where $r=(x,y)$ is the coordinate in the spatial domain and $u=(k_x,k_y)$ is the coordinate in the spatial frequency domain (Fourier domain). The light wave that propagates to the radiation detector is the convolution of the exit wave and the spatially invariant point spread function $p(r)$ of the Fourier ptychographic imaging system where the intensity is recorded, i.e. $I_{U_M}=|e(r)\otimes p(r)|^2$. In the Fourier domain:

$$I_{U_M}=|F^{-1}\{F[e(r)]*F[p(r)]\}|^2=|F^{-1}\{S(u-U_N)*P(u)\}|^2 \qquad (\text{Eqn. 7})$$

Where: $S(u)=F\{s(r)\}$ is the Fourier spectrum of the sample, and $P(u)=F\{p(r)\}$ is the pupil function of the image system In some cases, the image reconstruction process recovers $S(u)$ and $P(u)$ that satisfy Eqn. 7 for all N measured intensity images. Here, $P(u)$ refers to the pupil function distribution, $S(u)$ refers to the sample Fourier spectrum distribution (also referred to as $\tilde{I}_h$ in previous sections), $s(r)$ refers to a sample spatial distribution, N refers to the number of captured images, B refers to the total number of outer loops executed, a refers to the inner loop index variable and b refers to the outer loop index variable.

Figure 4:
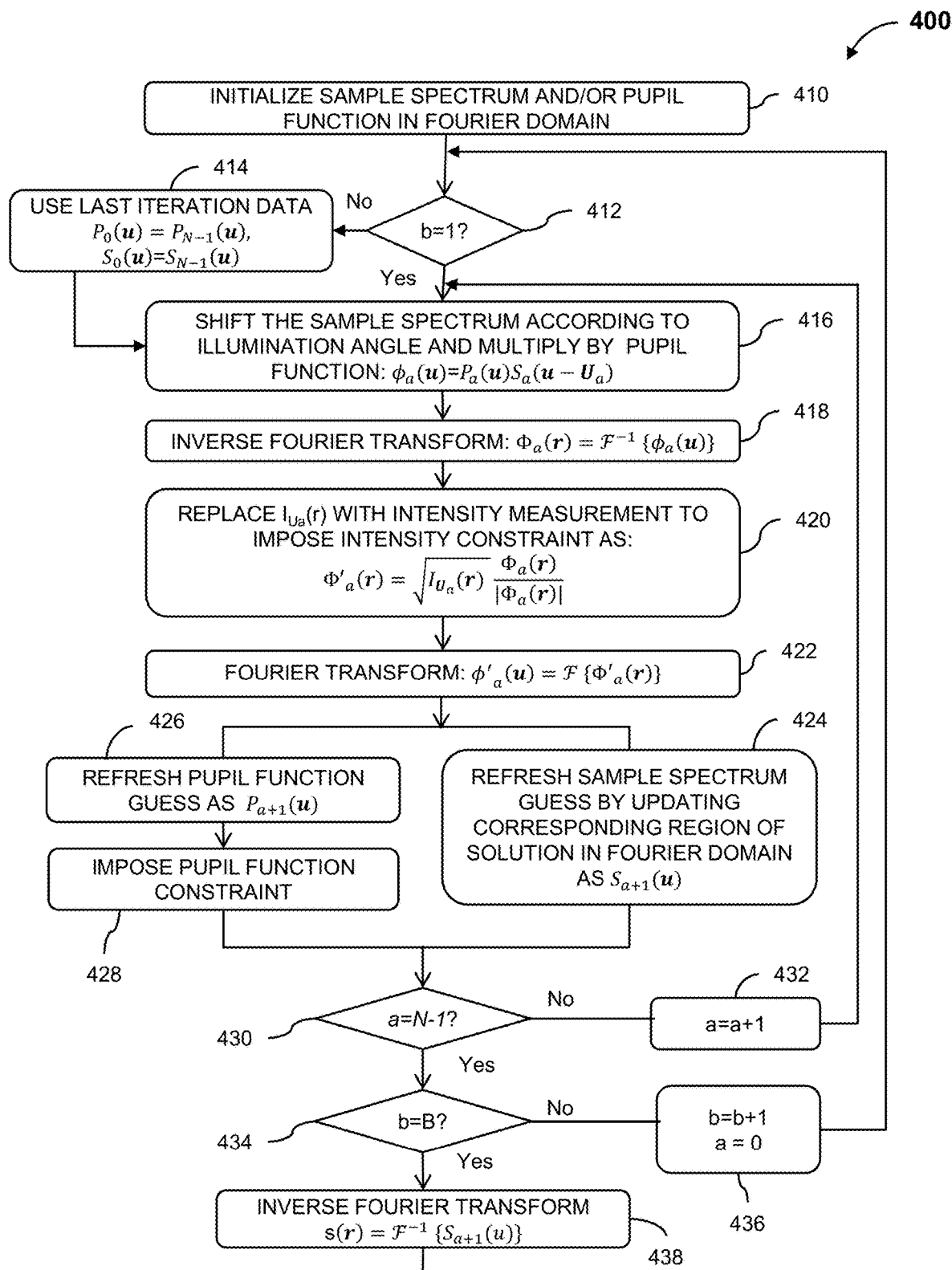
FIG. 4 shows a flowchart depicting operations of an exemplary EPRY process, according to implementations.

FIG. 4 shows a flowchart 400 depicting operations of an exemplary EPRY process, according to implementations. At operation 410, the sample spectrum and pupil function are initialized as $S_0(u)$ and $P_0(u)$ respectively. In addition, the outer loop index variable, b, is set to 1 (first iteration) and the inner loop index variable, a, is set to 0. Outer loop index variable, b is the index incrementing the reconstruction process iterations and inner loop index variable, a, is the index incrementing the incidence angle. In the cycles of the inner loop, N captured images are addressed in the sequence: $I_{U_a}(r)$, a=0 to N−1, where N is the number of captured images, and each is considered in turn, with both the pupil function and sample spectrum updated at each loop.

In one embodiment, the initial sample spectrum $S_0(u)$ may be determined by first initialized a sample image in the spatial domain, and then applying a Fourier transform to obtain an initialized sample spectrum in the Fourier domain. In some cases, the initial guess may be determined as a random complex matrix (for both intensity and phase). In other cases, the initial guess may be determined as an interpolation of the low-resolution intensity measurement with a random phase. An example of an initial guess for $S_0(u)$ may be interpolated from one of the captured intensity images. Another example of an initial guess is a constant value. The Fourier transform of the initial guess can be a broad spectrum in the Fourier domain.

In some embodiments, the initial pupil function guess $P_0(u)$ may be a circular shaped low-pass filter, with all ones inside the pass band, zeros out of the pass band and uniform zero phase. In one example, the radius of the pass band is NA×2π/λ, where NA is the numerical aperture of the filtering optical element (e.g., objective lens) and λ is the illumination wavelength. An example of an initial pupil function guess would be based on assuming the system is aberration free, phase=0.

At operation 412, it is determined whether b=1 i.e. it is the first iteration of the outer loop. If it is determined that it is not the first iteration, then the initial pupil function and the sample spectrum in the Fourier domain are set to the data determined in the last cycle of the inner loop: $S_0(u)=S_{M-1}(u)$ and $P_0(u)=P_{M-1}(u)$ at operation 414. If it is determined that it is the first iteration, then the EPRY process proceeds to operation 416.

In the $a^{th}$ cycle of the inner loop, with the knowledge of the reconstructed $S_a(u)$ and $P_a(u)$ from the previous cycle of the inner loop, the exit wave at the pupil plane while the sample is illuminated by a wavevector $U_n$ can be simulated using: $\phi_a(u)=P_a(u)S_a(u-U_n)$ with the $S_a(u)$ and $P_a(u)$ from the previous cycle. At operation 416, the processor shifts the sample spectrum according to the illumination angle and multiplies by the pupil function according to: $\phi_a(u)=P_a(u)S_a(u-U_n)$. The pupil function comprises both an amplitude and a phase factor. The phase factor of the pupil function is generally associated with defocus or other aberration associated with the optical system. The amplitude of the pupil function is usually associated with the objective lens aperture shape of the optical system. By multiplying the sample spectrum by the pupil function in the Fourier domain, the processor(s) both filters the higher-resolution solution by multiplying by the modulus (computed amplitude component) of the pupil function and also multiplies by the phase factor of the pupil function. Multiplying the sample spectrum by the modulus filters the higher-resolution image in the Fourier domain for a particular plane wave incidence angle $(\theta_x^a, \theta_y^a)$ with a wave vector $U_a=(k_x,k_y)$. An image captured with illumination $U_a$ based on the $a^{th}$ illumination incidence angle is referred to in this section as $I_{U_a}(r)$. By multiplying the sample spectrum by the modulus, the processor(s) filters a region from the sample spectrum S(u) in the Fourier domain. In cases with a filtering optical element in the form of an objective lens, this region takes the form of a circular pupil aperture with a radius of NA*$k_0$, where $k_0$ equals 2π/λ (the wave number in vacuum), given by the coherent transfer function of an objective lens. The center of the circular region in Fourier space corresponds to the associated illuminating incidence angle of this $a^{th}$ cycle of the inner loop. For an oblique plane wave incidence with a wave vector $U_a=(k_x,k_y)$, the region is centered about a position $(k_x,k_y)$ in the Fourier domain.

At operation 418, the processor takes the inverse Fourier transform as follows: $\phi_a(r)=F^{-1}\{\phi_a(u)\}$. At operation 420, the processor imposes an intensity constraint. In this operation 420, the modulus (computed amplitude component) of the simulated region in Fourier space is replaced with the low resolution intensity measurement $I_{U_a}(r)$ captured by the radiation detector associated with an illumination wavevector $U_a$. The computed amplitude component is replaced by the square-root of the real intensity measurement $I_{U_a}(r)$ according to:

$$\phi'_a(r) = \sqrt{I_{U_a}(r)}\,\frac{\phi_a(r)}{|\phi_a(r)|}.$$

This forms an updated lower resolution image.

At operation 422, a Fourier transform is applied to the updated lower resolution image. In this operation, an updated exit wave is calculated via a Fourier transform according to: $\phi'_a(u)=F\{\Phi'_a(r)\}$.

At operation 3070, the processor refreshes the Fourier spectrum guess of the higher resolution solution by updating the exit wave data and replacing data in a corresponding region of the Fourier domain as the updated exit wave data associated with incidence wave vector $U_n=(k_x,k_y)$. The processor updates the exit wave data using a sample spectrum update function. An example of a sample spectrum update function is given by:

$$S_{a+1}(u) = S_a(u) + \alpha\,\frac{P_a^*(u+U_a)}{|P_a(u+U_a)|_{max}^2}[\phi'_a(u+U_a) - \phi_a(u+U_a)] \quad \text{(Eqn. 6)}$$

By using such a spectrum update function, the updated value of the sample spectrum may be extracted from the difference of the two exit waves by dividing out the current pupil function. By multiplying with the conjugates using Eqn. 6 and Eqn. 7, the sample spectrum can be separated from the pupil function so that the sample spectrum can be refreshed separately from the pupil function. In some cases, a correction is added to the sample spectrum guess with weight proportional to the intensity of the current pupil function estimate. The constant α adjusts the step size of the update. In one example, α=1. During the cycles of the inner loop, the data is updated as overlapping regions in the Fourier domain.

Concurrently with operation 424, at operation 426 the processor refreshes the guess of the pupil function in the Fourier domain as: $P_{a+1}(u)$. An example of a pupil update function that can be used here is given by:

$$P_{a+1}(u) = SP_a(u) + \beta \frac{S_a^*(u+U_a)}{|S_a(u+U_a)|_{max}^2}[\phi_a'(u) - \phi_a(u)] \quad \text{(Eqn. 7)}$$

The constant $\beta$ adjusts the step size of the pupil function update and $\beta=1$ is used in this paper. Using this pupil update function, the correction of the pupil function is extracted from the difference of the two exit waves by dividing out the current sample spectrum estimate, and added to the current pupil function guess with weight proportional to the intensity of the current sample spectrum estimate. By multiplying by the conjugate using Eqn. 7, the pupil function can be separated from the sample spectrum and refreshed separately.

At operation 428, the processor imposes a pupil function constraint on the updated pupil function. Imposing the pupil function constraint may suppress noise. In the example of a microscope system, a physical circular aperture stop may be set to define the NA, thus the area in the pupil function that corresponds to the stop should always be zero. The non-zero points in the updated pupil function in the region corresponding to the stop are caused by the noise in image acquisition, and are set to zero to eliminate the noise.

The inner loop of the method continues to cycle until all N captured images in the sequence $I_{U_a}(r)$ are used to update the pupil and sample spectrum, at which point an iteration of the outer loop is complete. The cycles run from a=0 to N−1. At operation 430, the processor determines whether a=N−1. If the processor determines that a does not equal N−1, then not all the N captured images have been used. In this case, the loop index a will be incremented at operation 432, and the method will return to operation 416 based on the next captured image associated with another incidence angle.

If the processor determines that a does equal N−1, the method continues to operation 434. If the processor determines that a does not equal N−1, the method continues to operation 432. At operation 432, the outer loop index is incremented a=a+1 to the next incidence angle. The method will then return to start a new cycle at operation 416.

At operation 434, the processor determines whether b=B. If the processor determines that b does not equal B, the loop index b will be incremented at operation 436 to b=b+1 and the loop index a will be reset to 0. The method will then return to start a new iteration at operation 3010.

If the processor determines that b does equal B, then the iterations stop and the method continues to operation 438. At operation 438, the sample spectrum is inverse Fourier transformed back to the spatial domain to generate image data for the improved resolution image of the specimen. Both the image data for the improved resolution image of the specimen and the pupil function are output of the EPRY process. The pupil function that we are left with at the end of the operation (i.e. b=B) is the output for the reconstructed pupil function.

At operation 350, the incoherent transfer function also known as the optical transfer function (OTF) is determined based on the estimated pupil function from operation 340. To obtain the OTF, the estimated pupil function is convolved with itself in the frequency domain, or magnitude-squared in the spatial domain.

Figure 5:
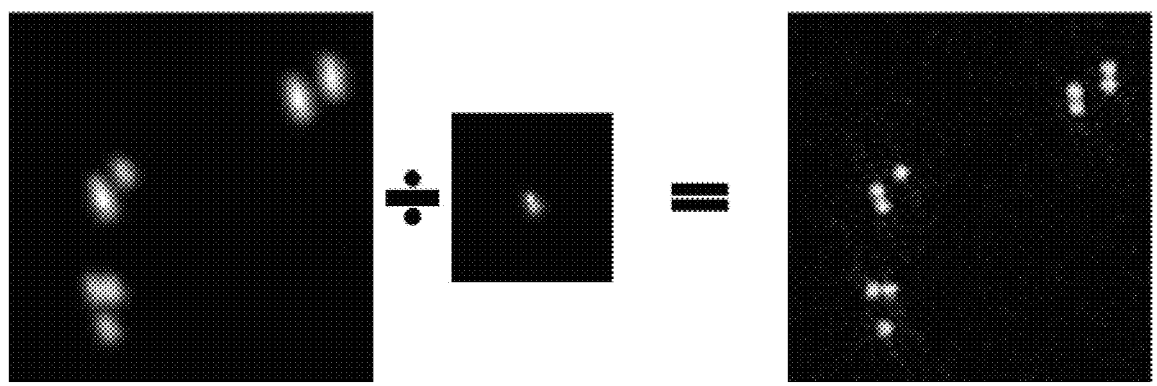
FIG. 5 includes a set of images shown as an equation to schematically represent the operation that deconvolves the OTF from the aberrated incoherent image, according to implementations.

At operation 330, an incoherent image is obtained, for example, by illuminating fluorophores in the specimen with excitation light. In certain implementations, the incoherent image is tiled in the same way as the coherent images of the sequence of coherent images acquired at operation 320. At operation 360, each tile is deconvolved by the corresponding OTF in the frequency domain by a deconvolution method (e.g., Wiener filter) to remove the aberration. FIG. 5 includes a set of images shown as an equation to schematically represent the operation 360 that deconvolves the OTF from the aberrated incoherent image, according to an implementation. In this illustration, the aberrated image (left image) and the point spread function (middle image) are Fourier transformed, and effectively "divided" (depicted as "÷") through a deconvolution process to produce the aberration-corrected image on the right.

In some implementations, a multiplexing approach can be used to decrease the total FP raw image acquisition time— the time required to obtain image data for N angles. In one multiplexing embodiment, multiple discrete coherent light sources can be turned on at the same time in a unique pattern during the capture of each raw image. Using a multiplexing process, intensity data associated with each illumination angle can be separated from the raw image captured. In this way, fewer than N scans are required. An example of a multiplexing process can be found in U.S. patent application Ser. No. 14/960,252 titled "MULTIPLEXED FOURIER PTYCHOGRAPHY IMAGING SYSTEMS AND METHODS" filed on Dec. 4, 2015, which is hereby incorporated by reference in its entirety.

IV. ACIS System Demonstrations

According to certain aspects, the optical system of the ACIS imaging system 200 shown in FIG. 2 has a modified 4f setup with the sample 201 located at the front focal plane of the collection optics 230, the iris 240 located at the back focal plane of the collection optics 230, and the image sensor 270 placed at the sample plane. In one implementation, the optical system has focusing optics 260 in the form of an f=200 mm, tube lens (e.g., the Thorlabs® ITL200 tube lens), collection optics 230 in the form of an f=50 mm Nikon lens (e.g., f/1.8 D AF Nikkor). This optical system has a $NA_{collection}=0.085$ with an M=3.87 magnification. In this implementation, the ACIS imaging system 200 also has an image sensor 270 in the form of a CCD detector (e.g., CCD detector with pixel size 5.5 μm, Prosilica GX6600) that is configured to capture each raw image of an field-of-view area of 6.2 mm by 9.3 mm at the sample plane, which is defined by the size of the image sensor 270. In this implementation, the ACIS imaging system 200 also has an LED array 210 that is placed at about 80 mm behind the sample 201. In this implementation, the LED array 210 has 32×32 individually addressable elements, of which only a 15×15 segment is used during the bright-field image acquisition process to capture 225 images. The pitch between the individually addressable LEDs is 4 mm. The increase in NA provided by the LEDs is $NA_{illum}=0.33$. The overall system NA is $NA_{sys}=NA_{collection}+NA_{illum}=0.085+0.33=0.415$, which is a factor of 4.9 resolution gain over the 4f setup with a single plane wave illumination. In this implementation, the ACIS imaging system 200 also has an excitation light source 220 comprising an LED and an appropriate emission filter 250 in the optical path behind the iris 240. The sequence of FP bright-field raw images and the fluorescence image are captured separately at different acquisition times. In this example, the emission filter 250 is present only during the acquisition of the fluorescence image and during the acquisition of any FP bright-field raw images that are of the same color channel as the fluorescence emissions, which ensures that the same spectral range is imaged.

In certain implementations, the optical system of an ACIS imaging system includes collection optics in the form of a camera lens (e.g., a f=50 mm Nikon lens (e.g., f/1.8 D AF Nikkor). In these implementations, a user of the ACIS system can adjust the camera lens to control the NA i.e. to allow for user-controllable NA.

The above-discussed implementation of the ACIS imaging system 200 with the modified 4f setup was used to perform the ACIS imaging method described with respect to FIG. 3 to image a sample slide containing both 10 μm green-fluorescing microspheres and 15 μm non-fluorescing microspheres such as those available from Fisher Scientific. In a coherent image acquisition process, the ACIS imaging system 200 acquired 225 full FOV low-resolution images under variable LED illumination with less than about 3 seconds average exposure time.

Figure 6A:
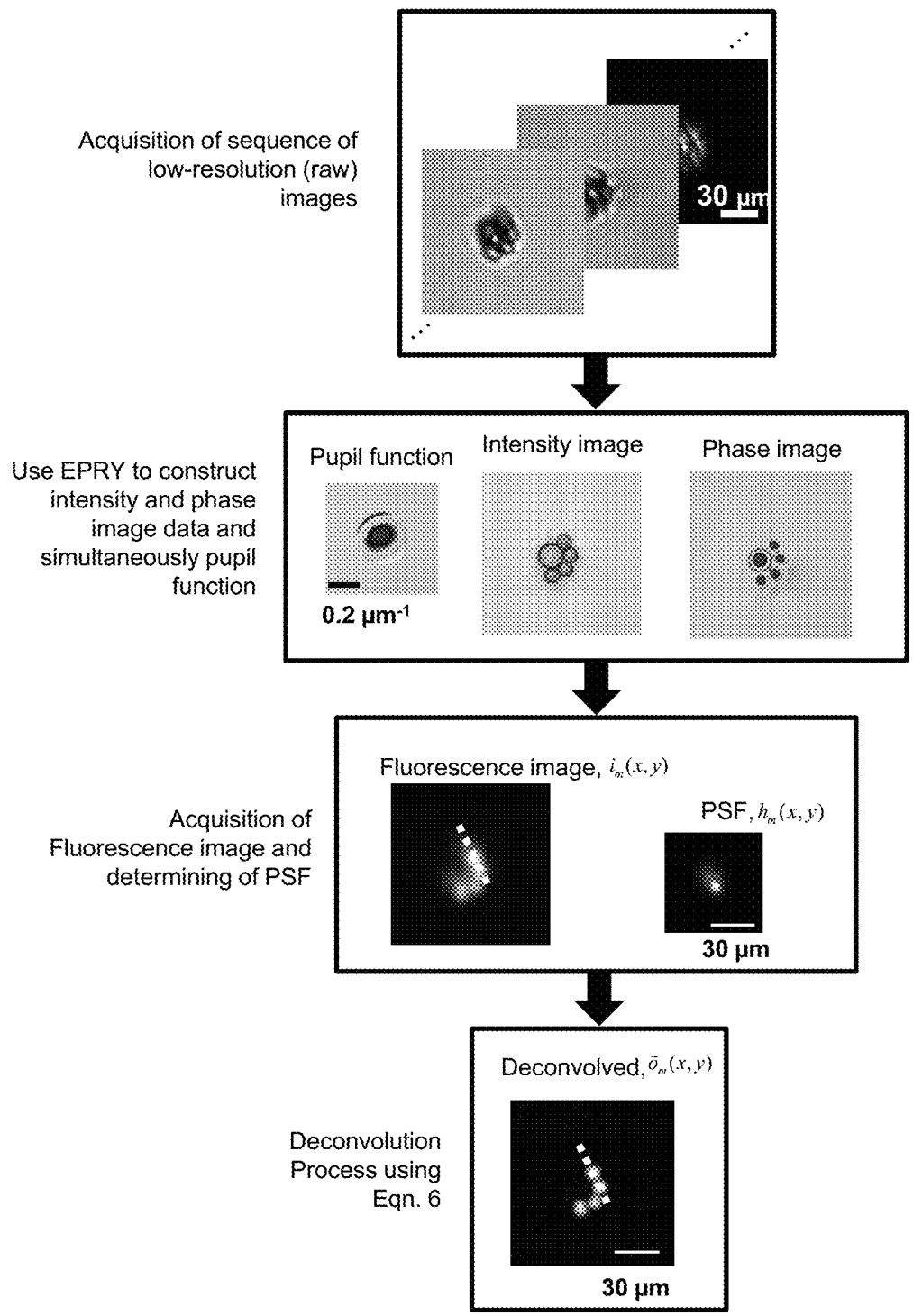
FIG. 6A is a schematic representation of the flow of experimental results during the performance of the ACIS imaging method, according to an implementation.

FIG. 6A is a schematic representation of the flow of experimental results during the performance of the ACIS imaging method, according to an implementation. In this implementation, only green LEDs of the LED array were illuminated. The tile image represented in FIG. 6A corresponds to a 360 μm×360 μm region located 3.8 mm away from the center of the image FOV. The set of 225 low-resolution coherent green images captured under variable-angle green illumination from the LED array is represented by the illustration in the top box. The ACIS imaging method was performed to apply the EPRY process for 50 iterations (5 seconds per tile) to reconstruct the intensity and phase of the sample and generate a high-resolution, complex image of the sample, along with characterization of the pupil function of the imaging system as represented in the second from the top box. The determined pupil function is only valid for this particular image tile, and the reconstructed complex image is much sharper than the raw images due to resolution improvement and aberration removal. The ACIS method is performed to capture a green fluorescence image by illuminating the sample with blue excitation LED (470 nm, Thorlabs) over a two minute exposure time as illustrated in the second from bottom box. Both FPM images and the fluorescence image are captured using a green band-pass filter (530 nm, 43 nm pass band) behind the iris. The raw fluorescence image captured is severely blurred because it is captured near the edge of the imaging system's FOV. The ACIS method is also performed to convert the pupil function $P_m(f_x,f_y)$ determined with the EPRY process into an incoherent PSF that characterizes the fluorescence image blur, $h_m(x,y)$, following Eqn. 1. The ACIS method is also performed to deconvolve the PSF-induced blur from the fluorescence image using Eqn. 6, which creates the sharp image shown in the bottom box. This deconvolution operation took less than 1 second per tile. Deconvolution removes many of the negative effects of lens-induced aberration. For example, four fluorescent beads that are challenging to resolve in the raw image are clearly distinguishable after deconvolution.

Figure 6B:
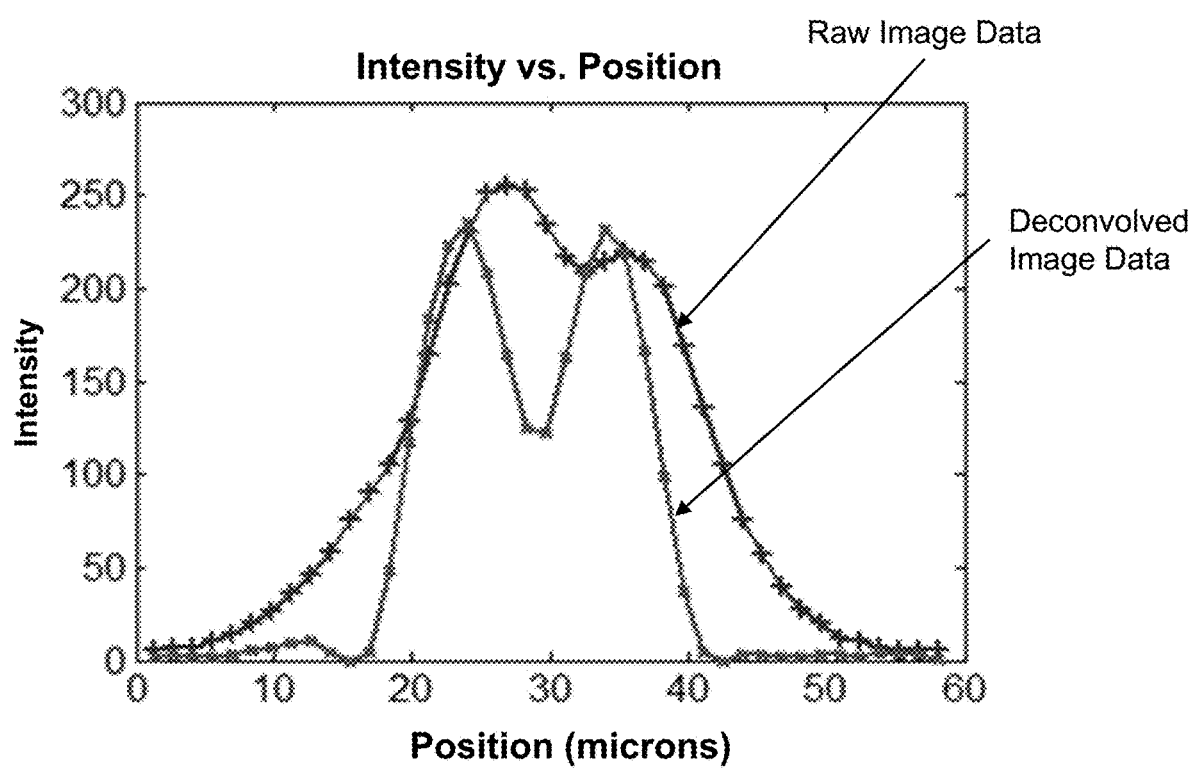
FIG. 6B is a plot of intensity vs. position, according to an aspect.
Figure 6C:
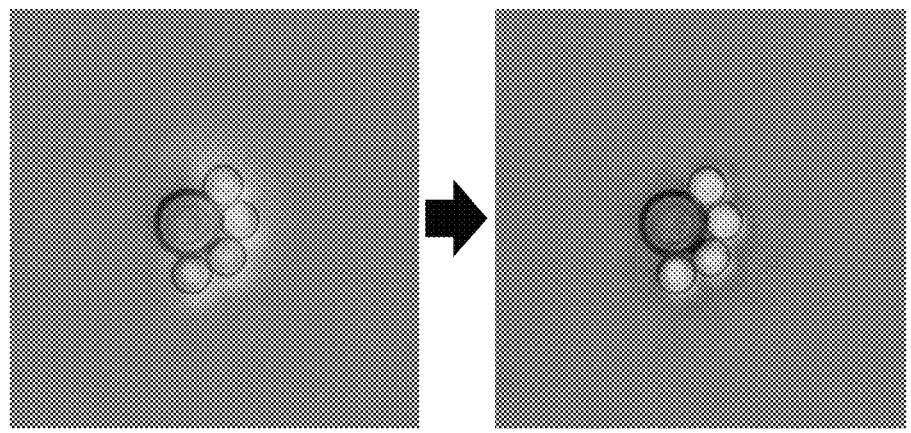
FIG. 6C includes two images, the left image is an overlay image of the high-resolution bright-field image and the raw fluorescence image before convolution and the right image is an overlay image of the high-resolution bright-field image and the aberration-corrected fluorescence image after deconvolution, according to an implementation.

FIG. 6B is a plot of intensity vs. position, according to an aspect. The plot is of both raw and deconvolved data for a one dimensional profile through two neighboring beads. This plot highlights that not only does deconvolution improve image contrast, but it also locates the centroid of each bead with greater accuracy. Specifically, the ratio of the lower peak to the dip between each peak is 0.946 for the raw image and 0.526 for the deconvolved result. The raw image shows the beads' separation distance is 8.5 μm, which is 15% below the bead's diameter of 10 μm. The deconvolved image shows the separation of 9.9 μm, which is within the 5% tolerance value indicated within the beads' manufacturing specifications. The lateral shift caused by the system's aberrations is corrected in the deconvolution result, as indicated by the shift of the inter-peak dip. This can be important for identifying the correct spatial correspondence between the high-resolution FPM image and the fluorescent sample image. FIG. 6C includes two images, the left image is an overlay image of the high-resolution bright-field image and the raw fluorescence image before convolution and the right image is an overlay image of the high-resolution bright-field image and the aberration-corrected fluorescence image after deconvolution, according to an implementation.

Imaging of HeLa Cells

The above-discussed implementation of the ACIS imaging system 200 with the modified 4f setup was used to perform the ACIS imaging method to image a sample of HeLa cells stained with Wright's stain from Fisher Scientific's PROTOCOL Hema 3, and fluorescently tagged with DAPI from Life Technologies. The sample is a microscope slide with 90% confluent HeLa cells that are fixed and stained. The sample is first imaged for FPM reconstruction by sequentially illuminating it with the red, green, and blue channels of the 225 LEDs in the LED array. A bandpass filter (460 nm, 80 nm band) is inserted to capture blue illumination images from within the same spectral range as DAPI's fluorescence emission. The ACIS imaging method is performed to capture a blue fluorescence image by illuminating the sample with a UV LED (365 nm, Thorlabs) at DAPI's excitation wavelength. The sample is exposed for 21 minutes. The high-resolution FPM image is reconstructed, along with a spatially varying pupil function, by repeating the EPRY method on different image tiles. The ACIS method is also performed to apply Eqn. 6 to deconvolve each tile of the fluorescence image.

Figure 7A:
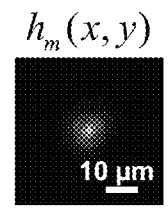
FIG. 7A includes a raw image of the specific sample ROI shifted off the optical axis and the recovered PSF according to an implementation.
Figure 7A:
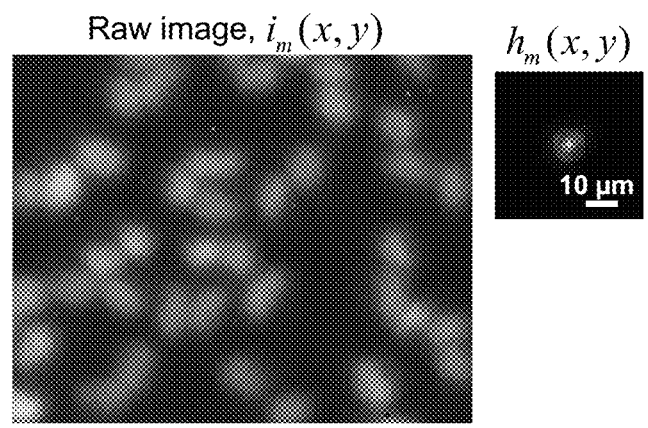
Figure 7B:
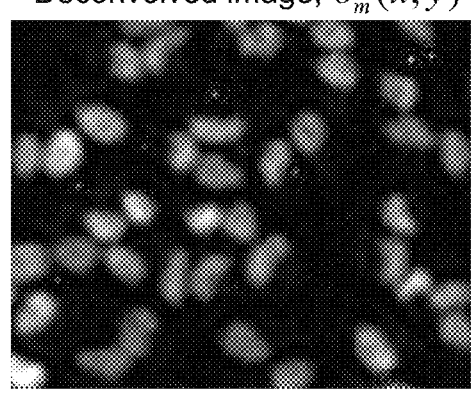
FIG. 7B is the deconvolution resulting image, according to an implementation.
Figure 7C:
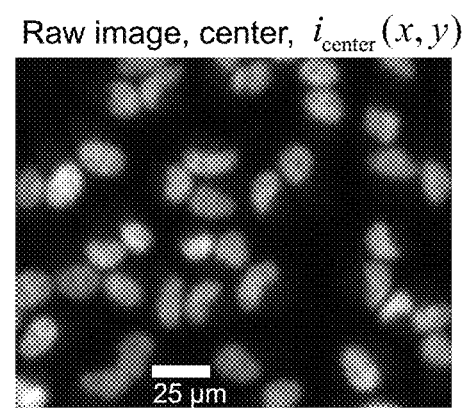
FIG. 7C is a raw image captured with the same sample ROI centered on the optical axis, according to an implementation.

The above-discussed implementation of the ACIS imaging system 200 with the modified 4f setup was used to perform the ACIS imaging method to capture two fluorescence images of the same sample region of interest (ROI), shifted to two different locations within the optical system's FOV. FIG. 7A includes a raw image of the specific sample ROI shifted 4.63 mm off the optical axis and the recovered PSF $h_m(x,y)$, according to an implementation. The PFT recovered from the EPRY method is deconvolved from the image to remove aberrations in FIG. 7A. FIG. 7B is the deconvolution resulting image, according to an implementation. FIG. 7C is a raw image captured with the same sample ROI centered on the optical axis. The image shown in FIG. 7C was captured with the ROI located at the center of the image FOV (i.e., along the optical axis). In this region, the effects of imaging system aberrations are minimal. The image in FIG. 7A is of the same ROI after translating the sample laterally 4.63 mm away from the center. It is clear that lens aberrations more significantly impact image quality off the optical axis, as indicated by the blurry outlines of the DAPI-stained nuclei. The small sub-figure also shows the results of deconvolution, using the incoherent PSF found via FPM image capture and post-processing of the same image tile. Deconvolution both increases the nuclei's contrast and highlights features that are not otherwise visible in the raw fluorescence image to the left, such as the shape of the nuclei and their separation gaps. To confirm the accuracy of the deconvolution result in FIG. 7B, it is compared with the minimally aberrated image of the same ROI shown in FIG. 7C. When comparing the images shown in FIG. 7B and FIG. 7C, there is close agreement between the deconvolved image features with few apparent artifacts. Although some "hot" pixels, visible as white or black dots within the raw, blurry image in FIG. 7A, lead to ringing artifacts around each after deconvolution, their presence does not drastically degrade the quality of the deconvolution image.

Figure 8:
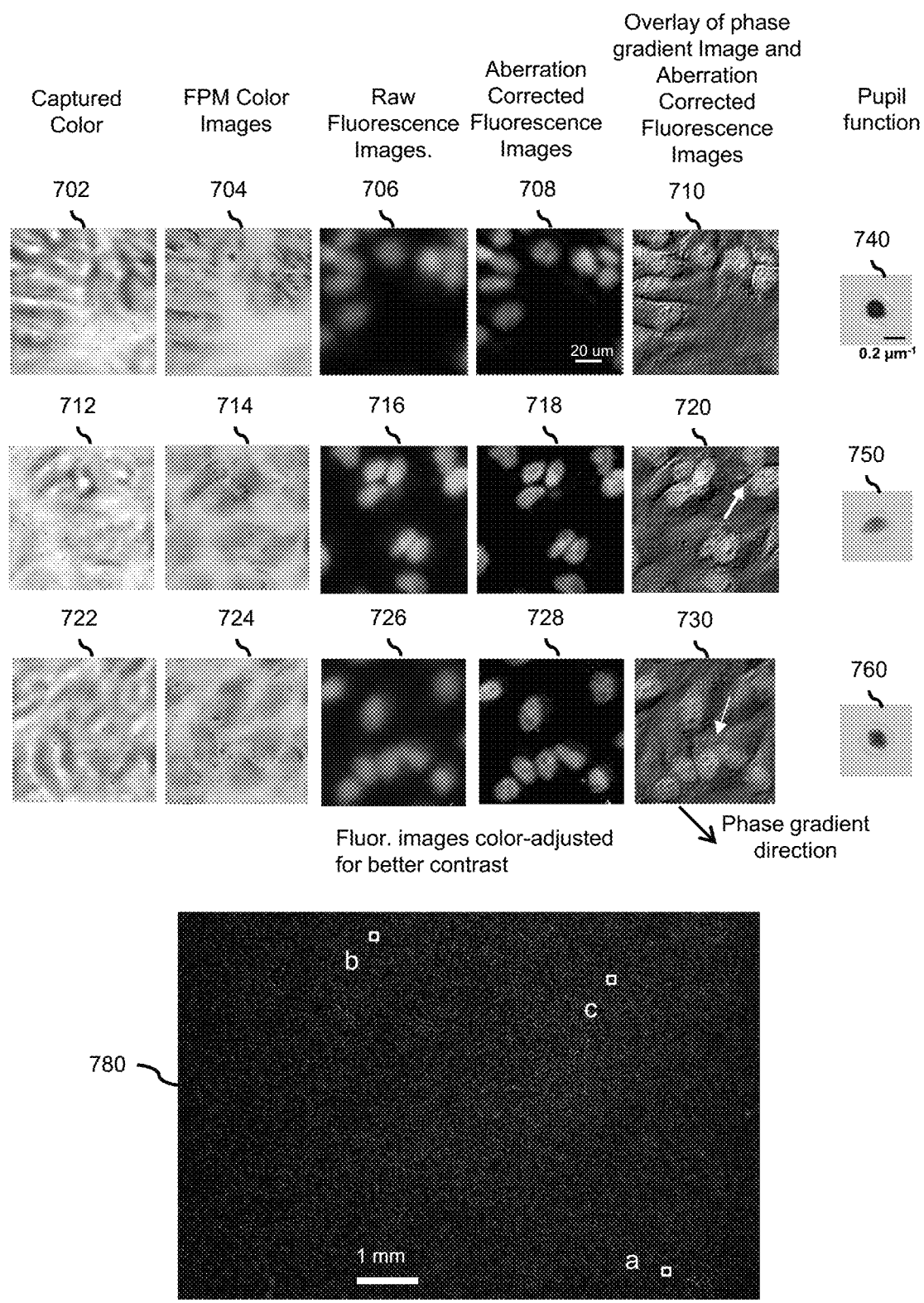
FIG. 8 shows high resolution Fourier ptychographic (FP) images and aberration-corrected fluorescence images throughout the entire image FOV at different regions of a large image FOV resulting from performing the ACIS method using the ACIS imaging system with the modified 4f setup, according to an implementation.

FIG. 8 shows high resolution FPM images and aberration-corrected fluorescence images throughout the entire image FOV at different regions of a large image FOV resulting from performing the ACIS method using the ACIS imaging system 200 with the modified 4f setup, according to an implementation. The image 780 shows the zoomed-in regions a, b, and c labeled in the full FOV fluorescence image.

FIG. 8 includes images 702, 704, 706, 708, and 710 at region "a" of the large image FOV shown labeled in the image 780. FIG. 8 also includes images 712, 714, 716, 718, and 720 at region "b" of the large image FOV shown labeled in the image 780. FIG. 8 also includes images 722, 724, 726, 728, and 730 at region "c" of the large image FOV shown labeled in the image 780. The low-resolution color images 702, 712, and 722 have severe aberrations because they are captured near the edge of the FOV. The ACIS method was used to reconstruct high-resolution, aberration-corrected full-color FPM images 704, 714, and 724 to elucidate sharp image features, such as the nucleoli present in the HeLa cells' nuclei, cell morphology via the reconstructed phase, and boundaries between different cells. To be able to generate the full FOV image 780, the ACIS method applied the EPRY method and the deconvolution method to individual tiles separately. In one example, about 2200 tiles at 5 seconds per tile were used in the EPRY method. FIG. 8 includes the raw fluorescence images 706, 716 and 726 images and the aberration corrected fluorescence images 708, 718, and 728 resulting from the deconvolution operation of the ACIS method. In certain implementations, the phase gradient data from the EPRY method can be overlaid with the aberration corrected fluorescence images as shown in the overlays 710, 720, and 730. The pupil functions 740, 750, and 760 at the regions "a," "b," and "c" are also shown. The phase gradient data in the overlays 710, 720, and 730 help illustrate the cell's structural information to show that the fluorescent regions of HeLa cells are indeed the nuclei. It is also possible to distinguish cells in telophase (indicated by arrow in image 730) from the ones in the cytokinesis stage of cell mitosis show (indicated by arrow in image 720), by examining the cell membrane morphology within the phase gradient image. Because the aberrations in FPM and fluorescence imaging are corrected by functions derived from the same pupil function, the images show accurate spatial correspondence (i.e., alignment) between each imaging modality.

The quality of the results from the deconvolution method can be improved in certain implementations by having exposure times in capturing raw fluorescence images greater than certain minimum values. Decreasing exposure times can reduce signal-to-noise ratio which can make the deconvolution method less effective. Exposure time is adjusted so that the signal-to-noise ratio is higher than certain requirement. The required signal-to-noise ratio for optimal deconvolution will vary depending on the deconvolution algorithm being used. In one implementation, the ACIS method requires SNR to be above 18. For such SNR, the required exposure time is 21 minutes for some fluorophores. In one implementation, the ACIS method captures raw fluorescence images with an exposure time greater than a minimum value of 1 minute. In one implementation, the ACIS method captures raw fluorescence images with an exposure time greater than a minimum value of 2 seconds. In one implementation, the ACIS method captures raw fluorescence images with an exposure time greater than a minimum value of 100 ms. The minimum required exposure time depends on the NA, fluorophore's intensity, detector's pixel size and efficiency, and magnification.

According to certain implementations, an ACIS system performing an ACIS method can generate a wide-field, aberration-corrected fluorescence image with correct spatial correspondence to the high resolution FP image. Generally, the ACIS method utilizes the spatially varying pupil function from EPRY method to correct for the aberrations in the raw fluorescence image. In certain implementations, the resulting color intensity image, phase image, and the fluorescence image can be combined to provide multiple layers of information about the sample's morphology, chemical properties, and functions. The wide FOV fluorescence and high-resolution bright-field image may be beneficial to various biological imaging studies including, for example, cell lineage tracing, counting bacteria, and cell migration.

In one implementation, the ACIS system has a high NA objective lens and the distance of the LED array to the sample is adjusted to allow for steeper angles of illumination as discussed in X. Ou, R. Horstmeyer, G. Zheng, and C. Yang, "High numerical aperture Fourier ptychography: principle, implementation and characterization," Opt. Express 23(3), 3472-3491 (2015), which is hereby incorporated by reference in its entirety.

In certain implementations, the ACIS method has one or more technical advantages over conventional deconvolution methods. For example, the ACIS method uses deconvolution by the PSF obtained from EPRY method that generates the high resolution coherent image so that the ACIS method allows for a proper overlap of the fluorescence image and the high resolution coherent image. This proper overlap can be important when overlaying the two images, especially when the pupil function has large asymmetric aberrations in different regions of the FOV. Asymmetric aberrations can cause a noticeable lateral shift in the images. Since the presented deconvolution method uses the incoherent PSF determined directly from the pupil function obtained from EPRY, both the fluorescence image and the high-resolution coherent image can be corrected for aberrations with the same amount of lateral shift. Other deconvolution methods that do not use the pupil function characterized by the FP technique cannot generate a corrected image with the proper lateral shift because the methods do not account for the absolute location of the image, meaning that the deconvolved image can have any arbitrary lateral shift as its solution. An example of a blind image deconvolution method that does not account for the absolute location of the image can be found in D. Kundur and D. Hatzinakos, "Blind image deconvolution," IEEE Signal Process. Mag. 13(3), 43-64 (1996). Without the same lateral shift for FPM and fluorescence images, the direct overlay of the images will not have the correct spatial correspondence between them. Some examples of non-blind deconvolution methods can be found in L. Yuan, J. Sun, L. Quan, and H.-Y. Shum, "Progressive inter-scale and intra-scale non-blind image deconvolution," ACM Trans. Graph. 27(3), 1-10 (2008) and J. H. Lee and Y. S. Ho, "High-quality non-blind image deconvolution with adaptive regularization," J. Vis. Commun. Image Represent, 22(7), 653-663 (2011), which are incorporated by reference for these methods. Blind deconvolution attempts to find the point spread function of the aberrated image with the partial knowledge of the physical property of the image to be reconstructed, such as the positivity and finite support constraint [D.

Kundur et. al]. The algorithm is indifferent to lateral shifts in the reconstructed image (i.e. the reconstructed image can be shifted in x-y by arbitrary values and still be the optimum solution to the blind deconvolution problem). This is not desirable when an overlay of fluorescence and bright-field images is desired because the deconvolved fluorescence image can have an arbitrary lateral shift with respect to the bright-field image, and would have to be corrected for with some kind of a colocalization algorithm. However, the ACIS method does not suffer from this colocalization problem because the same pupil function, which contains information about the aberration and the lateral shift, is used to improve both the bright-field and fluorescence images. Because both images are under the same lateral shift, they are colocalized without further processing.

In certain implementations, the ACIS method uses the EPRY process and an incoherent deconvolution process which provides one or more advantages over conventional methods. The ACIS method automatically achieves colocalization of image features between bright-field and fluorescence image by using the same pupil function for both the aberration correction in the fluorescence image and resolution improvement in the bright-field image Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, particular features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in particular combinations and even initially claimed as such, one or more features from a claimed combination can in some cases be excised from the combination, and the claimed combination may be directed to a subcombination or variation of a subcombination.

Similarly, while various operations (also referred to herein as "blocks") are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. Moreover, the separation of various system components in the implementations described above should not be understood as requiring such separation in all implementations. Additionally, other implementations are within the scope of the following claims. In some cases, the actions recited in the claims can be performed in a different order and still achieve desirable results.

It will also be understood by persons having ordinary skill in the art that various functions, operations, processes, modules or components that described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

What is claimed is:

1. An aberration-corrected fluorescence imaging method implemented by an imaging system having an optical system and an image sensor configured to receive radiation transmitted by the optical system, the method comprising:
   acquiring, using the image sensor, a sequence of coherent images of a specimen while spatially coherent plane wave illumination from different angles is sequentially provided incident the specimen, wherein each image of the sequence of coherent images is acquired while coherent plane wave illumination is provided incident the specimen from one of the angles;
   illuminating the specimen with excitation light configured to cause fluorescence emissions;
   receiving, at collection optics of the optical system, light including fluorescence emissions issuing from the specimen;
   passing fluorescence emissions and substantially blocking excitation light using an emission filter of the optical system;
   acquiring, using the image sensor, a fluorescence image of the specimen based on fluorescence emissions passed from the optical system;
   implementing an embedded pupil function recovery process to use the acquired sequence of coherent images to estimate a pupil function of the imaging system and construct an improved resolution image, wherein construction of the improved resolution image and estimation of the pupil function occur simultaneously;
   determining an optical transfer function of the imaging system based on the estimated pupil function;
   removing aberration from the acquired fluorescence image using a non-blind deconvolution process with one or more regularization parameters to generate an aberration-corrected fluorescence image, wherein the non-blind deconvolution process uses the optical transfer function of the imaging system determined from the pupil function estimated using the acquired sequence of coherent images; and
   causing the aberration-corrected fluorescence image to be stored on a non-transitory storage medium,
   wherein the improved resolution image and the aberration-corrected fluorescence image are co-localized, and wherein the aberration-corrected fluorescence image is a monochromatic fluorescence image.

2. The aberration-corrected fluorescence imaging method of claim 1, further comprising converting the monochromatic fluorescence image into a color fluorescence image.

3. The aberration-corrected fluorescence imaging method of claim 1, further comprising:
dividing a field-of-view of each of the acquired sequence of coherent images into a plurality of tile regions;
generating a sequence of tile images for each tile region;
generating a fluorescence tile image for each tile region; and
for each tile region, implementing the embedded pupil function recovery process to construct an improved resolution tile image and estimate a tile pupil function using the generated sequence of tile images.

4. The aberration-corrected fluorescence imaging method of claim 3, wherein the improved resolution tile image is constructed for each tile in parallel and the tile pupil function is estimated for each tile region in parallel.

5. The aberration-corrected fluorescence imaging method of claim 3, further comprising:
for each tile region, determining a tile optical transfer function based on the estimated tile pupil function;
for each tile region, removing aberration from the fluorescence tile image to generate an aberration-corrected fluorescence tile image using the non-blind deconvolution process and with the determined tile optical transfer function; and
generating the aberration-corrected fluorescence image by combining the aberration-corrected fluorescence tile images for the plurality of tile regions.

6. The aberration-corrected fluorescence imaging method of claim 1, wherein implementing the embedded pupil function recovery process to use the acquired sequence of coherent images to construct the improved resolution image comprises recovering amplitude and phase data of the improved resolution image.

7. The aberration-corrected fluorescence imaging method of claim 1, wherein the illumination angles are oblique angles to a surface of the specimen being imaged.

8. The aberration-corrected fluorescence imaging method of claim 1, further comprising:
acquiring at least one additional fluorescence image of the specimen; and
removing the aberration from the at least additional fluorescence image to generate aberration-corrected fluorescence images.

9. The aberration-corrected fluorescence imaging method of claim 8,
wherein the at least one additional fluorescence image is monochromatic, and
further comprising overlaying the monochromatic aberration-corrected fluorescence images to generate a multi-color fluorescence image of the specimen.

10. The aberration-corrected fluorescence imaging method of claim 1, wherein the fluorescence image is acquired before the sequence of coherent images is acquired.

11. The aberration-corrected fluorescence imaging method of claim 1, wherein the fluorescence image is acquired after implementing the embedded pupil function recover process or determining the optical transfer function based on the estimated pupil function.

12. An imaging system comprising:
a variable coherent light source configured to sequentially illuminate a specimen with spatially coherent plane wave illumination from different oblique angles;
an excitation light source configured to provide excitation light configured to cause fluorescence emissions from the specimen;
an optical system with collection optics for collecting light issuing from the specimen, wherein the optical system includes an emission filter for passing fluorescence emissions and substantially blocking excitation light, the optical system configured to propagate light to one or more image sensors;
the one or more image sensors configured to acquire a sequence of coherent images of the specimen while the variable coherent light source sequentially illuminates the specimen with coherent plane wave illumination from different oblique angles, the one or more image sensors further configured to acquire a fluorescence image of the specimen while the excitation light source provides excitation light incident the specimen; and
one or more processors in electrical communication with the one or more image sensors to receive image data of the sequence of coherent images and the fluorescence image, the one or more processors also configured to implement instructions stored in memory to:
estimate a pupil function of the imaging system and construct an improved resolution image using an embedded pupil function recovery process with the image data of the acquired sequence of coherent images, wherein construction of the improved resolution image and estimation of the pupil function occur simultaneously;
determine an optical transfer function of the imaging system based on the estimated pupil function;
generate an aberration-corrected fluorescence image by removing aberration from the acquired fluorescence image using a non-blind deconvolution process with one or more regularization parameters, wherein the non-blind deconvolution process uses the optical transfer function of the imaging system determined from the pupil function estimated using the acquired sequence of coherent images, wherein the improved resolution image and the aberration-corrected fluorescence image are co-localized, and wherein the aberration-corrected fluorescence image is a monochromatic fluorescence image; and
cause the aberration-corrected fluorescence image to be stored on a non-transitory storage medium.

13. The imaging system of claim 12, wherein the excitation light source is directed away from the collection optics of the optical system.

14. The imaging system of claim 12, wherein the variable coherent light source is a circular array of discrete light elements or a rectangular array of discrete light elements.

15. The imaging system of claim 12, wherein the variable coherent light source is an light-emitting diode (LED) array.

16. An aberration-corrected fluorescence imaging method implemented by an imaging system having an optical system and an image sensor configured to receive radiation transmitted by the optical system, the aberration-corrected fluorescence method comprising:
acquiring, using the image sensor, a sequence of coherent images of a specimen while spatially coherent plane wave illumination from different angles is sequentially provided incident the specimen, wherein each coherent image of the sequence of coherent images is acquired while coherent plane wave illumination is provided incident the specimen from one of the angles;
acquiring, using the image sensor, a fluorescence image of the specimen while excitation light is provided incident the specimen, and wherein collection optics of the optical system receives light including fluorescence emissions issuing from the specimen, and an emission filter of the optical system passes fluorescence emissions to and substantially blocks excitation light from the image sensor;

implementing an embedded pupil function recovery process to use the acquired sequence of coherent images to estimate a pupil function of the imaging system and construct an improved resolution image, wherein construction of the improved resolution image and estimation of the pupil function occur simultaneously;

determining an optical transfer function of the imaging system based on the estimated pupil function;

removing the aberration from the fluorescence image using a non-blind deconvolution process with one or more regularization parameters to generate an aberration-corrected fluorescence image, wherein the non-blind deconvolution process uses the determined optical transfer function, wherein the improved resolution image and the aberration-corrected fluorescence image are co-localized, and wherein the aberration-corrected fluorescence image is a monochromatic fluorescence image; and causing the aberration-corrected fluorescence image to be stored on a non-transitory storage medium.

\* \* \* \* \*